United States Patent
Takakura

(10) Patent No.: US 11,844,015 B2
(45) Date of Patent: Dec. 12, 2023

(54) UE AND COMMUNICATION CONTROL METHOD FOR ESTABLISHING A PDU SESSION IN A PUBLIC LAND MOBILE NETWORK

(71) Applicants: SHARP KABUSHIKI KAISHA, Sakai (JP); FG Innovation Company Limited, Tuen Mun (HK)

(72) Inventor: Tsuyoshi Takakura, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 316 days.

(21) Appl. No.: 17/293,944

(22) PCT Filed: Nov. 1, 2019

(86) PCT No.: PCT/JP2019/043112
§ 371 (c)(1),
(2) Date: May 14, 2021

(87) PCT Pub. No.: WO2020/100636
PCT Pub. Date: May 22, 2020

(65) Prior Publication Data
US 2022/0022128 A1  Jan. 20, 2022

(30) Foreign Application Priority Data
Nov. 16, 2018  (JP) ................................ 2018-215875

(51) Int. Cl.
*H04W 48/18* (2009.01)
*H04W 8/26* (2009.01)
(Continued)

(52) U.S. Cl.
CPC ............. *H04W 48/18* (2013.01); *H04W 8/26* (2013.01); *H04W 48/12* (2013.01); *H04L 2101/375* (2022.05); *H04W 76/38* (2018.02)

(58) Field of Classification Search
CPC ....... H04W 48/18; H04W 8/26; H04W 48/12; H04W 76/38; H04L 2101/375
(Continued)

(56) References Cited

U.S. PATENT DOCUMENTS

2004/0017796 A1* 1/2004 Lemieux ................. H04L 45/50
370/349
2012/0063437 A1* 3/2012 Liang .................... H04W 76/11
370/338
(Continued)

OTHER PUBLICATIONS

3GPP TS 23.501, "3rd Generation Partnership Project; Technical Specification Group Services and System Aspects; System Architecture for the 5G System; Stage 2 (Release 15)" Technical Specification, V15.0.0 (Dec. 2017).
(Continued)

*Primary Examiner* — Mark G. Pannell
(74) *Attorney, Agent, or Firm* — ScienBiziP, P.C.

(57) ABSTRACT

A user equipment (UE) with a transmission/reception unit is provided. The UE comprises: when a timer for a Single Network Slice Selection Assistance Information (S-NSSAI) and a Data Network Name (DNN) is operating, the transmission/reception unit initiates an Evolved Packet System (EPS) Session Management (ESM) procedure in the EPS by using a Access Point Name (APN); the APN is same as the DNN; and the transmission/reception unit receives a value of the timer in a Protocol Data Unit (PDU) session establishment reject message.

6 Claims, 11 Drawing Sheets

(51) Int. Cl.
*H04W 48/12* (2009.01)
*H04W 76/38* (2018.01)
*H04L 101/375* (2022.01)

(58) Field of Classification Search
USPC .......................................................... 370/329
See application file for complete search history.

(56) References Cited

U.S. PATENT DOCUMENTS

| | | | | |
|---|---|---|---|---|
| 2012/0109800 | A1* | 5/2012 | Zhou | H04M 15/66 705/34 |
| 2012/0269099 | A1* | 10/2012 | Chin | H04W 76/12 370/259 |
| 2013/0007286 | A1* | 1/2013 | Mehta | H04W 76/10 709/227 |
| 2013/0301547 | A1* | 11/2013 | Gupta | H04W 72/542 370/329 |
| 2014/0321278 | A1* | 10/2014 | Cafarelli | H04L 43/12 370/235 |
| 2015/0351136 | A1* | 12/2015 | Kaura | H04W 4/90 370/329 |
| 2017/0086064 | A1* | 3/2017 | Tiwari | H04W 4/60 |
| 2017/0099685 | A1* | 4/2017 | Wallentin | H04W 76/10 |
| 2017/0289042 | A1* | 10/2017 | Niemi | H04W 48/06 |
| 2020/0367090 | A1* | 11/2020 | Zhang | H04W 28/0247 |
| 2020/0367149 | A1* | 11/2020 | Kang | H04W 28/0247 |
| 2020/0404734 | A1* | 12/2020 | Watfa | H04W 76/25 |
| 2021/0029628 | A1* | 1/2021 | Kim | H04W 48/18 |
| 2022/0060937 | A1* | 2/2022 | Jiang | H04W 28/02 |

OTHER PUBLICATIONS

3GPP TS 23.502, "3rd Generation Partnership Project; Technical Specification Group Services and System Aspects; Procedures for the 5G System; Stage 2 (Release 15)", Technical Specification, V15.0.0 (Dec. 2017).

5G;Non-Access-Stratum (NAS) protocol for 5G System (5GS);Stage 3 (3GPP TS 24.501 version 15.1.0 Release 15), vol. 3GPP CT, No. V15.1.0 Oct. 5, 2018, paragraph [6.1.4.1], paragraph [6.2.8], table 10.3.1, p. 380, line 15-line 17.

Huawei et al., "Rename of T35cd and T35ef", C1-185311 3GPP TSG-CT WG1 Meeting #112, West Palm Beach, FL (USA), Aug. 20-24, 2018.

Huawei et al., "Resolution of editor's notes on timer for T35cd and timer for T35ef", C1-185488 3GPP TSG-CT WG1 Meeting #112, West Palm Beach, FL (USA), Aug. 20-24, 2018.

* cited by examiner

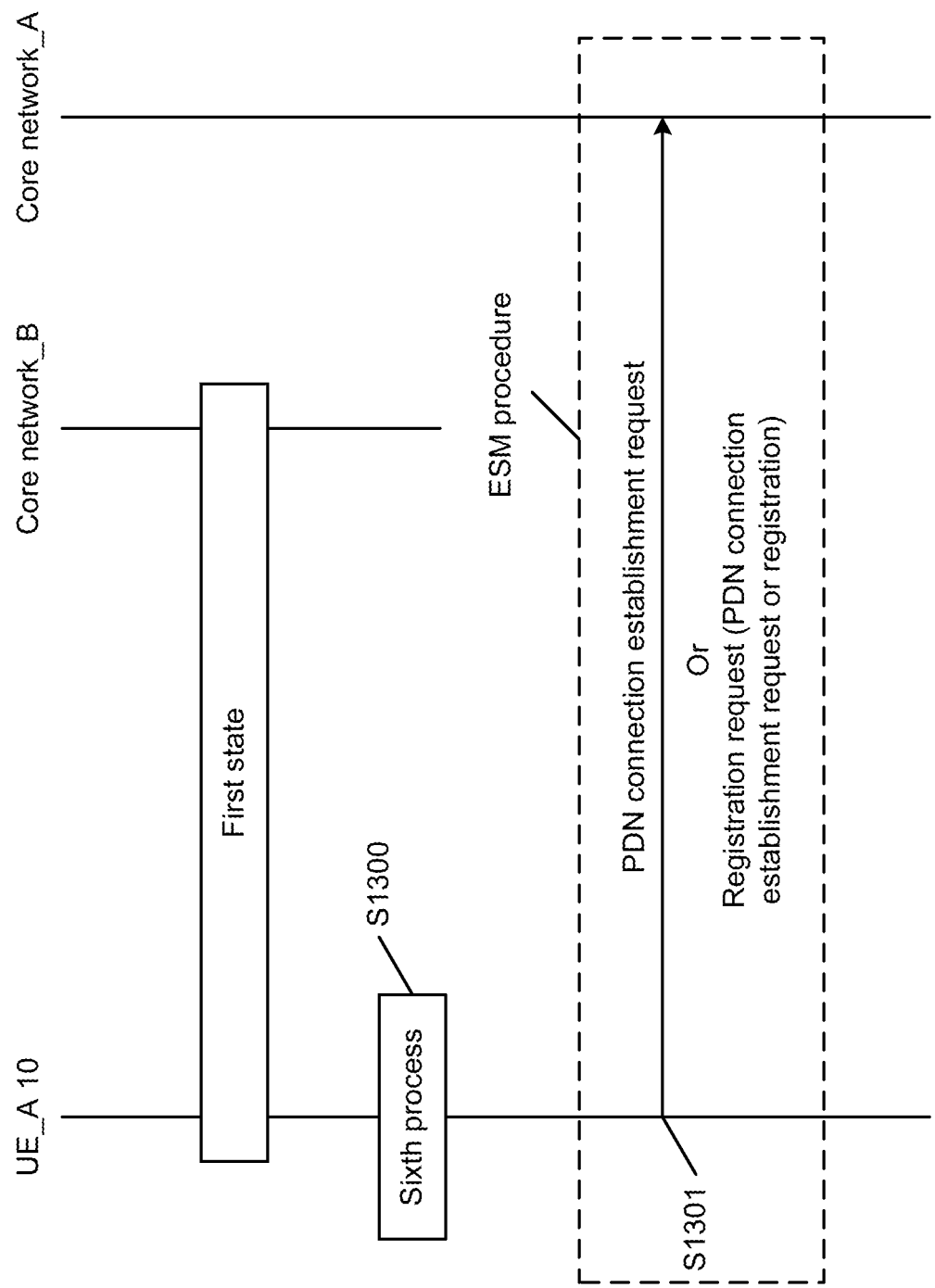

UE AND COMMUNICATION CONTROL METHOD FOR ESTABLISHING A PDU SESSION IN A PUBLIC LAND MOBILE NETWORK

FIELD

The present disclosure relates to a user equipment and a communication control method. The present disclosure claims the benefit of and priority to Japanese Patent Application No. 2018-215875 ("the '875 application"), filed on Nov. 16, 2018. The content(s) of the '875 application are fully incorporated herein by reference for all purposes.

BACKGROUND

For the standardization activities of 3GPP (3rd Generation Partnership Project) for mobile communication systems in recent years, the research of the system architecture of Long Term Evolution (LTE), that is System Architecture Evolution (SAE), is progressing. The 3GPP specifies Evolved Packet System (EPS) as a communications system that realizes all-IP (Internet Protocol). Furthermore, the core network that constitutes EPS is called Evolved Packet Core (EPC).

Furthermore, in recent years of 3GPP, the next generation communications technology and system architecture of the 5G (5th Generation) mobile communications system of the next generation mobile communications system is also being researched. Particularly, to realize the system of the 5G mobile communications system, the 5G system (5GS) is being specified (please refer to Non-Patent Literature 1 and Non-Patent Literature 2). In the 5GS, the technical problems for connecting various terminals to the cellular network are extracted, and the solutions are specified.

The requesting requirements may be, for example, optimization and diversification of communications procedures that supports continuous mobile communication services corresponding to the terminals of various supporting access networks, optimization and diversification of communications procedures, and optimization of system architecture compatible with the communications procedures.

PRIOR ART DOCUMENTS

Non-Patent Literature

Non-Patent Literature 1: 3GPP TS 23.501 v15.0.0; 3rd Generation Partnership Project; Technical Specification Group Services and System Aspects; System Architecture for the 5G System; Stage 2 (Release 15)
Non-Patent Literature 2: 3GPP TS 23.502 v15.0.0; 3rd Generation Partnership Project; Technical Specification Group Services and System Aspects; Procedures for the 5G System; Stage 2 (Release 15)
Non-Patent Literature 3: 3GPP TS 24.501 v15.1.0; 3rd Generation Partnership Project; Technical Specification Group Core Network and Terminals; Non-Access-Stratum (NAS) protocol for 5G System (5GS); Stage 3 (Release 15)

SUMMARY

Problems to be Addressed

In 5GS, in addition to the mechanism to provide the function corresponding to congestion management, control signal management based on reasons other than congestion management is also being researched (please refer to Non-Patent Literature 1, Non-Patent Literature 2, and Non-Patent Literature 3).

However, when applying the congestion management, the processing to which the UE performs the system change is still unclear.

One aspect of the present disclosure is realized in view of such circumstances, and an object thereof is to provide a mechanism for realizing a control signal management process based on the reason for congestion management at the time of system change, a control device, and a communication control method thereof.

Aspects to Address the Problems

An aspect of the present disclosure is a user equipment (UE) provided with a transmission/reception unit, characterized in that: when a timer for Single Network Slice Selection Assistance Information (S-NSSAI) and Data Network Name (DNN) is operating, the transmission/reception unit can initiate an Evolved Packet System (EPS) Session Management (ESM) procedure in the EPS by using a given Access Point Name (APN); the APN is same as the DNN; and the transmission/reception unit receives a value of the timer in a Protocol Data Unit or Packet Data Unit (PDU) session establishment reject message.

Another aspect of the present disclosure is a communication method executed by a user equipment (UE), wherein the method is characterized in that: when a timer for Single Network Slice Selection Assistance Information (S-NSSAI) and Data Network Name (DNN) is operating, the UE can initiate an EPS Session Management (ESM) procedure in the Evolved Packet System (EPS) by using a given Access Point Name (APN); the APN is same as the DNN; and the UE receives a value of the timer in a PDU session establishment reject message.

Effects

According to the present disclosure, it is characterized in that, constituting the terminal device of 5GS, and the device in the core network for different systems, and implementing the congestion management and other management processing for each terminal device-led network slice and/or the DNN, or the APN.

BRIEF DESCRIPTION OF THE DRAWINGS

FIG. 13 is a schematic diagram of an EPS Session Management (ESM) procedure according to an aspect of the present disclosure.

DESCRIPTION

Hereinafter, the best mode of implementing the present disclosure will be described below with reference to the accompany drawings. Furthermore, in the present implementation, as an example, an example of a mobile communications system that implement according to an aspect of the present disclosure will be described.

[1. System Overview]

Figure 1:
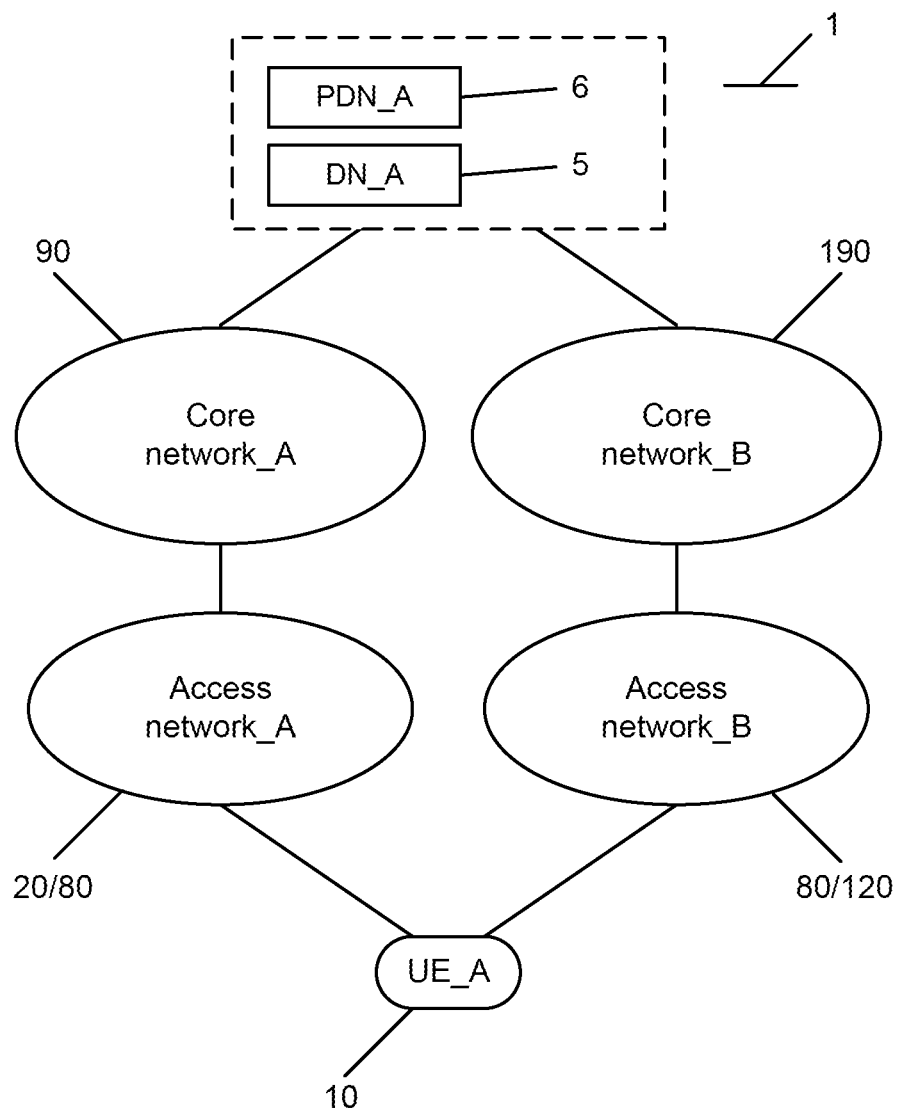
FIG. 1 is a schematic diagram of a radio communications system according to an aspect of the present disclosure.
Figure 2:
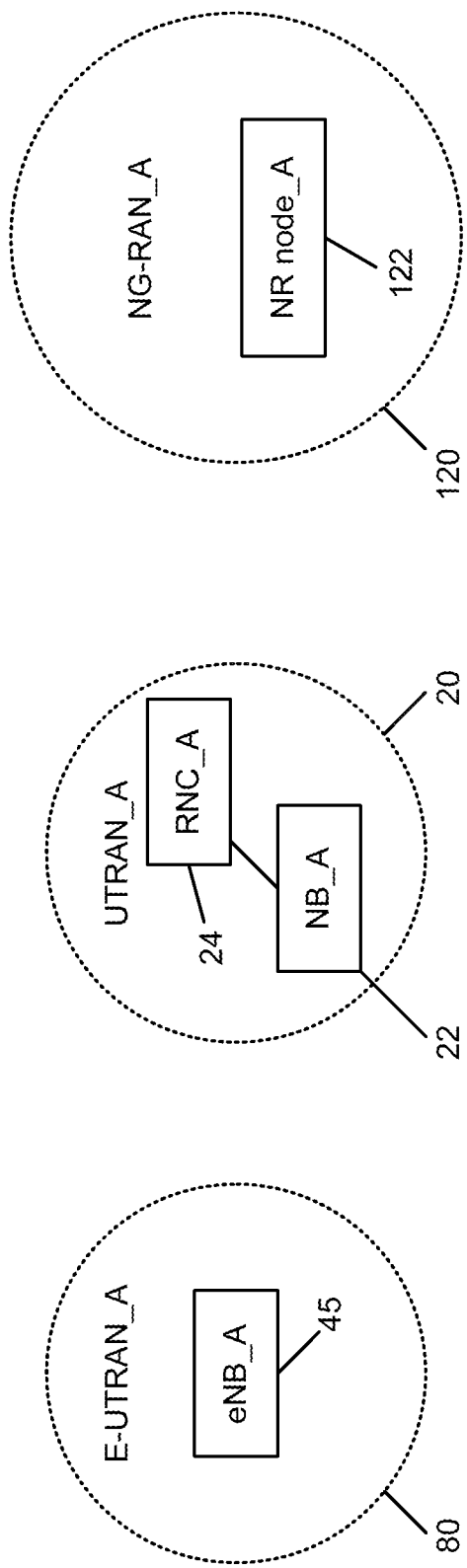
FIG. 2 is a schematic diagram of an example of a configuration of an access network of a radio communications system according to an aspect of the present disclosure.
Figure 3:
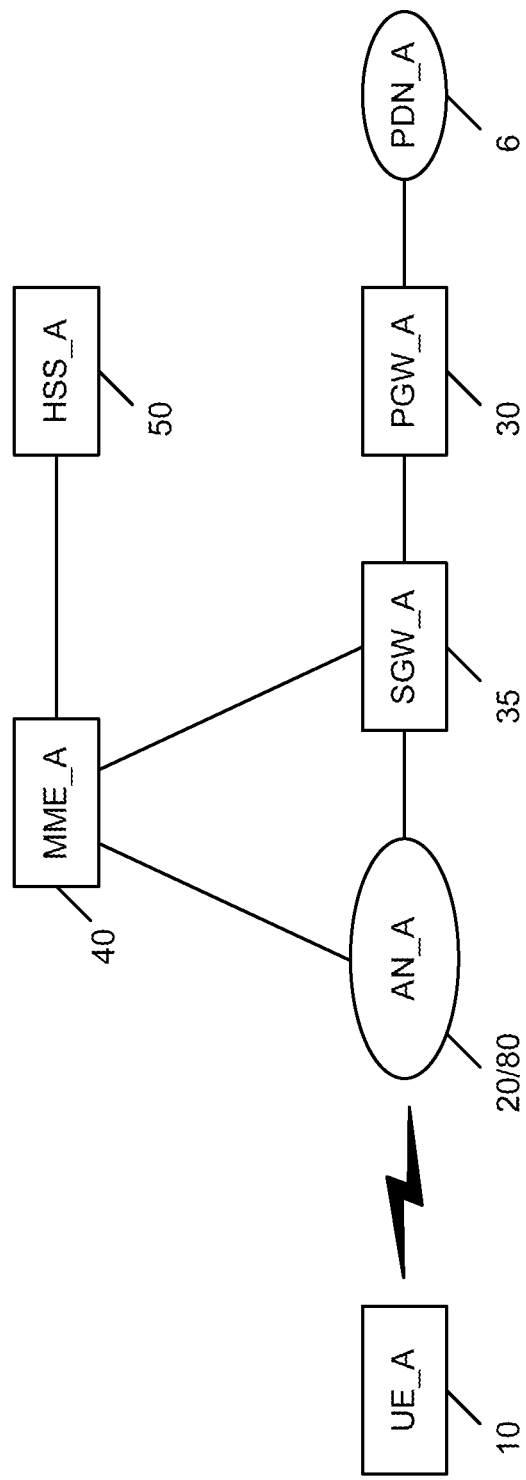
FIG. 3 is a schematic diagram of an example of a configuration of a core network_A of a radio communications system according to an aspect of the present disclosure.
Figure 4:
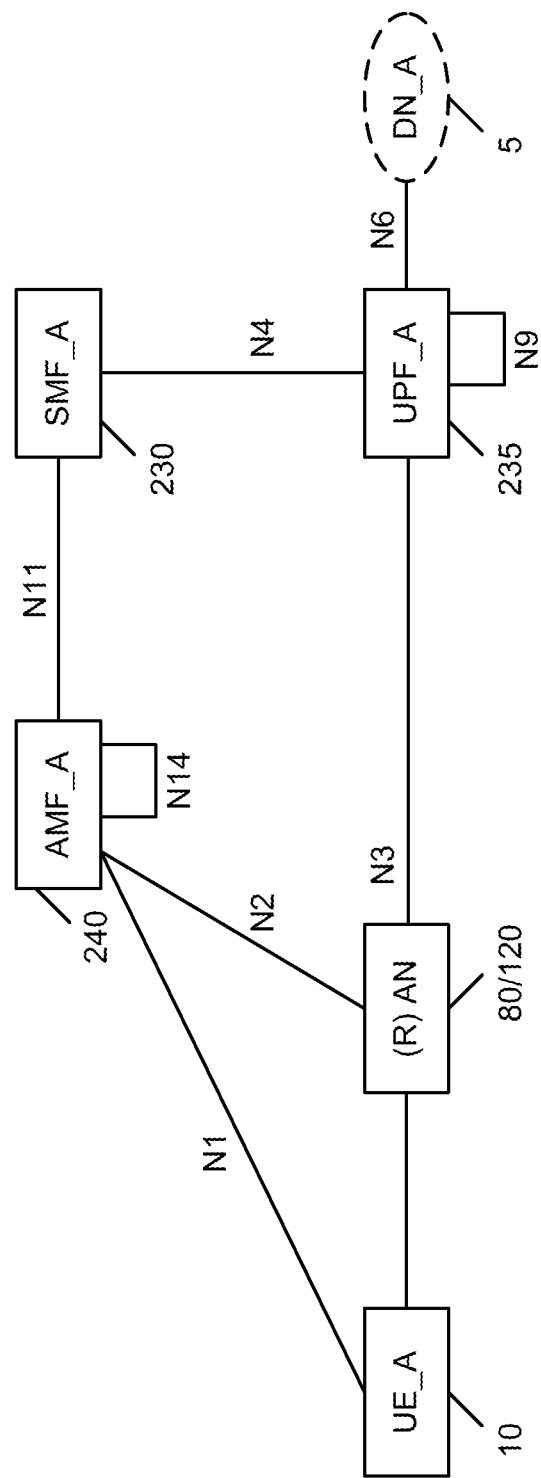
FIG. 4 is a schematic diagram of an example of a configuration of a core network_B of a radio communications system according to an aspect of the present disclosure.

An overview of the mobile communications system in the implementation will be described with reference to FIGS. 1, 2, 3, and 4. FIG. 1 is a schematic diagram of a radio communications system according to an aspect of the present disclosure. FIG. 2 is a schematic diagram of an example of a configuration of an access network of a radio communications system according to an aspect of the present disclosure. FIG. 3 is a schematic diagram of an example of a configuration of a core network_A of a radio communications system according to an aspect of the present disclosure. FIG. 4 is a schematic diagram of an example of a configuration of a core network_B of a radio communications system according to an aspect of the present disclosure. FIG. 2 is a schematic diagram illustrating the details of an access network in the mobile communications system of FIG. 1. FIG. 3 is a schematic diagram mainly illustrating the details of the core network_A 90 in the mobile communications system of FIG. 1. FIG. 4 is a schematic diagram mainly illustrating the details of the core network_B 190 in the mobile communications system of FIG. 1. As shown in FIG. 1, the mobile communications system 1 in the present implementation includes a terminal device (also referred to as a user device or a mobile terminal device) UE (User Equipment)_A 10, an access network (AN)_A 20/80, an access network_B 80/130, a core network (CN)_A 90, a core network_B 190, a packet data network (PDN)_A 6, and a data network (DN)_A 5. Furthermore, the combination of the access network_A and the core network_A 90 may be referred to as an EPS (Evolved Packet System; 4G mobile communications system), and the combination of the access network_B, the core network_B 190 and the UE_A 10 may be referred to as the 5GS (5G System; 5G mobile communications system), and the configurations of 5GS and EPS are not limited to these. Furthermore, for simplification, the core network_A 90, the core network B, or a combination thereof may be referred to as a core network, and the access network_A, the access network_B, or a combination thereof may also be referred to as an access network or a radio access network, the DN_A 5, the PDN_A 6, or a combination thereof may also be referred to as a DN.

Herein, the UE_A 10 may be a device connected to the network service via 3GPP access (also referred to as 3GPP access or 3GPP access network) and/or non-3GPP access (also referred to as non-3GPP access or non-3GPP access network). Furthermore, the UE_A 10 may include a UICC (Universal Integrated Circuit Card) and a eUICC (Embedded UICC). Furthermore, the UE_A 10 may be a terminal device, a ME (Mobile Equipment), a MS (Mobile Station), a CIoT (Cellular Internet of Things) terminal (CIoT UE) that may be wirelessly connectable, or the like.

Furthermore, the UE_A 10 may also connect to the access network and/or the core network. Furthermore, the UE_A 10 may connect to the DN_A and/or the PDN_A via the access network and/or the core network. The UE_A 10 performs user data transmission/reception (communication) between the DN_A and/or the PDN_A using a PDU (Protocol Data Unit or Packet Data Unit) session and/or a PDN (Packet Data Network) connection (also referred to as PDN connection). Furthermore, the user data communication is not limited to the IP (Internet Protocol) communications (IPv4 or IPv6). For example, it may be non-IP communications in the EPS, it may also be Ethernet (registered trademark) communications or unstructured communications in the 5GS.

Hereinafter, the IP communications is the data communications using IP, and is the data communications realized by transmitting and receiving IP packets that an IP header is added. Furthermore, the valid payload portion composing the IP packet may include the user data transmitted/received by the UE_A 10. Furthermore, non-IP communications is the data communications that does not use the IP, and the data communications realized by transmitting/receiving data that is not added with an IP header. For example, the non-IP communications may be the data communications realized by transmitting/receiving application data that is assigned with an IP address, or the user data transmitted/received by the UE_A 10 by transmitting/receiving with attaching header such as a MAC header or an Ethernet (registered trademark) frame header.

Furthermore, a PDU session is the connectivity established between the UE_A 10 and the DN_A 5 for providing a PDU connection service. More specifically, the PDU session may be the connectivity established between the UE_A 10 and the external gateway. Herein, the external gateway may be a UPF, a PGW (Packet Data Network Gateway), or the like. Furthermore, the PDU session may be a communications channel established for transmitting/receiving user data between the UE_A 10 and the core network and/or the DN, or may be a communication channel for transmitting/receiving the PDU. Furthermore, the PDU session may be a session established between the UE_A 10 and the core network and/or the DN, and is a logical communications channel composed of channels such as one or more bearers between each device in the mobile communication system 1. More specifically, the PDU session may be the connection established between the UE_A 10 and the core network_B 190 and/or an external gateway, or a connection established between the UE_A 10 and the UPF. Furthermore, the PDU session may be the connectivity and/or connection between the UE_A 10 and the UPF_A 235 (as illustrated in FIG. 4) via the NR node_A 122 (as illustrated in FIG. 2). Furthermore, the PDU session may be identified by a PDU session identification (ID) and/or an EPS bearer ID.

Furthermore, the UE_A 10 may use the PDU session to execute the transmission/reception of user data with devices such as application servers configured in the DN_A 5. In other words, the PDU session may transfer user data transmitted and received between UE_A 10 and devices such as application servers configured in the DN_A 5. Furthermore, each device (UE_A 10, a device in the access network, and/or a device in the core network, and/or a device in the data network) may manage the PDU session in association with one or more pieces of identification information. Furthermore, these identification information may include at least one of APN (Access Point Name), TFT (Traffic Flow Template), session type, application identification information, DN_A 5 identification information, NSI (Network Slice Instance) identification information, and DCN (Dedicated Core Network) identification information and access network identification information, or other information. Furthermore, when a plurality of PDU sessions are established, each piece of identification information associated with the PDU session may be of the same content or different content. Furthermore, the NSI identification information is the information that identifies the NSI, and may be the NSI ID or Slice Instance ID as described below.

Furthermore, as shown in FIG. 2, as the access network_A and the access network_B, it may be any one of the UTRAN (Universal Terrestrial Radio Access Network)_A 20, the E-UTRAN (Evolved Universal Terrestrial Radio Access Network)_A 80, the NG-RAN (5G-RAN)_A 120. Furthermore, hereinafter, the UTRAN_A 20 and/or the E-UTRAN_A 80 and/or the NG-RAN_A120 may be referred to as the 3GPP access or the 3GPP access network, and the radio LAN access network and the non-3GPP AN may be referred to as the non-3GPP access or the non-3GPP access network. Each radio access network includes a device that the UE_A 10 actually connects to (for example, a base station device or an access point).

For example, the E-UTRAN_A 80 is an LTE access network composed of one or more eNB_A 45. The eNB_A 45 is a radio base station that the UE_A 10 connects to via the E-UTRA (Evolved Universal Terrestrial Radio Access). Furthermore, when there are a plurality of eNBs in the E-UTRAN_A 80, each eNB may be connected to each other.

Furthermore, the NG-RAN_A 120 is a 5G access network, which may also be the (R) AN in FIG. 4, composed of one or more NR node (New Radio Access Technology node)_A 122 and/or the ng-eNB. Furthermore, the NR node_A 122 is a radio base station that the UE_A 10 connects to via the 5G radio access, and may also be referred to as gNB. Furthermore, the ng-eNB may be an eNB (E-UTRA) that composes the 5G access network, may be connected to the core network_B 190 via the NR node_A, or may be directly connected to the core network_B 190. Furthermore, it may be that, when there are a plurality of NR node_A 122 and/or ng-eNB in the NG-RAN_A 120, each NR node_A 122 and/or ng-eNB may be connected to each other.

Furthermore, the NG-RAN_A120 may be an access network composed of E-UTRA and/or 5G Radio Access. In other words, the NG-RAN_A120 may include the eNB_A 45, the NR node_A 122, or both. In this situation, the eNB_A 45 and the NR node_A 122 may be the same device. Therefore, the NR node_A 122 may be replaced with the eNB_A45.

The UTRAN_A20 is an access network of a 3G mobile communication system composed of the RNC (Radio Network Controller)_A 24 and NB (Node B)_A 22. The NB_A22 is a radio base station that the UE_A 10 is connected to via the UTRA (Universal Terrestrial Radio Access), and the UTRAN_A 20 may be composed of one or more radio base stations. Furthermore, it may be that the RNC_A24 is a control unit that connects the core network_A 90 and the NB_A 22, and the UTRAN_A20 may include one or more RNCs. Furthermore, the RNC_A 24 may be connected to one or more NB_A 22.

Furthermore, in the present disclosure, the UE_A 10 connecting to each radio access network means connecting to the base station device, the access point and the like included in each radio access network, and also means that the data and signals transmitted/received are via the base station device and the access point. Furthermore, regardless of the type of access network, the control message transmitted/received between the UE_A 10 and the core network_B 190 may be the same control message. Therefore, the UE_A 10 and the core network_B 190 transmitting/receiving a message via the NR node_A 122 may be the same as the UE_A 10 and the core network_B 190 transmitting a message via the eNB_A 45.

Furthermore, the access network is a radio network connected to the UE_A 10 and/or the core network. The access network may be a 3GPP access network or a non-3GPP access network. Furthermore, the 3GPP access network may be the UTRAN_A 20, the E-UTRAN_A 80, the NG-RAN (Radio Access Network)_A 120, and the non-3GPP access network may be a radio LAN access point (e.g., WLAN Access Node (AN)). Furthermore, for connecting to the core network, the UE_A 10 may be connected to the access network, or may be connected to the core network via the access network.

Furthermore, the DN_A 5 and the PDN_A 6 are data networks that provide communications services to the UE_A 10, and may be configured as a packet data service network or may be configured for each service. Furthermore, the DN_A 5 may include a connected communications terminal. Therefore, connecting to the DN_A 5 may be connecting to the communications terminal or the server device configured to the DN_A 5. Furthermore, transmitting/receiving user data to/from the DN_A 5 may be transmitting/receiving user data to/from the communication terminal or the server device configured to the DN_A 5. Furthermore, in FIG. 1, the DN_A 5 is outside the core network, but it may be inside the core network.

Furthermore, the core network_A 90 and/or the core network_B 190 may be configured as devices in one or more core networks. Herein, the devices in the core network may be the devices that performs some or all of the processes or functions of each device included in the core network_A 90 and/or the core network_B 190. Furthermore, the device in the core network may be referred to as a core network device.

Furthermore, the core network is an IP mobile communications network operated by a mobile network operator (MNO) connected to the access network and/or the DN. The core network may be a core network for a MNO that operates and manages the mobile communications system 1, or the core network for a virtual MNO, such as MVNO (Mobile Virtual Network Operator), MVNE (Mobile Virtual Network Enabler), or a virtual mobile communications service provider. Furthermore, the core network_A 90 may be an EPC (Evolved Packet Core) composed of an EPS (Evolved Packet System), and the core network_B 190 may be a 5GC (5G Core Network) composed of a 5GS. Furthermore, the core network_B 190 may be a core network of a system that provides 5G communications service. Conversely, the EPC may be the core network_A 90 and the 5GC may be the core network_B 190. The core network_A 90 and/or the core network_B 190 is not limited to this, and may be a network for providing mobile communications service.

Subsequently, the core network_A 90 will be described. The core network_A 90 may include at least one of the HSS (Home Subscriber Server)_A 50, the AAA (Authentication Authorization Accounting), the PCRF (Policy and Charging Rules Function), the PGW_A 30, the evolved Packet Data Gateway (ePDG), the Serving Gateway (SGW)_A 35, the MME (Mobility Management Entity)_A 40, the SGSN (Serving GPRS Support Node) and Service Capability Exposure Function (SCEF). Furthermore, these may be configured as an NF (Network Function). An NF may be a processing function configured in the network. Furthermore, the core network_A 90 can be connected to a plurality of radio access networks (UTRAN_A 20, E-UTRAN_A 80).

For simplification, FIG. 3 only illustrates the HSS (HSS_A 50), the PGW (PGW_A 30), the SGW (SGW_A 35) and the MME (MME_A 40). However, it does not mean that other devices and/or NF are not included. Furthermore, for simplification, the UE_A 10 may also be referred to as the UE, the HSS_A 50 may be referred to as the HSS, the PGW_A 30 may be referred to as the PGW, the SGW_A 35 may be referred to as the SGW, the MME_A 40 may be referred to as the MME, and the DN_A 5 and/or the PDN_A 6 may be referred to as the DN or the PDN.

Hereinafter, each device included in the core network_A 90 are briefly described.

The PGW_A 30 is a relay device connected to the DN, the SGW_A 35, the ePDG, the Wireless Local Area Network (WLAN) ANa, the PCRF, and AAA, and performs user data transmission as a gateway between the DN (DN_A 5 and/or PDN_A 6) and the core network_A 90. Furthermore, the PGW_A 30 may be a gateway for IP communications and/or non-IP communications. Furthermore, the PGW_A 30 may include a function of IP communications transmission or may include a function of converting non-IP communications and IP communications. Furthermore, a plurality of such gateways may be configured in the core network_A 90. Furthermore, a plurality of gateways as configured may be gateways that connect the core network_A 90 and a single DN.

Furthermore, the U-Plane (User Plane; UP) may be a communications channel for transmitting/receiving user data, or may be composed of a plurality of bearers. Furthermore, the C-Plane (Control Plane; CP) may be a communications channel for transmitting/receiving a control message, or may be composed of a plurality of bearers.

Furthermore, the PGW_A 30 may be connected to the SGW, the DN, the UPF (User plane function) and/or the SMF (Session Management Function), or may be connected to the UE_A 10 via U-Plane. Furthermore, the PGW_A 30 may be configured with the UPF_A 235 and/or the SMF_A 230 (as illustrated in FIG. 4).

The SGW_A 35 is connected to the PGW_A 30, the MME_A 40, the E-UTRAN_A 80, the SGSN and the UTRAN_A 20, and is a relay device acting as a gateway in the user data transmission between the core network_A 90 and the 3GPP access network (UTRAN_A 20, GSM EDGE Radio Access Network (GERAN), E-UTRAN_A 80).

The MME_A 40 is connected to the SGW_A 35, the access network, the HSS_A 50, and the SCEF, and is a control device that performs position information management including mobility management and access control of the UE_A 10 via the access network. Furthermore, the MME_A 40 may include a function as a session management device that manages a session established by the UE_A 10. Furthermore, the core network_A 90 may be configured with a plurality of such control devices, and for example, a position management device that is different to the MME_A 40 may be configured. A position management device different to the MME_A40 may be connected to the SGW_A 35, the access network, the SCEF, and the HSS_A 50, like the MME_A 40. Furthermore, MME_A 40 may be connected to the AMF (Access and Mobility Management Function).

Furthermore, it may be that, when the core network_A 90 includes a plurality of MVIEs, the MMEs may be connected to each other. Thereby, the context of UE_A 10 may be transmitted/received between the MMEs. Accordingly, the MME_A 40 is a management device that transmits/receives control information related to mobility management and session management to/from the UE_A 10, in other words, a control device of a control plane (Control Plane; C-Plane; CP).

Furthermore, an example of the MME_A 40 is included in the core network_A 90 is described, however, the MME_A40 may be a management device configured in the one or more core networks or DCN or NSI, or a management device connected to the one or more core networks or DCN or NSI. Herein, the plurality of DCNs or NSIs may be used by a single network operator, or may be used by different network operators.

Also, the MME_A40 may be a relay device acting as a gateway in the user data transmission between the core network_A 90 and the access network. Furthermore, the user data transmitted/received by the MME_A 40 acting as a gateway may be small data.

Furthermore, the MME_A 40 may be an NF that have an effect on mobility management, such as the UE_A 10, or an NF that manages the one or more NSIs. Furthermore, the MME_A 40 may be an NF that have one or more of the above effects. Furthermore, the NF may be the one or more devices configured in the core network_A 90, and may be a CP function (hereinafter, CPF or Control Plane Network Function) for the control information and/or the control messages, and may be a shared CP function shared between the plurality of network slices.

Herein, the NF is a processing function configured in the network. That is, the NF may be a functional device, such as the MME, the SGW, the PGW, the CPF, the AMF, the SMF, and the UPF, or may be information relating to capabilities or functions such as MM (Mobility Management) and SM (Session Management). Furthermore, the NF may be a functional device for realizing a single function or a functional device for realizing a plurality of functions. For example, the NF for realizing the MM function and the NF for realizing the SM function may exist separately, and the NF for realizing both the MM function and the SM function may exist.

The HSS_A 50 is a management node connected to the MME_A 40, the AAA, and the SCEF, and performs subscriber information management. The subscriber information of the HSS_A 50 is referred to, for example, during the access control of MME_A 40. Furthermore, the HSS_A 50 may be connected to a position management device different to the MME_A 40. For example, the HSS_A 50 may be connected to the CPF_A 140.

Furthermore, in the HSS_A 50, the UDM (Unified Data Management)_A 245 may be configured as different devices and/or NFs, or may be configured as the same device and/or NFs.

The AAA is connected to the PGW 30, the HSS_A 50, the PCRF and the WLAN ANa 70, and performs access control of UE_A 10 connected via WLAN ANa 70.

The PCRF is connected to the PGW_A 30, the WLAN ANa 75, the AAA, the DN_A 5 and/or the PDN_A 6, and performs management for data delivery Quality of Service (QoS). For example, it performs management for the QoS of the communications channel between the UE_A 10 and the DN_A 5 and/or the PDN_A 6. Furthermore, the PCRF may be a device that creates and/or manages the PCC (Policy and Charging Control) rules and/or the routing rules used when each device transmits/receives user data.

Furthermore, the PCRF may be a PCF (Policy Control Function) that creates and/or manages policies. More specifically, the PCRF may be connected to the UPF_A 235.

The ePDG is connected to the PGW 30 and the WLAN ANb 75, and performs the user data delivery acting as a gateway between the core network_A 90 and the WLAN ANb 75.

The SGSN is connected to the UTRAN_A 20, the GERAN and the SGW_A 35, and is a control device for position management between the 3G/2G access network (UTRAN/GERAN) and the LTE (4G) access network (E-UTRAN). Furthermore, the SGSN has a selection function of the PGW and the SGW, a UE_A 10 time zone management function, and a MME_A 40 selection function during handover to E-UTRAN.

The SCEF is connected to the DN_A 5 and/or the PDN_A 6, the MME_A 40, the HSS_A 50, and is a relay device acting as a gateway in the user data transmission connecting between the DN_A 5 and/or the PDN_A 6 and the core network_A 90. Furthermore, the SCEF may be a gateway for the non-IP communications. Furthermore, the SCEF may have a function of converting the non-IP communications and the IP communications. Furthermore, the core network_A 90 may be configured with a plurality of such gateways. Furthermore, a plurality of gateways connecting the core network_A 90 and a single DN_A 5 and/or the PDN_A 6 and/or the DN may also be configured. Furthermore, the SCEF may be configured outside of the core network, or inside the core network.

Subsequently, the core network_B 190 will be described. The core network_B 190 may include the AUSF (Authentication Server Function), the AMF (Access and Mobility Management Function)_A 240 (as illustrated in FIG. 4), the UDSF (Unstructured Data Storage Function), the NEF (Network Exposure Function), the NRF (Network Repository Function), the PCF (Policy Control Function), the SMF (Session Management Function)_A 230, the UDM (Unified Data Management), the UPF (User Plane Function)_A 235 (as illustrated in FIG. 4), the AF (Application Function), the N3IWF (Non-3GPP InterWorking Function). Furthermore, these may be configured as an NF (Network Function). An NF may refer to a processing function configured in the network.

For simplification, FIG. 4 only illustrates the AMF (AMF_A 240), the SMF (SMF_A 230), and the UPF (UPF_A 235) therein, however, it does not mean devices (device and/or NFs) others than these are not included. Furthermore, for simplification, the UE_A 10 may also be referred to as the UE, the AMF_A 240 may be referred to as the AMF, the SMF_A 230 may be referred to as the SMF, the UPF_A 235 may be referred to as the UPF, and the DN_A 5 may be referred to as the DN.

Furthermore, FIG. 4 illustrates an N1 interface (hereinafter also referred to as a reference point), an N2 interface, an N3 interface, an N4 interface, an N6 interface, an N9 interface, and an N11 interface. Herein, the N1 interface is the interface between the UE and the AMF, the N2 interface is the interface between the (R) AN (access network) and the AMF, the N3 interface is the interface between the (R) AN (access network) and the UPF, the N4 interface is the interface between the SMF and the UPF, the N6 interface is the interface between the UPF and the DN, the N9 interface is the interface between the UPF and the UPF, the N11 interface is the interface between the AMF and the SMF. Communications may be performed between each device using these interfaces. Hereinafter, (R) AN may also be referred to as the NGRAN.

Hereinafter, each device included in the core network_B 190 are briefly described.

Firstly, the AMF_A 240 is connected to other AMFs, SMFs (SMF_A 230), access networks (that is, UTRAN_A 20, E-UTRAN_A 80, NG-RAN_A 120), UDM, AUSF, and PCF. The AMF_A 240 may have effects in the following: registration management, connection management, reachability management, mobility management such as the UE_A 10, Session Management (SM) message transmission between the UE and the SMF, access authentication, Security Anchor Function (SEA), Security Context Management (SCM), supporting the N2 interface for the N3IWF, supporting the NAS signal transmission/reception with UE via N3IWF, authentication of the UE connecting via N3IWF, management of registration management (RM) states, management of connection management (CM) states. Furthermore, the one or more AMF_A 240 may be configured in the core network_B 190. Furthermore, the AMF_A240 may be an NF that manages one or more NSI (Network Slice Instance). Furthermore, the AMF_A240 may be a shared CP function (CCNF; Control Plane Network Function) that is shared between multiple NSIs.

Furthermore, for the RM state, there are a non-registered state (RM-DEREGISTERED state) and a registered state (RM-REGISTERED state). In the RM-DEREGISTERED state, the UE is not registered in the network, so that the UE context of the AMF does not have valid location information or routing information for said UE, therefore, the AMF cannot reach the UE. Furthermore, in the RM-REGISTERED state, the UE is registered in the network, the UE may receive services that requires registration with the network.

Furthermore, for the CM state, there are a non-connection state (CM-IDLE state) and a connection state (CM-CONNECTED state). In the CM-IDLE state, the UE is in the RM-REGISTERED state, but does not have a NAS signaling connection established with the AMF via the N1 interface. Furthermore, in the CM-IDLE state, the UE does not have the N2 interface connection (N2 connection) and the N3 interface connection (N3 connection). On the other hand, in the CM-CONNECTED state, it has a NAS signaling connection established with the AMF via the N1 interface. Furthermore, in the CM-CONNECTED state, the UE may have the N2 interface connection (N2 connection) and/or the N3 interface connection (N3 connection).

Furthermore, the SMF_A 230 may have the following functions: session management (SM) function such as PDU session, IP address allocation (IP address allocation) for the UE and its management function, UPF selection and control function, configuration function of UPF that routes traffic to an appropriate destination, function of notifying that downlink data has arrived (Downlink Data Notification), function of providing SM information that is AN-specific (for each AN) transmitted to AN via the N2 interface through AMF, function to determine SSC mode (Session and Service Continuity mode) for a session, a roaming function, etc. Furthermore, the SMF_A 230 may be connected to the AMF_A 240, the UPF_A 235, the UDM, and the PCF.

Furthermore, the UPF_A 235 is connected to the DN_A 5, the SMF_A 230, other UPFs, and access networks (that is, UTRAN_A 20, E-UTRAN_A 80, and NG-RAN_A 120). The UPF_A 235 may have effects in the following: an UL-CL (Uplink Classifier) function that supports anchors for intra-Radio Access Technology (RAT) mobility or inter-RAT mobility, routing and forwarding of packets (Packet routing & forwarding), and routing of multiple communications traffic flows for one DN, branching point function that supports multi-homed PDU sessions, and trigger functions of QoS processing for user plane, uplink traffic verification, downlink packet buffering, and downlink data notification. Furthermore, the UPF_A 235 may be a relay device acting as a gateway in the user data transmission between the DN_A 5 and the core network_B 190. The UPF_A 235 may be a gateway for IP communications and/or non-IP communications. Furthermore, the UPF_A 235 may have a transmission function of IP communications, or may have a function of converting non-IP communications and IP communications. Furthermore, the plurality of gateways as configured may be gateways that connect the core network_B 190 and a single DN. Furthermore, the UPF_A 235 may have connectivity with other NFs, and may be connected to each device via other NFs.

Furthermore, between the UPF_A 235 and the access network, there may exist the UPF_C 239 (may be referred to as branching point or uplink classifier) that is a UPF different to the UPF_A235 as a device or an NF. When the UPF_C 239 is present, the PDU session between the UE_A 10 and the DN_A 5 is established via the access network, the UPF_C 239, the UPF_A 235.

Furthermore, the AUSF is connected to the UDM and the AMF_A 240. The AUSF may function as an authentication server.

The UDSF provides functions for all NFs to store and retrieve information as unstructured data.

The NEF provides a method for securely providing the services and capabilities provided by the 3GPP network. The information received from other NFs is saved as structured data.

When the NRF receives an NF discovery request from an NF instance, it provides the NF with information about the discovered NF instance, or information for holding available NF instances, information of the services supported by said instance.

The PCF is connected to the SMF (SMF_A 230), the AF, and the AMF_A 240. The policy rules and the like are provided.

The UDM is connected to the AMF_A 240, the SMF (SMF_A 230), the AUSF, and the PCF. The UDM includes the UDM FE (application front end) and UDR (User Data Repository). The UDM FE performs processing such as credential information, location management, and subscriber management (subscription management). The UDR saves the required data provided by the UDM FE and the policy profiles required by PCF.

The AF is connected to the PCF. The AF influences traffic routing or participates in policy control.

The N3IWF provides the following functions: establishing an IPsec tunnel with the UE, relaying of the NAS (N1) signaling between the UE and the AMF, processing the N2 signaling transmitted from the SMF and relayed by the AMF, and establishing IPsec Security Association (IPsec SA), relaying user plane packets between the UE and the UPF, and selecting the AMF.

Furthermore, the S1 mode is a UE mode that may perform the transmitting/receiving of messages using the S1 interface. Furthermore, the S1 interface may be composed of an S1-MIE interface, an S1-U interface, and an X2 interface that connects the radio base stations.

Furthermore, a UE in the S1 mode may access an EPC via the eNB that provides the E-UTRA function or an EPC via the en-gNB that provides the NR function.

Furthermore, the access to the EPC via the eNB that provides the E-UTRA function and the access to the EPC via the en-gNB that provides the NR function are set as the S1 mode, however, each of the accesses may be configured as a different mode.

Furthermore, the N1 mode is a UE mode in which the UE may access the 5GC via the 5G access network. Furthermore, the N1 mode may be a UE mode in which transmitting/receiving a message may be performed using the N1 interface. Furthermore, the N1 interface may be composed of an Xn interface that connects the N1 interface and the radio base station.

A UE in the N1 mode may access, for example, the 5GC via the ng-eNB that provides the E-UTRA function or the 5GC via the gNB that provides the NR function.

Furthermore, the access to the 5GC via the ng-eNB that provides the E-UTRA function and the access to the 5GC via the gNB that provides the NR function are set as the N1 mode, however, each of the accesses may be configured as a different mode.

[1.2. Configuration of Each Device]

Hereinafter, the configuration of each device will be described. Furthermore, some or all of the functions of each device and each unit of each device described hereinafter may be operated on physical hardware, or on logical hardware virtually configured on general-purpose hardware.

[1.2.1. Configuration of UE]

Figure 5:
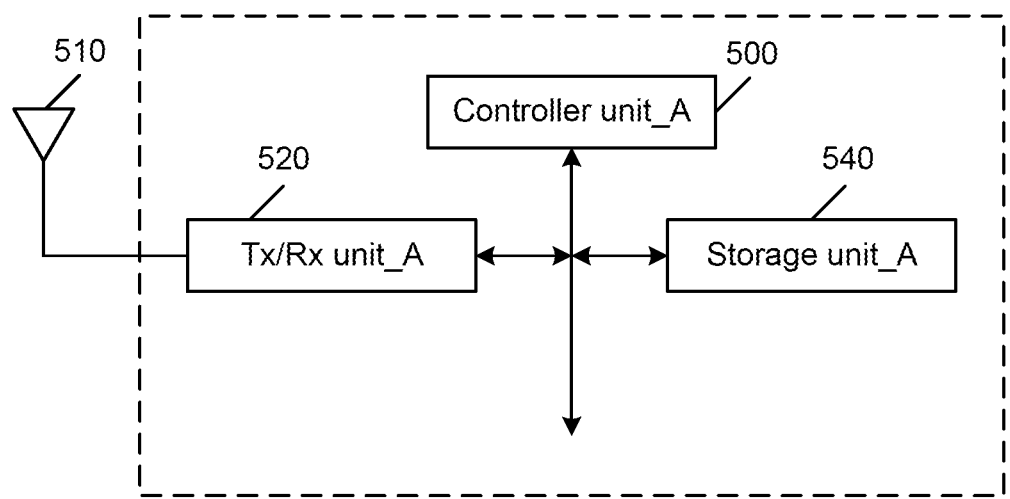
FIG. 5 is a schematic diagram of a configuration of a UE according to an aspect of the present disclosure.

FIG. 5 is a schematic diagram of a configuration of a UE according to an aspect of the present disclosure. As shown in FIG. 5, the UE_A 10 includes a controller unit_A 500, a transmission (Tx)/reception (Rx) unit_A 520, and a storage unit_A 540. The transmission/reception unit_A 520 and the storage unit_A 540 are connected to the control unit_A 500 via a bus. Furthermore, the transmission/reception_A 520 is connected to an external antenna 510.

The control unit_A 500 is a functional unit for controlling the entire UE_A 10, and realizes various processes of the entire UE_A 10 by reading and executing various information and programs stored in the storage unit_A 540.

The transmission/reception unit_A 520 is a functional unit for the UE_A 10 to connect to the base stations (UTRAN_A 20 and E-UTRAN_A 80 and NG-RAN_A 120) and/or the wireless LAN access point (WLAN AN) in the access network and to connect to the access network. In other words, the UE_A 10 may connect to the base station and/or the access point in the access network via the external antenna 410 connected to the transmission/reception unit_A 520. Specifically, the UE_A 10 may transmit/receive user data and/or control information between the base station and/or the access point in the access network via the external antenna 410 connected to the transmission/reception unit_A 520.

The storage unit_A 540 is a functional unit that stores programs and data required for each operation of the UE_A 10, and may be configured by, for example, semiconductor memory, HDD (Hard Disk Drive), SSD (Solid State Drive), and the like. The storage unit_A 540 stores identification information, control information, flags, parameters, rules, policies included in the control messages transmitted/received in a communication procedure described hereinafter.

[1.2.2. Enb/Nr Node]

Figure 6:
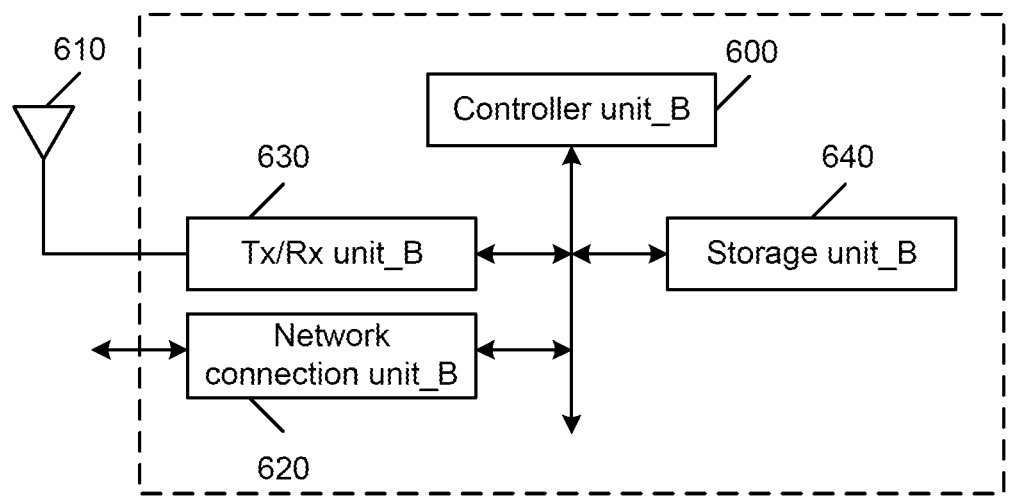
FIG. 6 is a schematic diagram of a configuration of an Evolved Node B (eNB)/NR node device according to an aspect of the present disclosure.

FIG. 6 is a schematic diagram of a configuration of an eNB/NR node device according to an aspect of the present disclosure. FIG. 6 illustrates an example of the device configuration of the eNB_A 45 and the NR node_A 122 as illustrated in FIG. 2. As shown in FIG. 6, the eNB_A 45 and the NR node_A 122 include a controller unit_B 600, a network connection unit_B 620, a Tx/Rx unit_B 630, and a storage unit_B 640. The network connection unit_B 620, the transmission/reception unit_B 630, and the storage unit_B 640 are connected to the control unit_B 600 via a bus. Furthermore, the Tx/Rx_B 630 is connected to an external antenna 610.

The control unit_B 600 is a functional unit for controlling the entire eNB_A 45 and the NR node_A 122, and realizes various processes of the entire eNB_A 45 and the NR node_A 122 by reading and executing various information and programs stored in the storage unit_B 640.

The network connection part_B 620 is a functional part for the eNB_A 45 and the NR node_A 122 to connect with the AMF_A 240 and the UPF_A 235 in the core network. In other words, the eNB_A 45 and NR node_A 122 may be connected to the AMF_A 240 and UPF_A 235 in the core network via the network connection unit_B 620. Specifically, the eNB_A 45 and the NR node_A 122 may transmit/receive user data and/or control information between the AMF_A 240 and/or the UPF_A 235 via the network connection unit_B 620.

The transmission/reception unit_B 630 is a functional unit for the eNB_A 45 and NR node_A 122 to connect to the UE_A 10. In other words, the eNB_A 45 and NR node_A 122 may transmit/receive user data and/or control information between the transmission/reception unit_B 630 and the UE_A 10.

The storage unit_B 640 is a functional unit that stores programs and data required for each operation of the eNB_A 45 and NR node_A 122. The storage unit_B 640 may be configured by, for example, semiconductor memory, HDD, SSD, and the like. The storage unit_B 640 stores identification information, control information, flags, parameters included in the control messages transmitted/received in a communication procedure described hereinafter. The storage unit_B 640 may store the information as a context for each UE_A 10.

[1.2.3. Configuration of MME/AMF]

Figure 7:
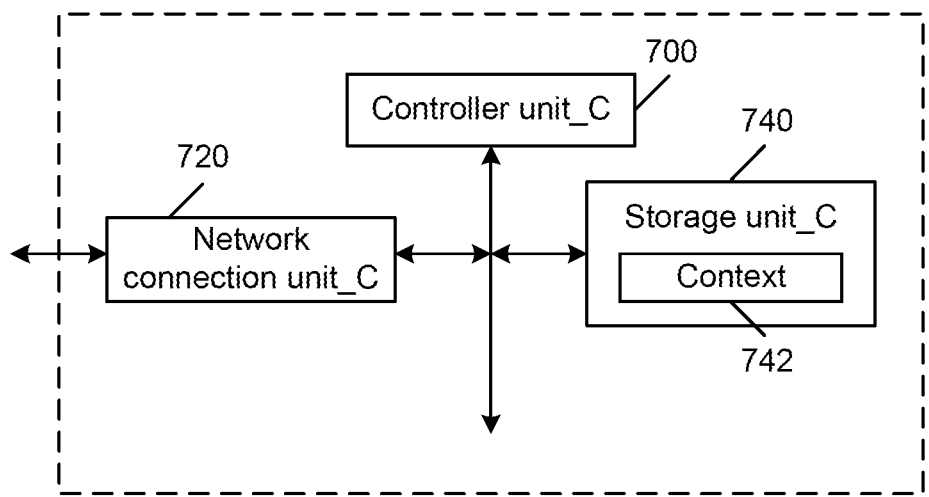
FIG. 7 is a schematic diagram of a configuration of a Mobility Management Entity (MME)/Access and Mobility Management Function (AMF). device according to an aspect of the present disclosure.

FIG. 7 is a schematic diagram of a configuration of a Mobility Management Entity (MME)/Access and Mobility Management Function (AMF) according to an aspect of the present disclosure. FIG. 7 illustrates an example of the device configuration of the MME_A 40 in FIG. 3 or AMF_A 240 in FIG. 4. As shown in FIG. 7, the MME_A 40 or AMF_A 240 includes a control unit_C 700, a network connection unit_C 720, and a storage unit_C 740. The network connection unit_C 720 and the storage unit_C 740 are connected to the control unit_C 700 via a bus. The storage unit_C 740 also stores the context 642.

The control unit_C 700 is a functional unit for controlling the entire MME_A40 or AMF_A240, and realizes various processes of the entire AMF_A 240 by reading and executing various information and programs stored in the storage unit_C 740.

The network connection unit_C 720 is a functional unit for the MME_A 40 or the AMF_A 240 to connect with the other MME_A 40, AMF_A 240, SMF_A 230, the base station (UTRAN_A 20 and E-UTRAN_A 80 and NG-RAN_A 120, as illustrated in FIG. 4) in the access network and/or the wireless LAN access point (WLAN AN), the UDM, the AUSF, the PCF. In other words, the MME_A40 or AMF_A240 may transmit/receive user data and/or control information between the base station and/or access point in the access network, the UDM, the AUSF, the PCF via the network connection unit_C 720.

The storage unit_C 740 is a functional unit that stores programs and data required for each operation of the MME_A 40 or the AMF_A 240. The storage unit_C 740 may be configured by, for example, semiconductor memory, HDD, SSD, and the like. The storage unit_C 740 stores identification information, control information, flags, parameters included in the control messages transmitted/received in a communication procedure described hereinafter. The context 642 stored in the storage unit_C 740 may be a context stored for each UE, a context stored for each PDU session, or a context stored for each bearer. The context stored for each UE may include the IMSI, the Mobile Station International Subscriber Directory Number (MSISDN), the MM State, the GUTI (Globally Unique Temporary Identity), the ME Identity, the UE Radio Access Capability, the UE Network Capability, the MS Network Capability, the Access Restriction, the MMEF-TEID, the SGW F-TEID, the eNB Address, the MME UE S lAP ID, the eNB UE S lAP ID, the NR node Address, the NR node ID, the WAG Address, and the WAG ID. Furthermore, the context stored for each PDU session may include the APN in Use, the Assigned Session Type, the IP Address(es), the PGW F-TEID, the SCEF ID, and the Default bearer. Furthermore, the context stored for each bearer may include the EPS Bearer ID, the TI, the TFT, the SGW F-TEID, the PGW F-TEID, the MME F-TEID, the eNB Address, the NR node Address, the WAG Address, the eNB ID, the NR node ID, and the WAG ID.

[1.2.4. Configuration of SMF]

Figure 8:
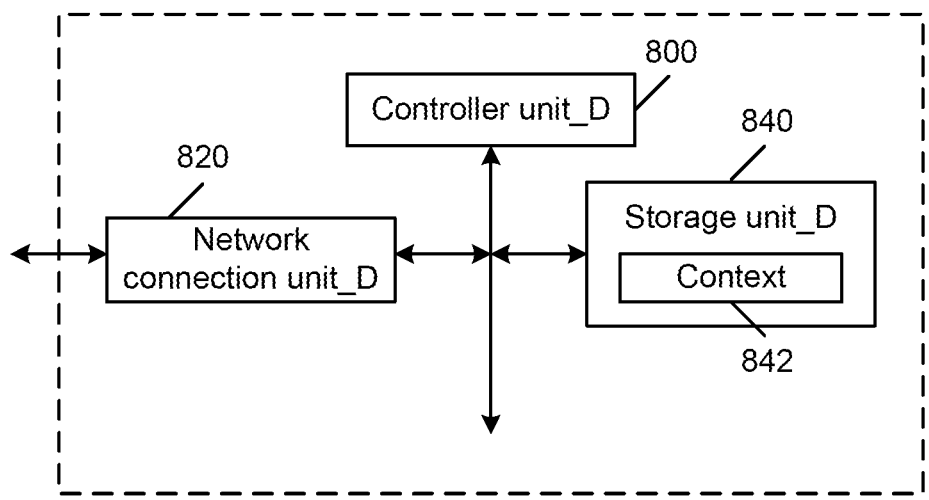
FIG. 8 is a schematic diagram of a configuration of a Session Management Function (SMF)/Packet Data Network Gateway (PGW)/User plane function (UPF) device according to an aspect of the present disclosure.

FIG. 8 is a schematic diagram of a configuration of a Session Management Function (SMF)/Packet Data Network Gateway (PGW)/UPF device according to an aspect of the present disclosure. FIG. 8 illustrates an example of the device configuration of the SMF_A 230 as illustrated in FIG. 4. As shown in FIG. 8, the SMF_A 230 includes a controller unit_D 800, a network connection unit_D 820, and a storage unit_D 840. The network connection unit_D 820 and the storage unit_D 840 are connected to the control unit_D 800 via a bus. Furthermore, the storage unit_D 840 stores the context 842.

The control unit_D 800 of SMF_A 230 is a functional unit for controlling the entire SMF_A 230, and realizes various processes of the entire SMF_A 230 by reading and executing various information and programs stored in the storage unit_D 840.

Furthermore, the network connection unit_D 820 of SMF_A 230 is a functional unit for the SMF_A 230 to connect with the AMF_A 240 as illustrated in FIG. 4, the UPF_A 235, the UDM, and the PCF. In other words, the SMF_A 230 may transmit/receive user data and/or control information between the AMF_A 240, the UPF_A 235, the UDM, and the PCF via the network connection unit_D 820.

Furthermore, the storage unit_D 840 of SMF_A 230 is a functional unit that stores programs and data required for each operation of the SMF_A 230. The storage unit_D 840 of SMF_A 230 may be configured by, for example, semiconductor memory, HDD, SSD, and the like. The storage unit_D 840 of SMF_A 230 stores identification information, control information, flags, parameters included in the control messages transmitted/received in a communication procedure described hereinafter. Furthermore, the context 742 stored in the storage unit_D 840 of the SMF_A 230 may be a context stored for each UE, a context stored for each APN, a context stored for each PDU session, or a context stored for each bearer. The context stored for each UE may include the International Mobile Subscriber Identity (IMSI), the ME Identity, the MSISDN, and the RAT type. The context stored for each APN may include the APN in use. Furthermore, the context stored for each APN may be stored for each Data Network Identifier. The context stored for each PDU session may include the Assigned Session Type, the IP Address(es), the SGW F-TEID, the PFW Full Qualified—Tunnel Endpoint Identifier (PGWF-TEID), and the Default Bearer. The context stored for each bearer may include the EPS Bearer ID, the TFT, the SGW F-TEID, and the PGW F-TEID.

[1.2.5. Configuration of PGW/UPF]

Subsequently, FIG. 8 illustrates an example of the device configuration of the PGW_A 30 or the UPF_A 235 as illustrated in FIG. 4. As shown in FIG. 8, the PGW_A30 or UPF_A235 each includes a control unit_D 800, a network connection unit_D 820, and a storage unit_D 840. The network connection unit_D 820 and the storage unit_D 840 are connected to the control unit_D 800 via a bus. Furthermore, the storage unit_D 840 stores the context 742.

The control unit_D 800 of the PGW_A 30 or UPF_A 235 is a functional unit for controlling the entire PGW_A 30 or UPF_A 235, and realizes various processes of the entire PGW_A 30 or UPF_A 235 by reading and executing various information and programs stored in the storage unit_D 840.

Furthermore, the network connection unit_D 820 of the PGW_A 30 or UPF_A 235 is a functional unit for the PGW_A 30 or UPF_A 235 to connect with the DN (i.e. DN_A 5), the SMF_A 230, the other UPF_A 235, and the access network (i.e. UTRAN_A 20, E-UTRAN_A 80, and NG-RAN_A 120). In other words, the UPF_A 235 may transmit/receive user data and/or control information between the DN (i.e. DNA 5), the SMF_A 230, the other UPF_A 235 and the access network (i.e. UTRAN_A 20 and E-UTRAN_A 80 and NG-RAN_A 120) via the network connection unit_D 820.

Furthermore, the storage unit_D 840 of the UPF_A 235 is a functional unit that stores programs and data required for each operation of the UPF_A 235. The storage unit_D 840 of the UPF_A 235 may be configured by, for example, semiconductor memory, HDD, SSD, and the like. The storage unit_D 840 of the UPF_A 235 stores identification information, control information, flags, parameters included in the control messages transmitted/received in a communication procedure described hereinafter. Furthermore, the context 742 stored in the storage unit_D 840 of the UPF_A 235 may be a context stored for each UE, a context stored for each APN, a context stored for each PDU session, or a context stored for each bearer. The context stored for each UE may include the IMSI, the ME Identity, the MSISDN, and the RAT type. The context stored for each APN may include the APN in use. Furthermore, the context stored for each APN may be stored for each Data Network Identifier. The context stored for each PDU session may include the Assigned Session Type, the IP Address(es), the SGW F-TEID, the PGWF-TEID, and the Default Bearer. The context stored for each bearer may include the EPS Bearer ID, the TFT, the SGW F-TEID, and the PGW F-TEID.

[1.2.6. Information Stored in the Storage Unit of Each Device]

Hereinafter, each information stored in the storage unit of each device will be described.

The IMSI (International Mobile Subscriber Identity) is permanent identification information of the subscriber (user), and is identification information assigned to the user that uses the UE. The IMSI stored by the UE_A 10 and the MME_A 40/CPF_A 140/AMF_A 2400 and the SGW_A 35 may be equal to the IMSI stored by the HSS_A 50.

The EMM State/MM State indicates the mobility management state of the UE_A 10 or the MME_A 40/CPF_A 140/AMF_A 240. For example, the EMM State/MM State may be an EMM-REGISTERED state (registered state) in which the UE_A 10 is registered in the network, and/or an EMM-DEREGISTERD state (unregistered state) in which the UE_A 10 is not registered in the network. Furthermore, the EMM State/MM State may be an ECM-CONNECTED state in which the connection between the UE_A 10 and the core network is maintained, and/or an ECM-IDLE state in which the connection is released. Furthermore, the EMM State/MM State may be information that may distinguish between the state in which the UE_A 10 is registered in the EPC and the state in which the UE_A 10 is registered in the NGC or 5GC.

The GUTI (Globally Unique Temporary Identity) is temporary identification information of the UE_A 10. The GUTI is composed of the MME_A 40/CPF_A 140/AMF_A 240 identification information (GUMMEI (Globally Unique MME Identifier)) and specific MME_A 40/CPF_A 140/AMF_A 240 identification information (M-TMSI (M-Temporary Mobile Subscriber Identity)). The ME Identity is an ID of the UE_A 10 or ME, and may be, for example, the IMEI (International Mobile Equipment Identity) or the IMEISV (IMEI Software Version). The MSISDN indicates the basic telephone number of the UE_A 10. The MSISDN stored by the MME_A 40/CPF_A 140/AMF_A 240 may be the information indicated by the storage unit of the HSS_A 50. Furthermore, the GUTI may include information that identifies the CPF_A 140.

The MME F-TEID is information that identifies the MME_A 40/CPF_A 140/AMF_A 240. The MMEF-TEID may include the IP address of the MME_A 40/CPF_A 140/AMF_A 240, may include the TEID (Tunnel Endpoint Identifier) of the MME_A 40/CPF_A 140/AMF_A 240, or both. Furthermore, the IP address of the MME_A 40/CPF_A 140/AMF_A 240 and the TEID of the MME_A 40/CPF_A 140/AMF_A 240 may be stored independently. Furthermore, the MME F-TEID may be identification information for user data or identification information for control information.

The SGW F-TEID is information that identifies the SGW_A 35. The SGW F-TEID may include the IP address of SGW_A 35, the TEID of SGW_A35, or both. Furthermore, the IP address of SGW_A 35 and the TEID of SGW_A 35 may be stored independently. The SGW F-TEID may be identification information for user data or identification information for control information.

The PGW F-TEID is information that identifies the PGW_A 30/UPGW_A 130/SMF_A 230/UPF_A 235. The PGW F-TEID may include the IP address of PGW_A 30/UPGW_A 130/SMF_A 230/UPF_A 235, may include the TEID of PGW_A 30/UPGW_A 130/SMF_A 230/UPF_A 235, or both. Furthermore, the IP address of PGW_A 30/UPGW_A 130/SMF_A 230/UPF_A 235 and the TEID of PGW_A 30/UPGW_A 130/SMF_A 230/UPF_A 235 may be stored independently. Furthermore, the PGW F-TEID may be identification information for user data or identification information for control information.

The eNB F-TEID is information that identifies the eNB_A 45. The eNB F-TEID may include the IP address of the eNB_A 45, the TEID of the eNB_A 45, or both. Furthermore, the IP address of the eNB_A 45 and the TEID of SGW_A 35 may be stored independently. Furthermore, the eNB F-TEID may be identification information for user data or identification information for control information.

Furthermore, the APN may be identification information that identifies the core network and the external network such as a DN. Furthermore, the APN can also be used as information for selecting a gateway such as the PGW_A 30/UPGW_A 130/UPF_A 235 that connects the core network_A 90. Furthermore, the APN may be a DNN (Data Network Name). Therefore, the APN may be expressed as a DNN or the DNN may be expressed as APN.

Furthermore, the APN may be identification information that identifies said gateway, or identification information that identifies the external network such as a DN. Furthermore, when a plurality of gateways that connect the core network and the DN are configured, there may be a plurality of gateways that can be selected by the APN. Furthermore, one gateway may be selected from the plurality of gateways by another method using identification information other than APN.

The UE Radio Access Capability is identification information indicating the radio access capability of the UE_A 10. The UE Network Capability includes the security algorithms and the key derivation functions supported by the UE_A 10. The MS Network Capability is information that includes one or more pieces of information required for the SGSN_A 42 for the UE_A 10 having the GERAN_A 25 and/or UTRAN_A 20 functions. The Access Restriction is registration information of access restriction. The eNB Address is the IP address of the eNB_A 45. The MME UE S1AP ID is information that identifies the UE_A 10 in the MME_A 40/CPF_A 140/AMF_A 240. The eNB UE S1 AP ID is information that identifies the UE_A 10 in the eNB_A 45.

The APN in Use is the APN recently used. The APN in Use may be a Data Network Identifier. Said APN may be composed of network identification information and default network operator identification information. Furthermore, the APN in Use may be information that identifies the DN of the establishment destination of the PDU session.

The Assigned Session Type is information indicating the type of PDU session. The Assigned Session Type may be an Assigned PDN Type. The PDU session type may be IP or non-IP. Furthermore, when the PDU session type is IP, it may further include information indicating the type of PDN assigned from the network. Furthermore, the Assigned Session Type may also be IPv4, IPv6, or IPv4v6.

Furthermore, unless otherwise specified, the IP Address is the IP address assigned to the UE. The IP address may be an IPv4 address, an IPv6 address, an IPv6 prefix, or an interface ID. Furthermore, when the Assigned Session Type indicates non-IP, the IP Address element may not be included.

The DN ID is identification information that identifies the core network_B 190 and the external network such as a DN. Furthermore, the DN ID can also be used as information for selecting a gateway such as the UPGW_A 130 or PF_A 235 that connects the core network_B 190.

Furthermore, the DN ID may be identification information that identifies said gateway, or identification information that identifies the external network such as a DN. Furthermore, when a plurality of gateways connecting the core network_B 190 and the DN are configured, there may be a plurality of gateways that can be selected by the DN ID. Furthermore, one gateway may be selected from the plurality of gateways by another method using identification information other than the DN ID.

Furthermore, the DN ID may be information that is equivalent to the APN or information that is different from the APN. Furthermore, when the DN ID and the APN are different information, each device may manage the information indicating the correspondence between the DN ID and the APN, or may implement the procedure for inquiring the APN using the DN ID, or may implement the procedure for inquiring the DN ID using the APN.

The SCEF ID is the IP address of the SCEF_A 46 used in the PDU session. Furthermore, the Default Bearer is information acquired and/or generated when a PDU session is established, and is an EPS bearer identification information for identifying a default bearer corresponding to the PDU session.

The EPS Bearer ID is the identification information of the EPS bearer. Furthermore, the EPS Bearer ID may be identification information for identifying an SRB (Signaling Radio Bearer) and/or a CRB (Control-plane Radio Bearer), or may be identification information for identifying a DRB (Data Radio Bearer). The TI (Transaction Identifier) is identification information that identifies a bidirectional transaction. The EPS Bearer ID may be an EPS bearer identification information for identifying a dedicated bearer. Therefore, it may also be identification information for identifying the EPS bearer different from the default bearer. The TFT indicates all the packet filters associated with the EPS bearer. The TFT is information for identifying a part of user data transmitted/received, and the UE_A 10 transmits/receives the user data identified by the TFT using the EPS bearer associated with the TFT. In other words, the UE_A 10 transmits/receives the user data identified by TFT using RB (Radio Bearer) linked associated with the TFT. Furthermore, the TFT may associate the user data, such as transmitted/received application data, with an appropriate channel, or may be identification information for identifying the application data. Furthermore, the UE_A 10 may transmit/receive user data that cannot be identified by TFT using the default bearer. Furthermore, the UE_A 10 may store the TFT associated with the default bearer in advance.

The Default Bearer is an EPS bearer identification information that identifies the default bearer associated with the PDU session. The EPS bearer may be a logical communications channel established between the UE_A 10 and the PGW_A 30/UPGW_A 130/UPF_A 235, or a communications channel forming a PDN connection/PDU session. Furthermore, the EPS bearer may be a default bearer or a dedicated bearer. Furthermore, the EPS bearer may be configured to include an RB established between the UE_A 10 and a base station and/or an access point in the access network. Furthermore, the RBs and the EPS bearers may be associated in a one-to-one relationship. Therefore, the RB identification information may be associated with the EPS bearer identification information in a one-to-one relationship, or may be the same identification information. Furthermore, the RB may be an SRB and/or a CRB or a DRB. Furthermore, the Default Bearer may be information that the UE_A 10 and/or the SGW_A 35 and/or the PGW_A 30/UPGW_A 130/SMF_A 230/UPF_A 235 acquires from the core network when the PDU session is established. Furthermore, the default bearer is an EPS bearer that is first established in the PDN connection/PDU session, and only one of this EPS bearer can be established in one PDN connection/PDU session. The default bearer may be an EPS bearer that can be used for communication of the user data that is not associated with the TFT. Furthermore, the dedicated bearer is an EPS bearer that is established after the default bearer is established in the PDN connection/PDU session, and a plurality of this EPS bearer that can be established in one PDN connection/PDU session. The dedicated bearer is an EPS bearer that can be used for communication of the user data associated with the TFT.

The User Identity is information that identifies a subscriber. The User Identity may be the IMSI or the MSISDN. Furthermore, the User Identity may be identification information other than the IMSI and the MSISDN. The Serving Node Information is information that identifies the MME_A 40/CPF_A 140/AMF_A 240 used in the PDU session, and may be the IP address of the MME_A 40/CPF_A 140/AMF_A 240.

The eNB Address is the IP address of the eNB_A 45. The eNB_ID is information that identifies the UE in the eNB_A 45. The MME Address is the IP address of the MME_A 40/CPF_A 140/AMF_A 240. The MME ID is information that identifies the MME_A 40/CPF_A 140/AMF_A 240. The NR node Address is the IP address of the NR node_A 122. The NR node ID is information that identifies the NR node_A 122. The WAG Address is the IP address of the WAG. The WAG ID is information that identifies the WAG.

The anchor or anchor point is a UFP that has a gateway function for the DN and PDU session. The UPF serving as an anchor point may be a PDU session anchor, or an anchor.

The SSC mode indicates the mode of service session continuity (Session and Service Continuity) supported in the system and/or each device in the 5GC. More specifically, it may be a mode indicating the type of service session continuity supported by the PDU session established between the UE_A 10 and the anchor point. Herein, the anchor point may be the UPGW or the UPF_A 235. Furthermore, the SSC mode may be a mode indicating the type of service session continuity set for each PDU session. Furthermore, the SSC mode may be composed of three modes, the SSC mode 1, the SSC mode 2, and the SSC mode 3. The SSC mode is associated with the anchor point and cannot be changed while the PDU session is established.

Furthermore, the SSC mode 1 in the present implementation is a mode of service session continuity in which the same UPF is continuously maintained as an anchor point regardless of access technologies such as RAT (Radio Access Technology) and cells used when UE_A 10 connects to the network. More specifically, the SSC mode 1 may be a mode that realizes service session continuity without changing the anchor point used by the established PDU session even if the UE_A 10 movement occurs.

Furthermore, the SSC mode 2 in the present implementation, when the PDU session includes an anchor point associated with one SSC mode 2, the PDU session is released first, and subsequently the mode of service session continuity for the PDU session is established. More specifically, the SSC mode 2 is a mode that when a relocation of an anchor point occurs, a PDU session is deleted once and then a PDU session is re-established.

Furthermore, the SSC mode 2 is a mode of service session continuity that the same UPF is maintained as an anchor point only within the UPF serving area. More specifically, the SSC mode 2 may be a mode that service session continuity is realized without changing the UPF used by the established PDU session, as long as the UE_A 10 is in the UPF serving area. Furthermore, the SSC mode 2 may change the UPF used by the established PDU session when the UE_A 10 movement occurs, such as exiting from the UPF serving area, to realize service session continuity.

Herein, the serving area of TUPF may be an area where one UPF can provide a service session continuity function, or a subset of an access network, such as a RAT or cell, used when the UE_A 10 connects to the network. Furthermore, the subset of the access network may be a network composed of one or more RATs and/or cells, or may be a TA.

Furthermore, the SSC mode 3 in the present implementation is a mode of service session continuity that, without releasing the PDU session between the UE and the anchor point, a PDU session can be established between a new anchor point and the UE for the same DN.

Furthermore, the SSC mode 3 is a mode of service session continuity that, before disconnecting the communication channel and/or the PDU session established between the UE_A 10 and the UPF, allows the establishment of a communication channel and/or a new PDU session via a new UPF for the same DN. Furthermore, the SSC mode 3 may be a mode of service session continuity that allows the UE_A 10 to become a multi-homing session.

Additionally/alternatively, the SSC mode 3 may be a mode of service session continuity that allows the using of a plurality of PDU sessions and/or the UPFs associated with the PDU session. In other words, in the SSC mode 3, each device may realize service session continuity using a plurality of PDU sessions or may realize service session continuity using a plurality of TUPFs.

Herein, when each device establishes a new PDU session and/or a communication channel, the selection of a new UPF may be implemented by the network, and the new UPF may be the UPF of the location that the UE_A 10 is most suitably connected to the network. Furthermore, when a plurality of PDU sessions and/or UPFs used by the PDU session are valid, the UE_A 10 may immediately implement the association of the application procedure and/or process communication with the newly established PDU session, or it may be implemented based on the completion of communication.

[1.3. Initial Procedure Description]

Subsequently, prior to describing the initial procedure of the present implementation in detail, to avoid repetition, the specific terms and main identification information used for each procedure of the present implementation will be described.

The network in the present implementation refers to at least a part of the access network_A 20/80, the access network_B 80/120, the core network_A 90, the core network_B 190, the DN_A 5, and the PDN_A 6. Furthermore, one or more devices included in at least a part of the access network_A 20/80, the access network_B 80/120, the core network_A 90, the core network_B 190, the DN_A 5, and the PDN_A 6 may also be referred to as a network or a network device. That is, the network performing the transmission/reception of a message and/or a procedure means that a device (network device) in the network performing the transmission/reception of a message and/or a procedure.

In the present implementation, a session management (SM) message (may also be referred to as NAS (Non-Access-Stratum) SM message or SM message) may be a NAS message used in a procedure for a SM (may also be referred to as session management procedure or SM procedure), and may be a control message transmitted/received between the UE_A 10 and the SMF_A 230 via the AMF_A 240. Furthermore, the SM message may include a PDU session establishment request message, a PDU session establishment accept message, a PDU session complete message, a PDU session reject message, a PDU session modification request message, a PDU session modification accept message, a PDU session modification reject message.

Furthermore, the procedure for SM may also include a PDU session establishment procedure, a PDU session modification procedure, and the like.

In the present implementation, the tracking area (TA) is a range that can be represented with the location information of the UE_A 10 managed by the core network, and may be composed of, for example, one or more cells. Furthermore, the TA may be a range of a control message, such as a broadcast paging message, or a range in which the UE_A 10 may move without performing a handover procedure.

In the present implementation, the TA list is a list that includes one or more TAs assigned to the UE_A 10 by the network. Furthermore, it may be that the UE_A 10 may move without performing the registration procedure while moving in one or more TAs included in the TA list. In other words, it may be that the TA list may be an information group indicating the areas where the UE_A 10 may move without performing the registration procedure.

In the present implementation, a network slice is a logical network that provides specific network capabilities and network characteristics. Hereinafter, the network slice may also be referred to as a NW slice.

In the present implementation, the NSI (Network Slice Instance) is an entity of one or more network slices included in the core network_B 190. Furthermore, the NSI in the present implementation may be composed of a virtual NF (Network Function) generated using the NST (Network Slice Template). Herein, the NST is a logical expression of one or more NFs (Network Functions) associated with a resource request for providing a required communication service or capability. That is, the NSI may be an aggregate in the core network_B 190 composed of a plurality of NFs. Furthermore, the NSI may be a logical network configured to divide the user data delivered according to services or the like. Furthermore, the network slice may be composed of at least one NF. The NF composed in the network slice may be a device shared with other network slices, or may not be a device shared with other network slices. The UE_A 10 and/or the device in the network may be assigned to one or more network slices based on the NSSAI and/or the S-NSSAI and/or the UE usage type and/or the one or more network slice type ID and/or the one or more NS ID registration information and/or the APN.

In the present implementation, the S-NSSAI is an abbreviation for Single Network Slice Selection Assistance Information, and is information for identifying a network slice. The S-NSSAI may compose of the SST (Slice/Service type) and the SD (Slice Differentiator). The S-NSSAI may also compose only the SST, or may compose both the SST and the SD. Herein, the SST is information indicating the operation of the network slice expected in terms of functions and services. Furthermore, the SD may be information that complements the SST when selecting one NSI in a plurality of NSI indicated by the SST. The S-NSSAI may be information that is specific to each PLMN (Public Land Mobile Network), may be standard information that is common among the PLMNs, or may be information that is specific to the different network operator for each PLMN.

More specifically, the SST and/or the SD may be standard information (Standard Value) that is common among the PLMNs, or may be information specific to the different network operator (Non Standard Value) for each PLMN. Furthermore, the network may also store one or more S-NSSAIs in the registration information of the UE_A 10 as the default S-NSSAIs.

In the present implementation, the NSSAI (Single Network Slice Selection Assistance Information) is a collection of the S-NSSAI. Each S-NSSAI included in the NSSAI is information that assists the access network or the core network in selecting the NSI. The UE_A 10 may store the NSSAI permitted by the network for each PLMN. Furthermore, the NSSAI may be information for selecting the AMF_A 240.

In the present implementation, the network operator A network is a network operated by the network operator A (network operator A). Herein, for example, the network operator A may deploy the same NW slice as the network operator B described hereinafter.

In the present implementation, the network operator B network is a network operated by the network operator B (network operator B). Herein, for example, the network operator B may deploy the same NW slice as the network operator A.

In the present implementation, the first NW slice is the NW slice that belongs to the PDU session established when the UE connects to a specific DN. Furthermore, for example, the first NW slice may be an NW slice managed in the network operator A network, or may be an NW slice commonly managed in the network operator B network.

In the present implementation, the second NW slice is an NW slice that belongs to another PDU session that takes the PDU session belonging to the first NW slice as the connection destination DN connection. Furthermore, the first NW slice and the second NW slice may be operated by the same network operator or different network operators.

In the present implementation, the equivalent PLMN is a PLMN that is processed as the same PLMN as any PLMN in the network.

In the present implementation, the DCN (Dedicated Core Network) is a core network dedicated to the one or more specific subscriber types composed in the core network_A 90. Specifically, for example, the DCN for the UE registered as the user of the M2M (Machine to Machine) communication function may be composed in the core network_A 90. In addition, a default DCN for the UE that does not have an appropriate DCN may be composed in the core network_A 90. Furthermore, the DCN may be configured with at least one or more MME_A 40 or SGSN_A 42, and at least one or more SGW_A 35 or PGW_A 30 or PCRF_A 60. Furthermore, the DCN may be identified by the DCN ID, and the UE may be assigned to one DCN based on information such as the UE usage type and/or the DCN ID.

In the present implementation, the first timer is a timer that manages the start of a session management procedure, such as a PDU session establishment procedure, and/or transmission of an SM (Session Management) message, such as a PDU session establishment request message. It may be information indicating the value of the backoff timer for managing the behavior of session management. Hereinafter, the first timer and/or the backoff timer may be referred to as a timer. During the running of the first timer, each device may be prohibited from starting a session management procedure and/or transmitting/receiving an SM message. Furthermore, the first timer may be set in association with at least one of the congestion management unit applied by the NW and/or the congestion management unit identified by the UE. For example, the unit may be set using at least one of: the APN/DNN unit, and/or the identification information unit indicating one or more NW slices, and/or the rejection reason value unit in session management procedure, and/or the session unit that rejection is indicated in session management procedure, and/or the PTI units of the session management procedure.

Furthermore, the SM message may be a NAS message used in the session management procedure, and may be a control message transmitted/received between the UE_A 10 and the SMF_A 230 via the AMF_A 240. Furthermore, the SM message may include a PDU session establishment request message, a PDU session establishment accept message, a PDU session complete message, a PDU session reject message, a PDU session modification request message, a PDU session modification accept message, a PDU session modification reject message. Furthermore, the session management procedure may include a PDU session establishment procedure, a PDU session modification procedure, and the like. Furthermore, in the procedures, a backoff timer value may be included in each message received by the UE_A 10. The UE may set the backoff timer received from the NW as the first timer, may set the timer value by another method, or may set the random value. Furthermore, when the backoff timer received from the NW is composed of a plurality of timers, the UE may manage a plurality of "first timers" according to the plurality of backoff timers, or select one timer value from a plurality of backoff timer values received from the NW based on the policy retained by the UE, set it as the first timer, and manage it accordingly. For example, when receiving two backoff timer values, the UE sets the backoff timer value received from the NW as the "first timer #1" and "first timer #2", respectively, and manages them accordingly. Furthermore, one value may be selected from a plurality of back-off timer values received from the NW based on the policy retained by the UE, set it as the first timer, and manage it accordingly.

The UE_A 10 may manage a plurality of "first timers" corresponding to a plurality of backoff timers, when receiving a plurality of backoff timer values from the NW. Herein, to distinguish a plurality of "first timers" that the UE_A 10 receives, hereinafter, they may be described as the "first timer #1" or "first timer #2", for example. Furthermore, the plurality of backoff timers may be acquired from one session management procedure or different session management procedures.

Herein, the first timer may be set a plurality of related NW slices based on the information for identifying one NW slice as described above, or may be set using a backoff timer for preventing reconnection or a combination of APN/DNN and one NW slice as a unit. The backoff timer for preventing reconnection, not limited to this, may be set using a combination of the plurality of NW slices related to the information for identifying APN/DNN and one NW slice.

In the present implementation, the re-attempt information included in the 11$^{th}$ identification information is information for permitted reconnection that the network (NW) instructs the UE_A 10 whether to use the same DNN information and/or S-NSSAI information for the rejected PDU session establishment request (S 1100).

At this time, in the PDU session establishment request (1100), if the UE executes the PDU session establishment request (S1100) that does not include the DNN, the information that the DNN refers to as equivalent is not included. Furthermore, in the PDU session establishment request (1100), when the UE executes the PDU session establishment request (S1100) that does not include the S-NSSAI, the information that the S-NSSAI refers to as equivalent is not included.

Furthermore, the re-attempt information may be set in units of the UTRAN access and/or the E-UTRAN access and/or the NR access and/or the slice information and/or the equivalent PLMN and/or the S1 mode and/or the NW mode.

Furthermore, the re-attempt information specified by the access unit (UTRAN access, E-UTRAN access, NR access) may be information indicating reconnection using the same information for the network assuming an access change. It may be that the re-attempt information specified by the slice unit may be specified as slice information different from the rejected slice, and reconnection using the specified slice information may be permitted.

Further, the re-attempt information specified in the unit of equivalent PLMN may be information indicating that when the PLMN is changed, as long as the changed destination PLMN is an equivalent PLMN, reconnection using the same information is permitted. Furthermore, it may be information indicating that when the changed destination PLMN is not an equivalent PLMN, reconnection using this procedure is not permitted.

Furthermore, the re-attempt information specified in mode units (S1 mode, N1 mode) may be information indicating that when the mode is changed, as long as the changed destination mode is the S1 mode, reconnection using the same information is permitted. Furthermore, it may be information indicating that, as long as the changed destination mode is the S1 mode, reconnection using the same information is not permitted.

In the present implementation, the network slice association rule is the rule that associates information that identifies a plurality of network slices. The network slice association rule may be received with the PDU session reject message, or may be preset in the UE_A 10. Furthermore, the latest network slice association rule of the network slice association rule may be applied in the UE_A 10. Conversely, the UE_A 10 may perform operations according to the latest network slice association rule. For example, it may be that, when the network slice association rule is preset in the UE_A10 and when a new network slice association rule is received with the PDU session reject message, the UE_A 10 updates the network slice association rule held in the UE_A 10.

In the present implementation, the priority management rule of the backoff timer is a rule set for the UE_A 10, to collectively manage a plurality of backoff timers occurring in a plurality of PDU sessions as one backoff timer. For example, when contention or overlapping congestion management is applied, when the UE holds a plurality of backoff timers, the UE_A 10 may collectively manage the plurality of backoff timers based on the priority management rule of the backoff timer. Furthermore, when in the mode of contention or overlapping congestion management, when congestion management based on only DNN and congestion management based on both DNN and slice information are simultaneously applied, in this situation, congestion management based only on DNN has priority. Furthermore, the priority management rule of the backoff timer is not limited to this. Furthermore, the backoff timer may be the first timer included in the PDU session reject message.

In the present implementation, the first state is a state in which each device has completed the registration procedure and the PDU session establishment procedure, and the UE_A 10 and/or each device applies the one or more of the first to fourth congestion managements. Herein, the UE_A 10 and/or each device may, based on the completion of the registration procedure, make the UE_A 10 be in a state that is registered in the network (RM-REGISTERED state), the completion of the PDU session establishment procedure may be a state that the UE_A 10 receives the PDU session establishment reject message from the network.

In the present implementation, the congestion management is composed of one or more congestion managements from the first congestion management to the fourth congestion management. Furthermore, the control of the UE realized by the NW may be realized by the first timer and the congestion management identified by the UE, and the UE may store the association of the information.

In the present implementation, the first congestion management indicates the control signal congestion management targeting the DNN parameters. For example, it may be that, in the NW, when congestion is detected for DNN #A, when the NW identifies that it is a UE-led session management request targeting only the DNN #A parameter, the NW may apply the first congestion management. Furthermore, even when the UE-led session management request does not include the DNN information, the NW may select the default DNN as led by the NW and set it as the congestion management target. Alternatively, even when the NW identifies that it is the UE-led session management request including the DNN #A and S-NSSAI #A, the NW may apply the first congestion management. When the first congestion management is applied, the UE may suppress the UE-led session management request targeting only the DNN #A.

In other words, the first congestion management in the present implementation may be a control signal congestion management targeting the DNN, and is a congestion management caused by the congestion state of the connectivity to the DNN. For example, the first congestion management may be congestion management for restricting the connectivity to the DNN #A in all the connectivity. Herein, the connectivity to the DNN #A in all the connectivity may be the connectivity to the DNN #A in the connectivity using all the S-NSSAI available to the UE, or may be the connectivity to the DNN #A via the network slice to which the UE can connect. Furthermore, the connectivity to DNN #A not via the network slice may also be included.

In the present implementation, the second congestion management indicates the control signal congestion management targeting the S-NSSI parameters. For example, it may be that, in the NW, when the control signal congestion for S-NSSAI #A is detected, when NW identifies that it is a UE-led session management request targeting only the S-NSSAI #A parameters, the NW may apply the second congestion management. When the second congestion management is applied, the UE may suppress the UE-led session management request targeting only the S-NSSAI #A.

In other words, the second congestion management in the present implementation may be a control signal congestion management targeting the S-NSSAI, and is a congestions management caused by the congestion state of the network slice selected by the S-NSSAI. For example, the second congestion management may be congestion management for restricting all connections based on the S-NSSAI #A. That is, it may be congestion management for restricting the connection to all DNNs via the network slice selected by the S-NSSAI #A.

In the present implementation, the third congestion management indicates the control signal congestion management targeting the DNN and S-NSSAI parameters. For example, it may be that, in NW, when the control signal congestion for the DNN #A and the control signal congestion for the S-NSSAI #A are detected at the same time, when the NW identifies that it is a UE-led session management request targeting the DNN #A and S-NSSAI #A parameters, the NW may apply the third congestion management. Furthermore, even when the session management request led by the UE does not include information indicating the DNN, the NW may select the default DNN as led by the NW, and set it as the congestion management target. When the third congestion management is applied, the UE may suppress the UE-led session management request targeting the DNN #A and S-NSSAI #A parameters.

In other words, the third congestion management in the present implementation is a control signal congestion management targeting the DNN and S-NSSAI parameters, and is a congestions management caused by the congestion state to the connectivity of the DNN via the network slice selected by the S-NSSAI. For example, the third congestion management may be congestion management for restricting the connectivity to the DNN #A of the connectivity based on the S-NSSAI #A.

In the present implementation, the fourth congestion management indicates the control signal congestion management targeting at least one of DNN and/or S-NSSAI parameter. For example, it may be that, in NW, when the control signal congestion for the DNN #A and the control signal congestion for the S-NSSAI #A are detected at the same time, when the NW identifies that it is a UE-led session management request targeting at least one of the DNN #A and/or the S-NSSAI #A parameter, the NW may apply the fourth congestion management. Furthermore, even when the session management request led by the UE does not include information indicating the DNN, the NW may select the default DNN as led by the NW, and set it as the congestion management target. When the fourth congestion management is applied, the UE may suppress the UE-led session management request targeting at least one of the DNN #A and/or the S-NSSAI #A parameter.

In other words, the fourth congestion management in the present implementation is a control signal congestion management targeting the DNN and S-NSSAI parameters, and is a congestions management caused by the congestion state to the connectivity of the DNN via the network slice selected by the S-NSSAI. For example, the fourth congestion management is congestion management for restricting all connections based on the S-NSSAI #A, and is congestion management for restricting the connectivity to the DNN #A in all connectivity. That is, congestion management for restricting the connectivity to all DNNs via the network slices selected by the S-NSSAI #A, and for restricting the connectivity to DNN #A in all connectivity. Herein, the connectivity to the DNN #A in all the connectivity may be the connection of the DNN #A in the connectivity using all the S-NSSAI available to the UE, or may be the connectivity of the DNN #A via the network slice to which the UE can connect. Furthermore, the connectivity to DNN #A not via the network slice may also be included.

Therefore, the fourth congestion management with the DNN #A and S-NSSAI #A parameters may be the congestion management performing the first congestion management with the DNN #A parameter and the second congestion management with the S-NSSAI #A parameter simultaneously.

In the present implementation, the first behavior is a behavior in which the UE associates and stores the slice information transmitted in the first PDU session establishment request message with the transmitted PDU session identification information. In the first behavior, the UE may store the slice information transmitted in the first PDU session establishment request message, or store the slice information received when the first PDU session establishment request is rejected.

In the present implementation, the second behavior indicates a behavior in which the UE uses another slice information different from the slice information specified in the first PDU session establishment, transmits a PDU session establishment request for connection the same APN/DNN as in the first PDU session establishment request. Specifically, the second behavior may be a behavior that: when the backoff timer value received from the network is zero or invalid, the UE uses a slice information different from the slice information specified in the first PDU session establishment, and transmits a PDU session establishment request for connection the same APN/DNN as in the first PDU session establishment request. Or, the second behavior may be a behavior that: when the first PDU session is rejected due to the radio access of the specified PLMN to which the specified APN/DNN is connected is not supported, or when the first PDU session is rejected for a temporary reason, the UE uses a slice information different from the slice information specified in the first PDU session establishment, transmits a PDU session establishment request that connects to the same APN/DNN included in the first PDU session establishment request.

In the present implementation, the third behavior indicates a behavior in which, when the PDU session establishment request is rejected, the UE does not transmit a new PDU session establishment request using the same identification information before the first timer expires. Specifically, the third behavior may be a behavior that: when the backoff timer value received from the network is neither zero nor invalid, the UE does not transmit a new PDU with the same identification information before the first timer expires. Herein, the same identification information may be a first identification information and/or a second identification information loaded in a new PDU session establishment request are the same, or the first identification information and/or the second identification information transmitted in the rejected PDU session establishment request are the same.

Furthermore, the third behavior may be a behavior that: when another PLMN is selected or when another NW slice is selected, and when the rejection reason related to the network operation setting failure is received, when the first PDU session establishment request is rejected and the backoff timer activation is received, a new PDU session establishment request using the same identification information is not transmitted before the first timer expires.

Specifically, in the third behavior, the PDU session that does not transmit the new PDU session establishment request may be the PDU session that applies the congestion management corresponding to the first timer. More specifically, the third behavior may be a behavior that the connectivity corresponding to the type of congestion management associated with the first timer, and may be that a PDU session establishment request is not re-transmitted for a PDU session using the DNN and/or the S-NSSAI corresponding to the congestion management. Furthermore, the process of the UE that is prohibited by this behavior may be the start of a procedure including session management of a PDU session establishment request and/or the transmission/reception of an SM message.

In the present implementation, the fourth behavior indicates a behavior in which, when the PDU session establishment request is rejected, the UE does not transmit a new PDU session establishment request that does not carry the slice information, the DNN/APN information before the first timer expires. Specifically, the fourth behavior may be a behavior that: when the backoff timer received from the network is neither zero or invalid, the UE does not transmit a new PDU session establishment request that does not carry the slice information, the DNN/APN information before the first timer expires.

In the present implementation, the fifth behavior indicates a behavior in which, when the PDU session establishment request is rejected, the UE does not transmit a new PDU session establishment request using the same identification information. Specifically, the fifth behavior may be a behavior that: when the PDP types supported by the UE and the network are different and in an equivalent PLMN, the UE does not transmit a new PDU session establishment request that uses the same identification information.

In the present implementation, the sixth behavior indicates a behavior in which, when the PDU session establishment request is rejected, the UE uses the same identification information as an initial procedure to transmit a new PDU session establishment request. Specifically, the sixth behavior may be a behavior that: when the first PDU session establishment request is rejected due to the target PDN session context does not exist in the handover from the non-3GPP access, the UE uses the same identification information as an initial procedure to transmit a new PDU session establishment request.

In the present implementation, the seventh behavior indicates a behavior in which, when another NW slice is selected in the procedure of selecting the PLMN, the UE continues the receiving of the backoff timer when the previous PDU session establishment request is rejected. Specifically, the seventh behavior may be a behavior that: when selecting a PLMN is performed when the first PDU session establishment request is rejected, when a common NW slice of the specified NW slice is specified by the first PDU session establishment request in the selected destination PLMN, the UE continues the receiving of the backoff timer when the first PDU session establishment request is rejected.

In the present implementation, the eighth behavior indicates a behavior in which, the UE sets the value notified by the network or the value preset in the UE as the first timer value. Specifically, the eighth behavior may be a behavior that the UE sets the backoff timer value received in the rejection notification of the first PDU session establishment request as the first timer value, or preset a value or maintain the value in the UE as the first timer value. Furthermore, when the timer preset or maintained in the UE is set as the first timer value, it may be limited to during the HPLMN or the equivalent PLMN.

In the present implementation, the ninth behavior indicates a behavior in which, when the PDU session establishment request is rejected, the UE does not transmit a new PDU session establishment request before the terminal power on/off or before the plugging/unplugging of the USIM (Universal Subscriber Identity Module). Specifically, the ninth behavior is that, when the backoff timer received from the network is invalid or when the first PDU session rejection reasons are of different PDP types between the UE and the network, the UE does not transmit a new PDU session establishment request before the terminal power on/off or before the plugging/unplugging of the USIM. Alternatively, the ninth behavior may be a behavior that: when the first PDU session is rejected due to the PLMN radio connected to the specified APN/DNN is not supported, and there is no backoff timer information element from the network and no re-attempt information, or when a PDU session reconnection to the equivalent PLMN is permitted, in the connected PLMN, a new PDU session establishment request is not transmitted before the terminal power on/off or before the plugging/unplugging of the USIM. Alternatively, the ninth behavior may be a behavior that: when the first PDU session is rejected due to the PLMN radio connected to the specified APN/DNN is not supported, and there is no backoff timer information element from the network and no re-attempt information, or when a PDU session reconnection to the equivalent PLMN is not permitted, in the connected PLMN, a new PDU session establishment request is not transmitted before the terminal power on/off or before the plugging/unplugging of the USIM. Alternatively, the ninth behavior may be a behavior that: when the first PDU session is rejected due to the PLMN radio connected to the specified APN/DNN is not supported, and when the backoff timer from the network is neither zero nor invalid, a new PDU session establishment request is not transmitted before the terminal power on/off or before the plugging/unplugging of the USIM. Alternatively, the ninth behavior may be a behavior that: when the first PDU session is rejected due to the PLMN radio connected to the specified APN/DNN is not supported, and when the backoff timer from the network is invalid, a new PDU session establishment request is not transmitted before the terminal power on/off or before the plugging/unplugging of the USIM.

In the present implementation, the tenth behavior indicates a behavior in which, when the PDU session establishment request is rejected, the UE transmits a new PDU session establishment request. Specifically, the tenth behavior may be a behavior that: when the backoff timer received from the network is zero, or when the first PDU session establishment request is rejected for temporary reasons, and when there is no back-off timer information element from the network, the UE transmits a new PDU session establishment request. Alternatively, the tenth behavior may be a behavior that: when another PLMN is selected, or when another NW slice is selected, and when the first PDU session establishment request is rejected for a temporary reason, and when there the backoff timer has not been activated for the target APN/DNN in the selected PLMN, or when the backoff timer received from the network is invalid, a new PDU session establishment request is transmitted. Alternatively, the tenth behavior may be a behavior that: when the first PDU session establishment request is rejected due to the PDP types of the UE and the network are different, when selecting a different PLMN, Re-attempt information is not received, or when a PLMN that is not in the uniform PLMN list is selected, or when the PDP type is changed, or when the terminal power is turned on/off or the USIM is plugged/unplugged, a new PDU session establishment request is transmitted. Alternatively, the tenth behavior may be a behavior that: when the first PDU session is rejected due to the PLMN radio connected to the specified APN/DNN is not supported, and when the backoff timer from the network is zero, a new PDU session establishment request is transmitted.

In the present implementation, the eleventh behavior indicates a behavior in which, the UE ignores the first timer and the re-attempt information. Specifically, the eleventh behavior may be a behavior that: when the first PDU session establishment request is rejected due to the target PDN session context does not exist in the handover from the non-3GPP access, or when the first PDU session establishment is rejected due to the number of bearers set in the PDN connection reaches the maximum allowable number, the UE ignores the first timer and the re-attempt information.

In the present implementation, the twelfth behavior indicates a behavior in which, the UE determines the information for identification a plurality of related NW slices based on information for identifying one NW slice received in the rejection notification for the first PDU session establishment request, and suppresses reconnection to a plurality of related NW slices based on the information for identifying one NW slice. Specifically, the twelfth behavior may be a behavior that: the UE derives information for identifying other NW slice related to the information for identifying the NW slice notified in the first PDU session establishment request rejection based on the network slice association rule. Furthermore, the network slice association rule may be preset in the UE, or may be notified from the network by a PDU session establishment rejection notification.

In the present implementation, the thirteenth behavior indicates a behavior in which, when a plurality of different congestion managements are activated for one or more PDU session establishment by the same UE, when a plurality of timers are provided by the network, the UE manages the timer based on the priority management rule of the backoff timer. For example, the first PDU session establishment request for the combination of the DNN_1 and the slice_1 by the UE becomes a congestion management target based on both the DNN and slice information, and the UE receives the first timer #1. Furthermore, for the combination of the DNN_1 and the slice_2, the UE performs a second PDU session establishment request, which becomes a congestion management target based only on the DNN, and receives the first timer #2. At this time, it may be a behavior that the UE manages the PDU session reestablishment of the UE via the prioritized first timer #2 based on the priority management rule of the backoff timer. Specifically, the value of the timer held by the UE may be overwritten according to the timer value generated by the prioritized congestion control.

In the present implementation, the fourteenth behavior indicates a behavior in which, when different congestion managements are applied to one or more PDU session establishments by the same UE, and a plurality of timers are provided by the network, the time is managed for each session management instance (PDU session unit). For example, the first PDU session establishment request for the combination of the DNN #1 and the slice #1 by the UE becomes a congestion management target based on both the DNN and slice information, the UE manages the target back-off timer value as the first timer #1. Thereinafter, when the UE further attempts to perform the PDU session establishment as the second PDU session for the combination of DNN #1 and slice #2, when the congestion target based only on the DNN, the UE manages the target backoff timer value as the first timer #2. At this time, the UE simultaneously manages a plurality of timers (here, the first timer #1 and the first timer #2). Specifically, the UE manages the timer based on session management instance/PDU session unit. Furthermore, when the UE receives a plurality of timers in one session management procedure simultaneously, the UE simultaneously manages the target backoff timer based on the congestion management unit identified by the UE.

In the present implementation, the fifteenth behavior indicates a behavior in which, the first identification process and the second identification process are performed. In the first identification process, the identification of which type of congestion management of the first congestion management to the fourth congestion management is applied for the UE_A 10 is performed. In the second identification process, the identification of the DNN and/or S-NSSAI corresponding to the congestion management is performed. Furthermore, the first identification process may be performed based on at least one identification information of the first identification information to the fourth identification information, and/or at least one identification information of the eleventh identification information to the eighteenth identification information. Similarly, the second identification process may be performed based on at least one identification information of the first identification information to the fourth identification information, and/or at least one identification information of the eleventh identification information to the eighteenth identification information.

Hereinafter, an example of the first identification process is described. In the first identification process, when any one or a combination of two or more of the following conditions are satisfied, the type of congestion management as applied may be identified as the first congestion management.

At least when the fifteenth identification information is a value corresponding to the first congestion management.

At least when the sixteenth identification information is a value corresponding to the first congestion management.

At least when the fourteenth identification information includes information indicating the first congestion management.

At least when the seventeenth identification information includes only DNN and does not include S-NSSAI.

The sixteenth identification information is information for identifying one of the first congestion management and the second congestion management, and when only the value corresponding to the second congestion management is set for the sixteenth identification information, at least the sixteenth identification information is not received.

The sixteenth identification information is information for identifying one of the first congestion management and the fourth congestion management, and when only the value corresponding to the fourth congestion management is set for the sixteenth identification information, at least the sixteenth identification information is not received.

The sixteenth identification information is information for identifying any one of the first congestion management, the second congestion management and the fourth congestion management, and when only the value corresponding to the second congestion management and only the value corresponding to the fourth congestion management are set for the sixteenth identification information, at least the sixteenth identification information is not received.

Wherein, not limited to the above example, the UE_A 10 may perform identification based on at least one identification information of the first identification information to the fourth identification information, and/or at least one identification information of the eleventh identification information to the eighteenth identification information.

Hereinafter, an example of the first identification process is described. In the first identification process, when any one or a combination of two or more of the following conditions are satisfied, the type of congestion management as applied may be identified as the second congestion management.

At least when the fifteenth identification information is a value corresponding to the second congestion management.

At least when the sixteenth identification information is a value corresponding to the second congestion management.

At least when the fourteenth identification information includes information indicating the second congestion management.

At least when the seventeenth identification information includes only DNN and does not include S-NSSAI.

The sixteenth identification information is information for identifying one of the first congestion management and the second congestion management, and when only the value corresponding to the first congestion management is set for the sixteenth identification information, at least the sixteenth identification information is not received.

The sixteenth identification information is information for identifying one of the second congestion management and the third congestion management, and when only the value corresponding to the third congestion management is set for the sixteenth identification information, at least the sixteenth identification information is not received.

The sixteenth identification information is information for identifying any one of the second congestion management, the third congestion management and the fourth congestion management, and when only the value corresponding to the third congestion management and only the value corresponding to the fourth congestion management are set for the sixteenth identification information, at least the sixteenth identification information is not received.

Wherein, not limited to the above example, the UE_A 10 may perform identification based on at least one identification information of the first identification information to the fourth identification information, and/or at least one identification information of the eleventh identification information to the eighteenth identification information.

Hereinafter, an example of the first identification process is described. In the first identification process, when any one or a combination of two or more of the following conditions are satisfied, the type of congestion management as applied may be identified as the third congestion management.

At least when the fifteenth identification information is a value corresponding to the third congestion management.

At least when the sixteenth identification information is a value corresponding to the third congestion management.

At least when the fourteenth identification information includes information indicating the third congestion management.

At least the fifteenth identification information is a value corresponding to a plurality of congestion management, including the third congestion management, and not including the fourth congestion management, and when the seventeenth identification information includes the S-NSSAI and the DNN.

The sixteenth identification information is information for identifying one of the third congestion management and the fourth congestion management, and when only the value corresponding to the fourth congestion management is set for the sixteenth identification information, at least the sixteenth identification information is not received.

The sixteenth identification information is information for identifying one of the second congestion management and the third congestion management, and when only the value corresponding to the second congestion management is set for the sixteenth identification information, at least the sixteenth identification information is not received.

The sixteenth identification information is information for identifying any one of the second congestion management, the third congestion management and the fourth congestion management, and when only the value corresponding to the second congestion management and only the value corresponding to the fourth congestion management are set for the sixteenth identification information, at least the sixteenth identification information is not received.

Wherein, not limited to the above example, the UE_A 10 may perform identification based on at least one identification information of the first identification information to the fourth identification information, and/or at least one identification information of the eleventh identification information to the eighteenth identification information.

Hereinafter, an example of the first identification process is described. In the first identification process, when any one or a combination of two or more of the following conditions are satisfied, the type of congestion management as applied may be identified as the fourth congestion management.

- At least when the fifteenth identification information is a value corresponding to the fourth congestion management.
- At least when the sixteenth identification information is a value corresponding to the fourth congestion management.
- At least when the fourteenth identification information includes information indicating the fourth congestion management.
- At least the fifteenth identification information is a value corresponding to a plurality of congestion management, including the fourth congestion management, and not including the third congestion management, and when the seventeenth identification information includes the S-NSSAI and the DNN.
- The sixteenth identification information is information for identifying one of the third congestion management and the fourth congestion management, and when only the value corresponding to the third congestion management is set for the sixteenth identification information, at least the sixteenth identification information is not received.
- The sixteenth identification information is information for identifying one of the second congestion management and the fourth congestion management, and when only the value corresponding to the second congestion management is set for the sixteenth identification information, at least the sixteenth identification information is not received.
- The sixteenth identification information is information for identifying one of the first congestion management and the fourth congestion management, and when only the value corresponding to the first congestion management is set for the sixteenth identification information, at least the sixteenth identification information is not received.
- The sixteenth identification information is information for identifying any one of the second congestion management, the third congestion management and the fourth congestion management, and when only the value corresponding to the second congestion management and only the value corresponding to the third congestion management are set for the sixteenth identification information, at least the sixteenth identification information is not received.
- The sixteenth identification information is information for identifying any one of the first congestion management, the second congestion management and the fourth congestion management, and when only the value corresponding to the first congestion management and only the value corresponding to the second congestion management are set for the sixteenth identification information, at least the sixteenth identification information is not received.

Wherein, not limited to the above example, the UE_A 10 may perform identification based on at least one identification information of the first identification information to the fourth identification information, and/or at least one identification information of the eleventh identification information to the eighteenth identification information.

As disclosed, the congestion management type may be identified by the first identification process.

Subsequently, an example of the second identification process will be described. Furthermore, the second identification process may be a process of identifying the DNN and/or S-NSSAI corresponding to the congestion management type identified by the first identification process.

More specifically, the DNN corresponding to the first congestion management, the third congestion management, and the fourth congestion management may be determined based on the twelfth identification information. Additionally/alternatively, the DNN corresponding to the first congestion management, the third congestion management, and the fourth congestion management may be determined based on the seventeenth identification information. Additionally/alternatively, the DNN corresponding to the first congestion management, the third congestion management, and the fourth congestion management may be determined based on the second identification information.

Therefore, the DNN corresponding to the first congestion management, the third congestion management, and the fourth congestion management may be the DNN indicated by the twelfth identification information. Additionally/alternatively, the DNN corresponding to the first congestion management, the third congestion management, and the fourth congestion management may be the DNN included in the seventeenth identification information. Additionally/alternatively, the DNN corresponding to the first congestion management, the third congestion management, and the fourth congestion management may be the DNN indicated by the second identification information.

Furthermore, the S-NSSAI corresponding to the second congestion management, the third congestion management, and the fourth congestion management may be determined based on the seventeenth identification information. Additionally/alternatively, the DNN corresponding to the first congestion management, the third congestion management, and the fourth congestion management may be determined based on the first identification information.

Therefore, the DNN corresponding to the first congestion management, the third congestion management, and the fourth congestion management may be the S-NSSAI indicated by the seventeenth identification information. Additionally/alternatively, the DNN corresponding to the first congestion management, the third congestion management, and the fourth congestion management may be the DNN included in the seventeenth identification information. Additionally/alternatively, the DNN corresponding to the first congestion management, the third congestion management, and the fourth congestion management may be the S-NSSAI indicated by the first identification information.

However, not limited to the above example, the UE_A 10 may perform identification based on at least one identification information of the first identification information to the fourth identification information, and/or at least one identification information of the eleventh identification information to the eighteenth identification information.

Based on the disclosed fifteenth behavior, the UE_A 10 may identify the congestion management that the core network_B 190 applies to the UE_A 10. In other words, the UE_A 10 may identify the corresponding congestion management type and the corresponding S-NSSAI and/or DNN as the congestion management as applied based on the fifteenth behavior. Furthermore, the UE_A 10 associates the congestion management as applied with one or more identification information of the first identification information to the fourth identification information and the eleventh identification information to the eighteenth identification information, and stores and manages it accordingly. Herein, the third identification information and/or the fourth identification information and/or the thirteenth identification information may be stored and managed as information for identifying the congestion management as applied.

In the present implementation, the sixteenth behavior indicates a behavior in which, when the UE activates the first timer, and the session management procedure led by the NW is performed, the first timer is stopped.

Here, for example, it may be a behavior that: when the plurality of first timers are activated, the first timer to be stopped is determined from the plurality of activated first timers based on the twenty-first identification information, and is stopped. Additionally/alternatively, the behavior may be a behavior of stopping the first timer associated with the congestion management identified via the seventeenth behavior. Furthermore, when there are a plurality of congestion managements identified by the seventeenth behavior, the timers associated with each congestion management may be stopped.

In the present implementation, the seventeenth behavior may be a behavior in which, based on the reception of the control message transmitted by the core network, the UE identifies the congestion management which the application is stopped from the one or more congestion managements as applied. For example, the UE may identify the congestion management which the application is stopped or modified based on the twenty-first identification information.

Specifically, as disclosed above, the UE stores the third identification information in the fourth process, and/or the fourth identification information, and/or the thirteenth identification information as information for identifying congestion management. These information identifying the congestion management that is the same as the thirteenth identification information included in the twenty-first identification information may be identified as the congestion management which the application is stopped.

Additionally/alternatively, based on one or more combinations of the eleventh identification information to the eighteenth identification information included in the twenty-first identification information, the UE may identify the congestion management which the application is stopped. Herein, the details of the identification method may be the same as the identification process in the fifteenth behavior described in the fourth process of the PDU session establishment procedure example disclosed hereinafter. That is, the UE may identify the congestion management which the application is stopped by the same method as the method to identify the congestion management as applied.

Furthermore, the UE may identify a plurality of congestion managements which application is stopped. Hereinafter, a method for identifying the congestion management identified by the disclosed method is the first congestion management. The identification of the second congestion management that is different from the first congestion management will be described.

For example, the UE may identify the congestion management corresponding to the DNN as the second congestion management, and said DNN is the same as the DNN corresponding to the first congestion management. Additionally/alternatively, the UE may identify the congestion management corresponding to the S-NSSAI as the second congestion management, and said S-NSSAI is the same as the S-NSSAI corresponding to the first congestion management. Furthermore, identifying a plurality of congestion managements which application is stopped may be set to be performed only when the first congestion management and/or the second congestion management is a specific congestion management type.

Specifically, when the first congestion management is any one of the first congestion management to the fourth congestion management, the UE may identify the second congestion management. Additionally/alternatively, when the second congestion management is determined, the search target congestion management is any one of the first congestion management to the fourth congestion management, the UE identifies the second congestion management. Furthermore, which type the first congestion management and/or the second identification information may identify a plurality of congestion managements may be preset in the core network and/or the UE. Furthermore, the specific type of congestion management that is allowed to be identified is not necessarily a specific single type, and a plurality of types may also be set.

In the present implementation, the first identification information is information for identifying that it belongs to the first NW slice. In other words, the first identification information may be information indicating that the UE is to establish a PDU session belonging to the first NW slice. Specifically, for example, the first identification information may be information for identifying the first NW slice. Furthermore, the slice information may be identification information indicating a specific S-NSSAI. Furthermore, the first identification information may be information for identifying a specific NW slice in the network operator A network, or may be information for commonly identifying the same NW slice in the network operator B (other operators than the network operator A). Furthermore, the first identification information may be information for identifying the first NW slice set by the HPLMN, or may be information for identifying the first NW slice obtained from the AMF in the registration procedure, or may be information for identifying the first NW slice permitted by the network. Furthermore, the first identification information may be information for identifying the first NW slice stored for each PLMN.

In the present implementation, the second identification information may be the DNN (Data Network Name) and may be information for identifying the DN (Data Network).

In the present implementation, the third identification information may be a PDU session ID and may be information for identifying the PDU session.

In the present implementation, the fourth identification information may be a PTI (Procedure Transaction Identity), and may be information for identifying transmission/reception of a series of messages of a specific session management procedure as one group, and may be information for identifying and/or distinguishing transmission/reception of further other series of sessions management related messages.

In the present implementation, the eleventh identification information may be information indicating that a PDU session establishment request or a PDU session modification request is rejected. Furthermore, the PDU session establishment request or the PDU session modification request is a request made by the UE and includes the DNN and/or the S-NSSAI. That is, the eleventh identification information may be information indicating that the NW rejects the establishment request or the modification request for the PDU session corresponding to the DNN and/or the S-NSSA.

Furthermore, the eleventh identification information may be information indicating re-attempt information.

Furthermore, the NW may also transmit at least one of identification information of the twelfth identification information to the eighteenth identification information to the UE together with the eleventh identification information, and thereby, indicate the congestion management to the UE. In other words, the NW may notify the UE of the congestion management corresponding to a combination of one or more of identification information of the twelfth identification information to the eighteenth identification information. On the other hand, the UE may identify the congestion management corresponding to a combination of one or more of identification information of the twelfth identification information to the eighteenth identification information, and may perform processing based on the identified congestion management. Specifically, the UE may start the timing of the first timer associated with the identified congestion management. Furthermore, the timer value of the first timer may be determined using the fourteenth identification information, or the timer value may be set by other methods such as using a value pre-stored by the UE, or setting a random value.

In the present implementation, the twelfth identification information may be a DNN that is not permitted by the network, or may be information indicating that the DNN identified by the second identification information is not permitted. Furthermore, the twelfth identification information may be the same DNN as the second identification information.

In the present implementation, the thirteenth identification information may be a PDU Session ID and/or a PTI, and may be a PDU session ID and/or a PTI that is not permitted by the network, or may be information indicating that the PDU session ID and/or the PTI identified by the third identification is not permitted. Furthermore, the PDU Session ID identified by the thirteenth identification information may be the same PDU session ID identified by the third identification information. Furthermore, the PTI identified by the thirteenth identification information may be the same PTI identified by the fourth identification information.

Herein, the thirteenth identification information may be used as information for identifying the congestion management notified by the NW to the UE based on the rejection of the PDU session establishment. In other words, the UE may store and manage the thirteenth identification information corresponding to the congestion management performed based on the fifteenth behavior, and use the thirteenth identification information as information for identifying the congestion management as performed. Furthermore, the information for identifying the congestion management may be composed of a combination of one or more identification information of the fourteenth to eighteenth identification information, in addition to the thirteenth identification information.

In the present implementation, the fourteenth identification information may be information indicating the value of the backoff timer. In other words, the backoff timer may be a value indicating the effective period of the congestion management notified by the NW to the UE based on the rejection of the PDU session establishment. In other words, the UE may use the fourteenth identification information as the value of the timer in the fifteenth behavior that is performed when the fourteenth identification information is received. Furthermore, the fourteenth identification information may include information for identifying the type of congestion management in addition to the timer value. Specifically, information that identifies which of the first congestion management to the fourth congestion management is the congestion management may be included. For example, the information for identifying the congestion management type may be a timer name for identifying each congestion management, or a flag for identifying each congestion management. While not limiting to this, the identification may be performed by other methods such as identification by the position as stored in the control message.

In the present implementation, the fifteenth identification information is information indicating one or more cause values indicating the reason of the rejection of the procedure. In other words, the cause value may be the information indicating the congestion management applied by the NW corresponding to this procedure, or the information indicating the cause value of the rejection of the information of this procedure other than the congestion management applied by the NW.

Furthermore, the cause value may be information for identifying which congestion management of the first congestion management to the fourth congestion management is the congestion management notified by the NW to the UE based on the rejection of the PDU session establishment. In this case, the NW may transmit a different value to the UE as a cause value according to each congestion management of the first congestion management to the fourth congestion management. The UE may understand the meaning of each value transmitted as a cause value in advance, and identify which congestion management of the first congestion management to the fourth congestion management is the congestion management based on at least the fifteenth identification information in the fifteenth behavior.

Alternatively, the cause value may be information for identifying any one congestion management of the first congestion management, the second congestion management, the third congestion management, and the fourth congestion management congestion management is the congestion management notified by the NW to the UE based on the rejection of the PDU session establishment. In this case, the NW may transmit a different value to the UE as a cause value according to the first congestion management and any one of the second congestion management, the third congestion management, and the fourth congestion management. The UE may understand the meaning of each value transmitted as a cause value in advance, and identify whether it is the first congestion management, the second congestion management, the third congestion management, or the fourth congestion management based on at least the fifteenth identification information in the fifteenth behavior.

Alternatively, the cause value may be information for identifying any one congestion management of the first congestion management, the second congestion management, the third congestion management, and the fourth congestion management congestion management is the congestion management notified by the NW to the UE based on the rejection of the PDU session establishment. In this case, the NW may transmit a different value to the UE as a cause value according to the first congestion management, the second congestion management, and any one of the third congestion management and the fourth congestion management. The UE may understand the meaning of each value transmitted as a cause value in advance, and identify whether it is any one of the first congestion management, the second congestion management, the third congestion management, and the fourth congestion management based on at least the fifteenth identification information in the fifteenth behavior.

Alternatively, the cause value may be information for identifying any one congestion management of the first congestion management or the second congestion management, or the third congestion management or the fourth congestion management congestion management is the congestion management notified by the NW to the UE based on the rejection of the PDU session establishment. In this case, the NW may transmit a different value to the UE as a cause value according to the first congestion management or the second congestion management, or the third congestion management or the fourth congestion management. The UE may understand the meaning of each value transmitted as a cause value in advance, and identify whether it is the first congestion management or the second congestion management, or the third congestion management or the fourth congestion management based on at least the fifteenth identification information in the fifteenth behavior.

Alternatively, the cause value may be information for identifying any one congestion management of the second congestion management or the third congestion management, or the first congestion management or the fourth congestion management congestion management is the congestion management notified by the NW to the UE based on the rejection of the PDU session establishment. In this case, the NW may transmit a different value to the UE as a cause value according to the second congestion management or the third congestion management, or the first congestion management or the fourth congestion management. The UE may understand the meaning of each value transmitted as a cause value in advance, and identify whether it is the second congestion management or the third congestion management, or the first congestion management or the fourth congestion management based on at least the fifteenth identification information in the fifteenth behavior.

Alternatively, the cause value may be information for identifying any one congestion management of the second congestion management or the fourth congestion management, or the first congestion management or the third congestion management congestion management is the congestion management notified by the NW to the UE based on the rejection of the PDU session establishment. In this case, the NW may transmit a different value to the UE as a cause value according to the second congestion management or the fourth congestion management, or the first congestion management or the third congestion management. The UE may understand the meaning of each value transmitted as a cause value in advance, and identify whether it is the second congestion management or the fourth congestion management, or the first congestion management or the third congestion management based on at least the fifteenth identification information in the fifteenth behavior.

Alternatively, the cause value may be information indicating that the NW performs congestion management to the UE based on the rejection of the PDU session establishment. In other words, the cause value may be information for the UE to perform any one of the first congestion management to the fourth congestion management. In this case, the cause value may not be information that can identify a specific congestion management.

Furthermore, as a more detailed example of the cause value for rejecting this procedure other than the disclosed congestion management applied by the NW, it may indicate that the external DN using that this procedure does not include the DNN information or is an unknown DNN as the reason and thereby rejecting the cause value of this procedure notified by the NW to the UE (Missing or unknown DNN). Furthermore, it may also indicate that the external DN uses the reason that the PDU session type of this procedure cannot be identified or is not permitted, and thereby, rejects the cause value of this procedure notified by the NW to the UE (Unknown PDU session type). Furthermore, it may also indicate that the external DN uses the reason that the failure of the user authentication and authorization in this procedure, the invalidation of the authentication and authorization, or the invalidation of the authentication and authorization by the NW, and thereby, rejects the cause value of this procedure notified by the NW to the UE (User authentication or authorization or authorization failed). Furthermore, it may also be a cause value in which the NW notifies to the UE that the requested service, operation, or resource reservation request has been rejected based on an unspecified reason (Request rejected, unspecified). Furthermore, it may be a cause value in which the NW notifies the UE that the NW temporarily cannot receive the service request from the UE (Service option temporarily out of order). Furthermore, it may be a cause value in which the NW notifies the UE that the PTI inserted by the UE is already in use (PTI already in use). Furthermore, it may also be a cause value in which the NW notifies the UE that the UE is outside the LADN service area (Out of LADN service area). Furthermore, it may be a cause value in which the NW notifies the UE that only the PDU session type IPv4 is allowed (PDU session type IPv4 only allowed). Furthermore, it may be the cause value in which the NW notifies the UE that only the PDU session type IPv6 is allowed (PDU session type IPv6 only allowed). Furthermore, it may be a cause value in which the NW notifies the UE that the target PDU session is not held when the NW transfers the PDU session from the non-3GPP access to the 3GPP access or from the EPS to the 5GS (PDU session does not exist). Furthermore, it may be a cause value in which the NW notifies the UE that the SSC mode requested by the UE is not supported (Not supported SSC mode). Furthermore, it may indicate that the external DN uses the reason that this procedure does not include the DNN information or an unknown DNN via a specific slice, and thereby, rejects the cause value of this procedure notified by the NW to the UE (Missing or unknown DNN in a slice). Furthermore, it may be a cause value in which the NW notifies the UE that the UE does not meet requirement of the maximum data transmission rate for ensuring the user plane confidentiality required for the service requested by the UE (Maximum data rate per UE for user-plane integrity protection is too low).

Furthermore, in the present implementation, when not performing the third congestion management, the meaning corresponding to the third congestion management in the cause value of the above-disclosed fifteenth identification information is not required, and the cause value in the fifteenth identification information may be a value of the process, descriptions, and meaning of the third congestion management omitted from the above disclosure. Furthermore, in the present implementation, when not performing the fourth congestion management, the meaning corresponding to the fourth congestion management in the cause value of the above-disclosed fifteenth identification information is not required, and the cause value in the fifteenth identification information may be a value of the process, descriptions, and meaning of the fourth congestion management omitted from the above disclosure.

As a more detailed example, the fifteenth identification information for identifying the first congestion management may be a cause value indicating that resources are insufficient (Insufficient resources). Furthermore, the fifteenth identification information for identifying the second congestion management may be a cause value indicating that the resources for a specific slice are insufficient (Insufficient resource for specific slice). Furthermore, the fifteenth identification information for identifying the third congestion management may be a cause value indicating that the resources for a specific slice and DNN are insufficient (Insufficient resources for specific slice and DNN).

Thus, the fifteenth identification information may be information that can identify the type of congestion management, further, it may also be information indicating which congestion management type the backoff timer and/or backoff timer value indicated by the fourteenth identification information corresponds to.

Therefore, UE_A 10 may identify the congestion management type based on the fifteenth identification information. Furthermore, it may determine which congestion management type the backoff timer and/or backoff timer value indicated by the fourteenth identification information corresponds to, based on the fifteenth identification information.

In the present implementation, the sixteenth identification information is one or more indication information indicating that this procedure is rejected. In other words, the indication information may be information indicating the congestion management applied by the NW for this procedure. The NW may indicate the congestion management applied by the NW based on the sixteenth identification information.

For example, the indication information may be information indicating which congestion management in the two or more congestion managements from the first congestion management to the fourth congestion management that the NW restricts the UE. Therefore, the NW may transmit the value associated with the restriction management applied to the UE as indication information. The UE may understand the meaning of each value transmitted as indication information in advance, and identify which one of congestion management of the first congestion management to the fourth congestion management based on at least the sixteenth identification information in the fifteenth behavior. Herein, two or more congestion managements of the first congestion management to the fourth congestion management is a congestion management that can be identified using the indication information. The identification target congestion management may be all four congestion managements, may be the first congestion management and the second congestion management, may be the third congestion management and the fourth congestion management, the second congestion management to the fourth congestion management, or any other combinations thereof.

Furthermore, the indication information may not necessarily be set to a value corresponding to each of the identification target congestion managements. For example, if the value of indication information is assigned to each corresponding congestion management except the congestion management A, the value of indication information may not necessarily be set for the congestion management A. In this case, the NW and the UE may identify the first congestion management without transmitting/receiving the indication information. Furthermore, the congestion management A may be any one congestion management of the first congestion management to the fourth congestion management.

Furthermore, when notifying the UE of congestion management based on the transmission of the PDU session establishment reject message, the identification may or may not be included depending on different congestion management types from the first congestion management to the fourth congestion management. In other words, the NW may use the identification information as information indicating congestion management depending on the congestion management type, or may not use the identification information depending on the congestion management type and use other identification information as information for indicating congestion management.

Furthermore, in the present implementation, when not performing the third congestion management, the meaning corresponding to the third congestion management in the indication information in the above-disclosed sixteenth identification information is not required, and the sixteenth identification information may be the information of the process, description, and meaning of the third congestion management omitted from the above disclosure. Furthermore, in the present implementation, when not performing the fourth congestion management, the meaning corresponding to the fourth congestion management in the indication information in the above-disclosed sixteenth identification information is not required, and the sixteenth identification information may be the information of the process, description, and meaning of the fourth congestion management omitted from the above disclosure.

In the present implementation, the seventeenth identification information is one or more value information indicating that this procedure is rejected. In other words, the value information may be information indicating a congestion management applied by the NW for this procedure. Furthermore, the seventeenth identification information may be information including at least one of identification information for identifying one or more NW slices included in the eighteenth identification information, and/or twelfth identification information.

The NW may also indicate the congestion management applied by the NW based on the seventeenth identification information. In other words, the NW may indicate which one of the first congestion management to the fourth congestion management is applied based on the seventeenth identification information. Furthermore, the NW may indicate the DNN and/or S-NSSAI of the target congestion management applied to the UE based on the transmission of the PDU session reject message based on the seventeenth identification information. For example, when the seventeenth identification information is only DNN #1, it may indicate that the first congestion management that targets the DNN #1 is applied. When the seventeenth identification information is only S-NSSAI #1, it may indicate that the second congestion management that targets the S-NSSAI #1 is applied. When the seventeenth information is composed of the DNN #1 and the S-NSSAI #1, it may indicate that the third congestion management or the fourth congestion management that targets at least one of the DNN #1 and/or the S-NSSAI #1 is applied.

Furthermore, the seventeenth identification information may not necessarily be information for identifying which congestion management from the first congestion management to the fourth congestion management is applied. The seventeenth identification information may be information indicating the DNN and/or S-NSSAI that is the target congestion management identified by other methods, such as identifying based on other identification information.

In the present implementation, the eighteenth identification information may be information indicating that a PDU session establishment request belonging to the first NW slice is rejected, or indicating that a PDU session establishment request or a PDU session modification request belonging to the first NW slice is not permitted. Herein, the first NW slice may be an NW slice determined by the first identification information or a different NW slice. Furthermore, the eighteenth identification information may be information indicating that a PDU session establishment belonging to the first NW slice in the DN identified by the twelfth identification information is not permitted, or indicating that a PDU session establishment belonging to the first NW slice in the DN identified by the thirteenth identification information is not permitted. Furthermore, the eleventh identification information may be information indicating that the PDU session establishment belonging to the first slice in the registration area and/or the tracking area to which UE_A 10 currently belongs is not permitted, or may be information indicating that the PDU session establishment belonging to the first NW slice in the access network connected to the UE_A 10 is not permitted. Furthermore, the eleventh identification information may be identification information for determining the NW slice belonging to the rejected PDU session request or identifying one or more identification information of the NW slices. Furthermore, the eighteenth identification information may be identification information indicating auxiliary information of an appropriate MME for the radio access system to select when the UE switches the connection destination to the EPS. The auxiliary information may be information indicating the DCN ID. Furthermore, the eighteenth identification information may be a network slice association rule which is a rule for associating a plurality of slice information.

In the present implementation, the twenty-first identification information may be information for stopping the one or more first timers that the UE activates, or information indicating that the first timer that the UE activates is stopped. Specifically, the twenty-first identification information may be information indicating the thirteenth identification information associated with the first timer stored in the UE. Furthermore, the twenty-first identification information may be information indicating at least one of the twelfth to eighteenth identification information associated with the first timer stored in the UE.

Furthermore, the twenty-first identification information may be information indicating the modifications in the association between the information indicating at least one of the thirteenth to seventeenth identification information and the first timer stored in the UE. For example, when the first timer of a UE-led session management that suppresses the combination of the DNN #A and the S-NSSAI #A is running, when receiving the NW-led session management request that includes the twenty-first identification information that the connection to the DNN #A is permitted, the UE modifies only the association target of the activated timer to the S-NSSAI #A, and identifies that the UE-led session management request to the DNN #A is permitted. In other words, the twenty-first identification information may be information indicating that the congestion management applied at the time of receiving the twenty-first identification information is modified to another congestion management of the first to fourth congestion management.

Figure 9:
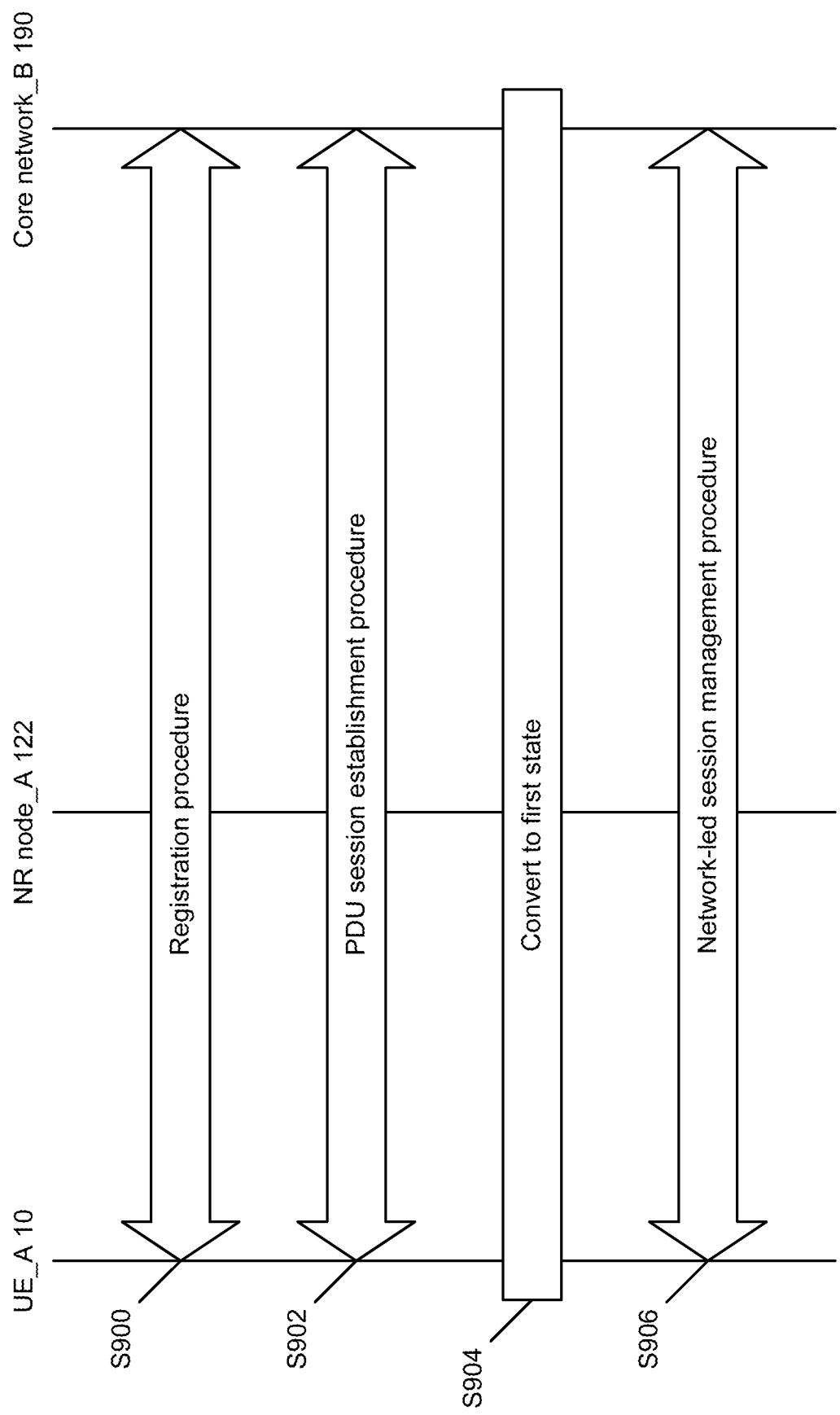
FIG. 9 is a schematic diagram of an initial procedure according to an aspect of the present disclosure.

Subsequently, the initial procedure of the present disclosure will be described with reference to FIG. 9. FIG. 9 is a schematic diagram of an initial procedure according to an aspect of the present disclosure. Hereinafter, the initial procedure is also referred to as this procedure, and this procedure includes the registration procedure, the UE-led PDU session establishment procedure, and the network-led session management procedure. The registration procedure, PDU session establishment procedure, and network-led session management procedure will be described in more detail.

Specifically, each device performs the registration procedure (S900), the UE_A 10 converts to the network registered state (RM-REGISTERED state). Subsequently, each device performs the PDU session establishment procedure (S902), the UE_A 10 establishes a PDU session between the DN_A 5 that provides the PDU connection service via the core network_B 190, and converts the first state between each device (S904). Furthermore, said PDU session is assumed to be established via the access network, UPF_A 235, but is not limited to this. That is, a UPF (UPF_C 239) different from the UPF_A 235 may exist between the UPF_A 235 and the access network. At this time, said PDU session is established via the access network, the UPF_C 239, or the UPF_A 235. Subsequently, each device in the first state may perform the network-led session management procedure at any given timing (S906).

Furthermore, each device may exchange various capability information and/or various request information of each device in the registration procedure and/or the PDU session establishment procedure and/or the network-led session management procedure. Furthermore, when each device exchanges various information and/or negotiates various requests in the registration procedure, and the exchange of various information and/or the negotiation of various requests may or may not be implemented in the PDU session establishment procedure and/or the network-led session management procedure. Furthermore, when each device does not exchange various information and/or does not negotiate various requests in the registration procedure, each device exchanges various information and/or negotiates various requests in the PDU session establishment procedure and/or the network-initiated session management procedure. Furthermore, even when each device exchanges various information and/or negotiates various requests in the registration procedure, each device exchanges various information and/or negotiates various requests in the PDU session establishment procedure and/or the network-led session management procedure.

Furthermore, each device may perform the PDU session establishment procedure in the registration procedure, or after the completion of the registration procedure. Furthermore, when the PDU session establishment procedure is performed in the registration procedure, the PDU session establishment request message may be included in the registration request message for transmitting/receiving, the PDU session establishment accept message may be included in the registration accept message for transmitting/receiving, the PDU session establishment complete message may be included in the registration complete message for transmitting/receiving, the PDU session establishment reject message may be included in the registration reject message for transmitting/receiving. Furthermore, when the PDU session establishment procedure is performed in the registration procedure, each device may establish the PDU session based on the completion of the registration procedure, or may convert the state of the established PDU session between each devices.

Furthermore, each device involved in this procedure transmits/receives each control message described in this procedure, and thereby, transmits/receives one or more identification information included in each control message, and stores each transmitted/received identification information as a context.

[1.3.1. Overview of Registration Procedure]

Firstly, the overview of the registration procedure will be described. The registration procedure is a procedure led by the UE_A 10 for registering in a network (the access network and/or the core network_B 190 and/or the DN_A 5). When not registered in the network, the UE_A 10 may perform this procedure at any given timing such as when the power is turned on. In other words, the UE_A 10 may start this procedure at any timing in the non-registered state (RM-DEREGISTERED state). Furthermore, each device may convert to the registered state (RM-REGISTERED state) based on the completion of the registration procedure.

Furthermore, this procedure may be the procedure that updating the location registration information of the UE_A 10 in the network, and/or periodically notifying the network of the state of the UE_A 10 from the UE_A 10, and/or updating specific parameters relating to the UE_A 10 in the network.

Furthermore, the UE_A 10 may start this procedure when performing mobility across the TAs. In other words, the UE_A 10 may start this procedure when moving to a TA different from the TA indicated in the TA list as held. Furthermore, the UE_A 10 may start this procedure when the timer expires. Furthermore, the UE_A 10 may start this procedure when the context of each device needs to be updated due to disconnection or prohibition (also referred to as deactivation) of the PDU session. Furthermore, the UE_A 10 may start this procedure when modifications occur in the capability information and/or the priority related to the PDU session establishment of the UE_A 10. Furthermore, the UE_A 10 may start this procedure periodically. Furthermore, the UE_A 10 is not limited to these, and may perform this procedure at any timing as long as the PDU session is established.

[1.3.1.1. Example of Registration Procedure]

Figure 10:
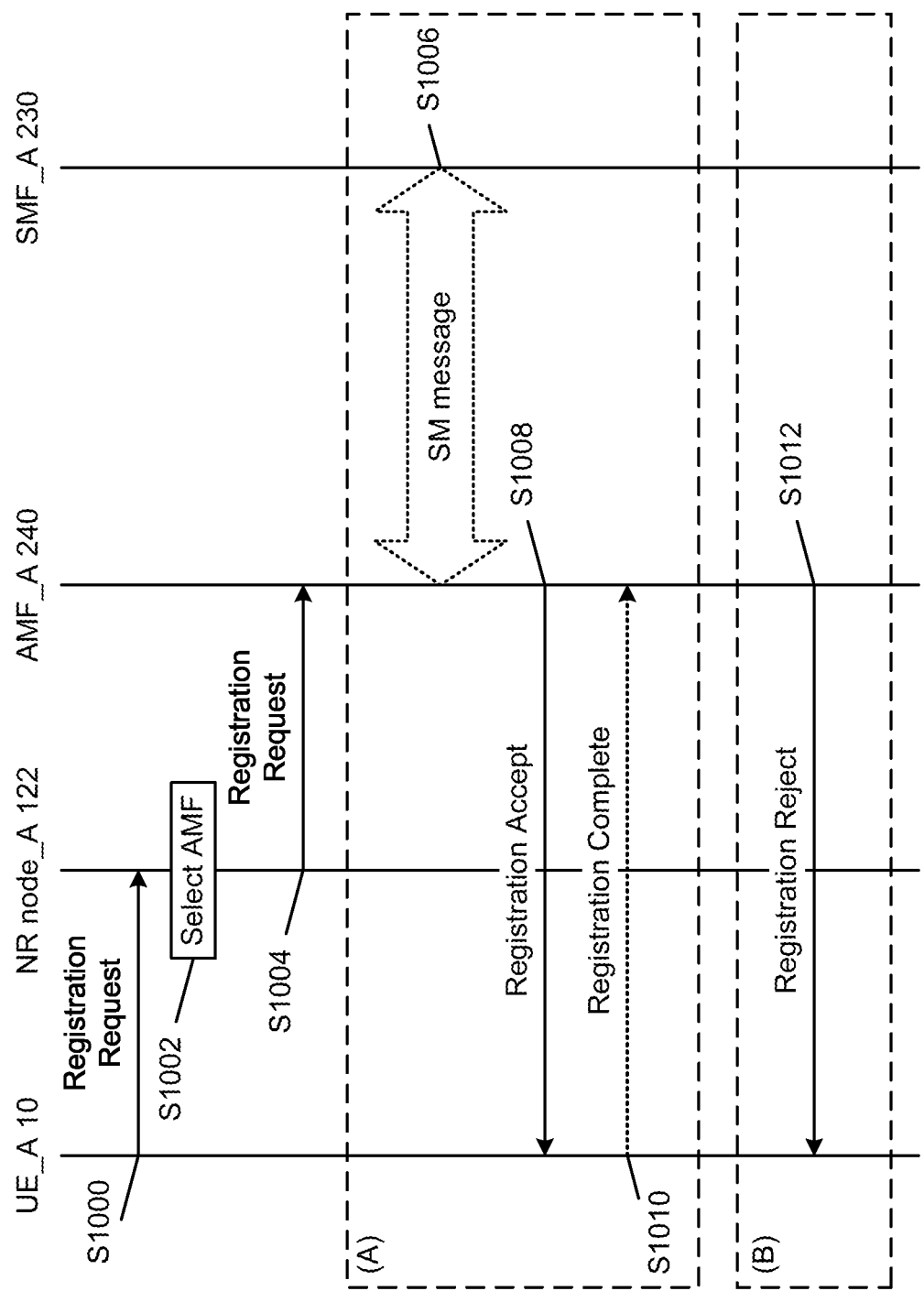
FIG. 10 is a schematic diagram of a registration procedure according to an aspect of the present disclosure.

An example of the steps performing the registration procedure will be described with reference to FIG. 10. FIG. 10 is a schematic diagram of a registration procedure according to an aspect of the present disclosure. In this section, this procedure refers to the registration procedure. Hereinafter, each step of this procedure will be described.

Firstly, the UE_A 10, via the NR node (also referred to as gNB)_A 122 and/or the ng-eNB, transmits a registration request message to the AMF_A 240 (S1000) (S1002) (S1004), and starts the registration procedure. Furthermore, the UE_A 10 transmits an SM message (for example, the PDU session establishment request message) by including the SM (Session Management) message (for example, the PDU session establishment request message) in the registration request message, or transmits together with the registration request message. Thereby, a procedure for session management (SM) such as a PDU session establishment procedure may be started during the registration procedure.

Specifically, the UE_A 10 transmits an RRC (Radio Resource Control) message including a registration request message to the NR node_A 122 and/or the ng-eNB (S1000). The NR node_A 122 and/or the ng-eNB, when receiving the RRC message including the registration request message, extracts the registration request message from the RRC message and selects the AMF_A 240 as the NF or shared CP function of the routing destination of the registration request message (S1002). Herein, the NR node_A 122 and/or the ng-eNB selects the AMF_A 240 based on the information included in the RRC message. The NR node_A 122 and/or the ng-eNB transmits or transfers the registration request message to the selected AMF_A 240 (S1004).

Furthermore, the registration request message is a NAS (Non-Access-Stratum) message transmitted/received on the N1 interface. Furthermore, the RRC message is a control message transmitted/received between the UE_A 10 and the NR node_A 122 and/or the ng-eNB. Furthermore, the NAS message is processed in the NAS layer, the RRC message is processed in the RRC layer, and the NAS layer is a layer higher than the RRC layer.

Furthermore, when there are a plurality of NSI requesting registration, the UE_A 10 may transmit a registration request message for each NSI, or transmit a plurality of registration request messages included in one or more RRC messages. Furthermore, the plurality of registration request messages may be included in one or more RRC messages and transmitted as one registration request message.

When the AMF_A 240 receives the registration request message and/or the control message different from the registration request message, the AMF_A 240 performs a first condition determination. The first condition determination is for determining whether the AMF_A 240 accepts the request of UE_A 10. In the first condition determination, the AMF_A 240 determines whether the first condition determination is true or false. When the first condition determination is true (i.e. if the network accepts the request of UE_A 10), the AMF_A 240 starts the procedure (A) in this procedure. If the first condition determination is false (i.e. if the network does not accept the request of UE_A 10), the AMF_A 240 starts the procedure (B) in this procedure.

Hereinafter, when the first condition determination is true, that is, each step of the procedure (A) in this procedure is described. The AMF_A 240 performs the fourth condition determination and starts the procedure (A) in this procedure. The fourth condition determination is to determine whether the SM message transmission/reception is performed between the SMF_A 230. In other words, the fourth condition determination may be that the AMF_A 240 determines whether to perform the PDU session establishment procedure during this procedure. When the fourth condition determination is true (that is, when the AMF_A 240 transmits/receives the SM message to/from the SMF_A 230), the AMF_A 240 selects the SMF_A 230 and transmits/receives the SM message to/from the selected SMF_A 230. When the fourth condition determination is false (that is, when the AMF_A 240 does not transmit/receive the SM message to/from the SMF_A 230), the descriptions are omitted (S1006). Furthermore, when the AMF_A 240 receives the SM message indicating the rejection from the SMF_A 230, the AMF_A 240 may stop the procedure (A) in this procedure and start the procedure (B) in this procedure.

Furthermore, the AMF_A 240, based on the reception of the registration request message from the UE_A 10 and/or the completion of the transmission/reception of the SM message to/from the SMF_A 230, transmits a registration acceptance (Registration Accept) message to the UE_A 10 (S1008) via the NR node_A 122. For example, when the fourth condition determination is true, the AMF_A 240 may transmit the registration accept message based on the reception of the registration request message from the UE_A 10. Furthermore, when the fourth condition determination is false, the AMF_A 240 may transmit the registration accept message based on the completion of the transmission/reception of the SM message to/from the SMF_A 230. Herein, the registration accept message may be transmitted as a response message to the registration request message. Furthermore, the registration accept message is a NAS message transmitted/received on the N1 interface. For example, the AMF_A 240 transmits it to the NR node_A 122 as a control message of the N2 interface, and the NR node_A 122 that receives it includes it in the RRC message and transmits to the UE_A 10.

Furthermore, when the fourth condition determination is true, the AMF_A 240 transmits the registration accept message including the SM message (for example, the PDU session establishment accept message) or transmits the SM message (for example, the PDU session establishment accept message) together with the registration accept message. The transmission method may be performed by including the SM message (for example, the PDU session establishment request message) in the registration request message and performed when the fourth condition determination is true. Furthermore, the transmission method may be performed when the SM message (for example, the PDU session establishment request message) is included together with the registration request message, and the fourth condition determination is true. The AMF_A 240 may indicate that the procedure for the SM has been accepted by performing said transmission method.

The UE_A 10 receives the registration accept message via the NR node_A 122 (S1008). Upon receiving the registration accept message, the UE_A 10 identifies the contents of various identification information included in the registration accept message.

Next, the UE_A 10 transmits a registration complete message to the AMF_A 240 based on the reception of the registration accept message (S1010). Furthermore, when the UE_A 10 receives the SM message such as the PDU session establishment accept message, the registration complete message may be transmitted by including the SM message such as the PDU session establishment complete message, or may indicate the procedure for the SM by including the SM message. Herein, the registration complete message may be transmitted as a response message to the registration accept message. Furthermore, the registration complete message is a NAS message transmitted/received on the N1 interface. For example, the UE_A 10 includes it in the RRC message and transmits the RRC message to the NR node_A 122, and the NR node_A 122 that receives this transmits to the AMF_A 240 as a control message of the N2 interface.

The AMF_A 240 receives the registration complete message (S1010). Furthermore, each device completes the procedure (A) in this procedure based on the transmission/reception of the registration accept message and/or the registration complete message.

Subsequently, when the first condition determination is false, that is, each step of the procedure (B) in this procedure will be described. The AMF_A240 starts the procedure of (B) in this procedure by transmitting a Registration Reject message to the UE_A 10 via the NR node_A 122 (S1012). Herein, the registration reject message may be transmitted as a response message to the registration request message. Furthermore, the registration reject message is a NAS message transmitted/received on the N1 interface. For example, the AMF_A 240 transmits it to the NR node_A 122 as a control message of the N2 interface, and the NR node_A 122 that receives this message includes it in the RRC message and transmits the RRC message to the UE_A 10. Furthermore, the registration reject message transmitted by the AMF_A 240 is a message that rejects the request of the UE_A 10, however, it is not limited to this.

Furthermore, the procedure (B) in this procedure may be started when the procedure (A) in this procedure is canceled. In the procedure (A), when the fourth condition determination is true, the AMF_A 240 may include an SM message indicating rejection such as a PDU session establishment reject message in the registration reject message for transmitting, or may indicate the procedure for the SM by including the SM message. In that case, the UE_A 10 may further receive an SM message such as a PDU session establishment reject message that indicates rejection, or may identify that the procedure for the SM has been rejected.

Furthermore, the UE_A 10 may identify that the request of the UE_A 10 is rejected by receiving the registration reject message or by not receiving the registration accept message. Each device completes the procedure (B) in this procedure based on the transmission/reception of the registration reject message.

Each device completes this procedure (registration procedure) based on the completion of procedure (A) or (B) in this procedure. Furthermore, each device may convert to the state (RM_REGISTERED state) in which the UE_A 10 is registered in the network based on the completion of the procedure (A) in this procedure. The UE_A 10 may maintain a state (RM_DEREGISTERED state) in which the UE_A 10 is not registered in the network based on the completion of the procedure (B) in this procedure. Furthermore, the conversion of each device to each state may be performed based on the completion of this procedure or may be performed based on the establishment of the PDU session.

Furthermore, each device may perform processing of the identification information transmitted/received in this procedure based on the completion of this procedure.

Furthermore, the first condition determination may be performed based on the identification information and/or the subscriber information and/or the network operator policy included in the registration request message. For example, the first condition determination may be true when the network permits the request of the UE_A 10. Furthermore, the first condition determination may be false when the network does not permit the request of the UE_A 10. Furthermore, the first condition determination may be true when the network of the UE_A 10 registration destination and/or devices in the network support the function requested by the UE_A 10, and may be false when the above is not supported. Furthermore, the first condition determination may be true when the network is determined to be in a congestion state, and may be false when the network is determined to be not in a congestion state. Furthermore, the conditions that determines whether the first condition determination is true or false is not limited to the conditions described above.

Furthermore, the fourth condition determination may be performed based on whether the AMF_A 240 receives the SM, or may be performed based on whether the registration request message includes the SM message. For example, the fourth condition determination may be true when the AMF_A 240 receives the SM message and/or the registration request message includes the SM message; it may be false when the AMF_A 240 does not receive the SM and/or the registration request message does not include the SM message. Furthermore, the condition that determines whether the fourth condition determination is true or false is not limited to the conditions described above.

[1.3.2. Overview of PDU Session Establishment Procedure]

Subsequently, an overview of the PDU session establishment procedure performed to establish a PDU session for the DN_A 5 will be described. Hereinafter, the PDU session establishment procedure is also referred to as this procedure. This procedure is a procedure for each device to establish a PDU session. Furthermore, each device may perform this procedure in a state in which the registration procedure is completed, or may perform this procedure during the registration procedure. Furthermore, each device may start this procedure in the registered state, or may start this procedure at any given timing after the registration procedure. Furthermore, each device may establish a PDU session based on the completion of the PDU session establishment procedure. Furthermore, each device may establish a plurality of PDU sessions by performing this procedure multiple times.

[1.3.2.1. Example of PDU Session Establishment Procedure]

Figure 11:
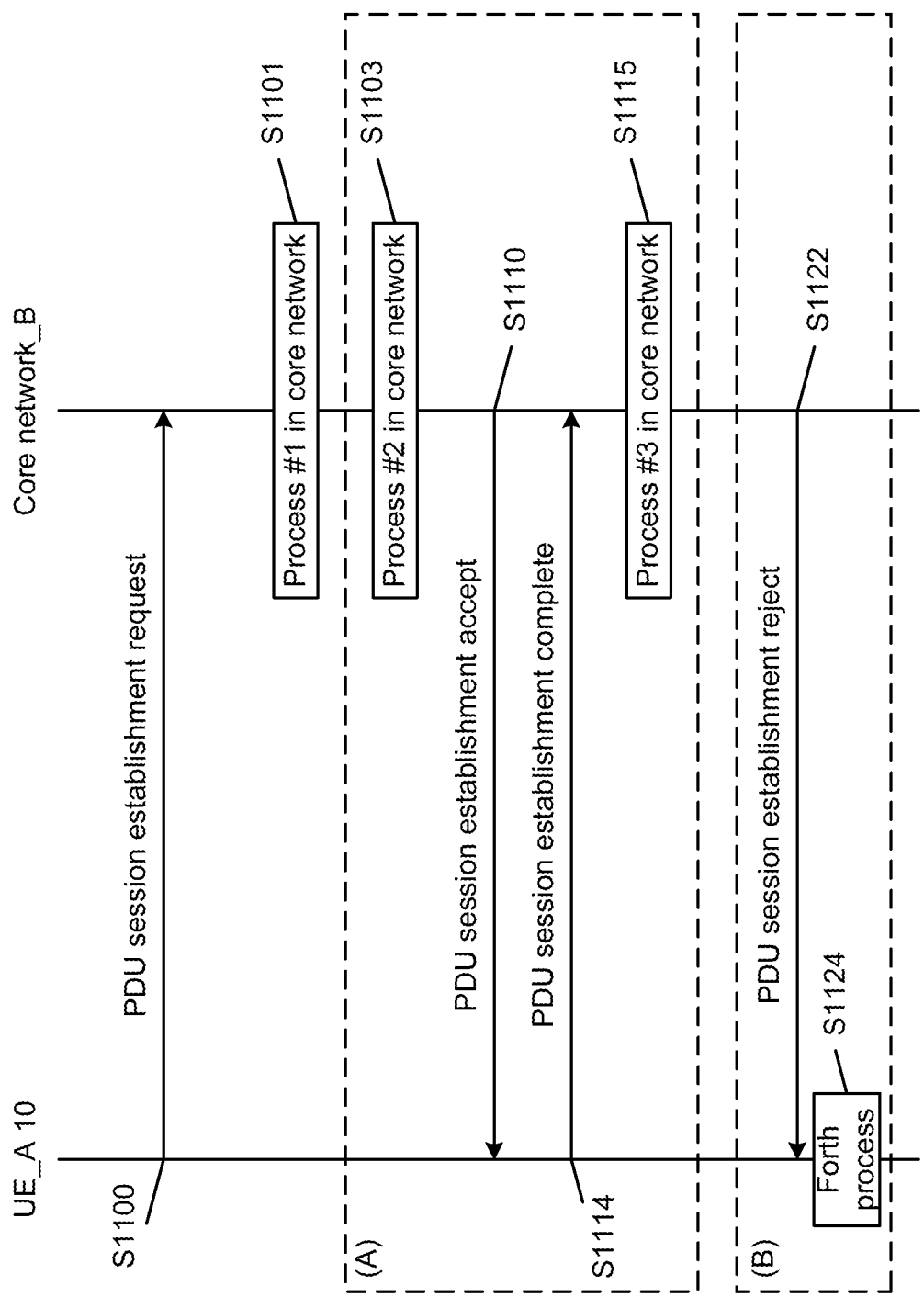
FIG. 11 is a schematic diagram of a Protocol Data Unit or Packet Data Unit (PDU) session establishment procedure according to an aspect of the present disclosure.

An example of a procedure for executing the PDU session establishment procedure will be described with reference to FIG. 11. FIG. 11 is a schematic diagram of a Protocol Data Unit or Packet Data Unit (PDU) session establishment procedure according to an aspect of the present disclosure. Hereinafter, each step of this procedure will be described. Firstly, the UE_A 10 starts the PDU session establishment procedure by transmitting a PDU Session Establishment Request message to the core network_B via the access network_B (S1100).

Specifically, the UE_A 10 uses the N1 interface to transmit a PDU session establishment request message to the AMF_A 240 in the core network_B 190 via the NR node_A 122 (S1100). The AMF_A receives the PDU session establishment request message and performs the third condition determination. The third condition determination is for determining whether the AMF_A accepts the request of the UE_A 10. In the third condition determination, the AMF_A determines whether the fifth condition determination is true or false. The core network_B starts the process #1 in the core network when the third condition determination is true (S1101), and starts the procedure (B) in this procedure when the third condition determination is false. Furthermore, the steps when the third condition judgment is false will be described. Herein, the process #1 in the core network may be performing the SMF selection by the AMF_A in the core network_B 190 and/or the transmission/reception of a PDU session establishment request message of the AMF_A and SMF_A.

The core network_B 190 starts the processing #1 in the core network. In the process #1 in the core network, the AMF_A 240 may select the SMF_A 230 as the NF of the routing destination of the PDU session establishment request message, and transmit or transfer the PDU session establishment request message to the selected SMF_A 230 using the N11 interface. Herein, the AMF_A 240 may select the routing destination SMF_A 230 based on the information included in the PDU session establishment request message. More specifically, the AMF_A 240 may select the routing destination SMF_A 230 based on each identification information obtained from the reception of the PDU session establishment request message, and/or the subscriber information, and/or the network capability information, and/or the network operator policy, and/or the network state, and/or the context held by the AMF_A 240.

Furthermore, the PDU session establishment request message may be a NAS message. Furthermore, the PDU session establishment request message is not limited to this, and may be any message as long as the message for requesting establishment of a PDU session.

Herein, the UE_A 10 may include one or more of the identification information from the first to fourth identification information in the PDU session establishment request message, and indicate the request of the UE_A 10 by including these identification information. Furthermore, two or more of identification information of these identification information may be configured as one or more of identification information.

Furthermore, the UE_A 10 may transmit the request of an establishment of a PDU session belonging to a network slice by including the first identification information, and/or the second identification information, and/or the third identification information, and/or the fourth identification information in the PDU session establishment request message, or may indicate the network slice to which the PDU session belongs as requested by the UE_A 10, or may indicate the predetermined network slice to which the PDU session will belong.

More specifically, by transmitting the first identification information and the second identification information in association with each other, in the PDU session established for the DN identified by the second identification information, the UE_A 10 may request an establishment of a PDU session belonging to a network slice, or may indicate the network slice to which the PDU session belongs as requested by the UE_A 10 or may indicate the predetermined network slice to which the PDU session will belong.

Furthermore, by combining two or more of identification information of the first to fourth identification information, the UE_A 10 may perform a request of the above combined matters. Furthermore, the matters indicated by the UE_A 10 transmitting each identification information are not limited to these.

Furthermore, the UE_A 10 may determine which identification information to be included in the PDU session establishment request message from the first to fourth identification information based on the capability information of UE_A 10, and/or the policies such as the UE policy, and/or the selection priority of the UE_A 10, and/or the application (higher layer). Furthermore, the determination of which identification information is included in the PDU session establishment request message by the UE_A 10 is not limited to this.

The SMF_A 230 in the core network_B 190 receives the PDU session establishment request message and performs the third condition determination. The third condition determination is for determining whether the SMF_A230 accepts the request of the UE_A 10. In the third condition determination, the SMF_A 230 determines whether the third condition determination is true or false. The SMF_A 230 starts the procedure (A) in this procedure when the third condition determination is true, and starts the procedure (B) in this procedure when the third condition determination is false. Furthermore, the steps when the third condition determination is false will be described.

Hereinafter, the steps when the third condition determination is true, that is, each step of procedure (A) in this procedure will be described. The SMF_A 230 selects the UPF_A 235 of the establishment destination of the PDU session, and performs the eleventh condition determination.

Herein, the eleventh condition determination is for determining whether each device performs the process #2 in the core network. Herein, the process #2 in the core network may include the start of the PDU session establishment authentication procedure performed by each device, and/or the transmission/reception of the session establishment request message between the SMF_A and the UPF_A in the core network_B 190, and/or the transmission/reception of the session establishment response message (S1103). In the eleventh condition determination, the SMF_A 230 determines whether the eleventh condition determination is true or false. The SMF_A 230 starts the PDU session establishment authentication approval procedure when the eleventh condition determination is true, and omits the PDU session establishment authentication approval procedure when the eleventh condition determination is false. Furthermore, the PDU session establishment authentication approval procedure of the process #2 in the core network will be described in detail.

Subsequently, the SMF_A 230 transmits the session establishment request message to the selected UPF_A 235 based on the eleventh condition determination and/or the completion of the PDU session establishment authentication approval procedure, and starts the procedure (A) in this procedure. Furthermore, the SMF_A 230 may start the procedure (B) in this procedure and do not start the procedure (A) in this procedure based on the completion of the PDU session establishment authentication approval procedure.

Herein, the SMF_A 230 may select one or more the UPF_A 235 based on each identification information obtained based on the reception of the PDU session establishment request message, and/or the network capability information, and/or the subscriber information, and/or the network operator policy, and/or the network state, and/or the context held by the SMF_A 230. Furthermore, when a plurality of UPF_A 235 are selected, the SMF_A 230 may transmit a session establishment request message to each UPF_A 235.

The UPF_A 235 receives the session establishment request message, and creates a context for the PDU session. Furthermore, the UPF_A 235 transmits a session establishment response message to the SMF_A 230 based on the session establishment request message received and/or the context for the PDU session created. Furthermore, the SMF_A 230 receives the session establishment response message. Furthermore, the session establishment request message and the session establishment response message may be the control messages transmitted/received on the N4 interface. Furthermore, the session establishment response message may be a response message for the session establishment request message.

Furthermore, the SMF_A 230 may perform the address allocation for the addresses to be allocated to the UE_A 10 based on the reception of the PDU session establishment request message and/or the selection of the UPF_A 235 and/or the reception of the session establishment response message. Furthermore, the SMF_A 230 may perform the address allocation for the addresses to be allocated to the UE_A 10 in the PDU session establishment procedure or after the PDU session establishment procedure is completed.

Specifically, when allocating an IPv4 address without using the DHCPv4, the SMF_A 230 may perform the address allocation in the PDU session establishment procedure or may transmit the allocated address to the UE_A 10. Furthermore, when allocating an IPv4 address, and/or an IPv6 address, and/or an IPv6 prefix using the DHCPv4 or DHCPv6 or SLAAC (Stateless Address Auto-configuration), after the PDU session establishment procedure, the SMF_A 230 may perform the address allocation or transmit the allocated address to the UE_A 10. Furthermore, the address allocation performed by the SMF_A 230 is not limited to this.

Furthermore, the SMF_A 230 may include the allocated address in the PDU session establishment accept message and transmit it to the UE_A 10 based on the completion of the address allocation for the addresses to be allocated to the UE_A 10, or transmit it to the UE_A 10 after the completion of the PDU session establishment procedure.

The SMF_A 230 transmits a PDU session establishment accept message to the UE_A 10 via the AMF_A 240 based on the reception of the PDU session establishment request message, and/or the selection of the UPF_A 235, and/or the reception of the session establishment response message, and/or the completion of the address allocation for the addresses to be allocated to the UE_A 10 (S1110).

Specifically, the SMF_A 230 transmits a PDU session establishment accept message to the AMF_A 240 using the N11 interface. The AMF_A 240 that receives the PDU session establishment accept message transmits the PDU session establishment accept message to the UE_A 10 using the N1 interface.

Furthermore, when the PDU session is a PDN connection, the PDU session establishment accept message may be a PDN connectivity accept message. Furthermore, the PDU session establishment accept message may be a NAS message transmitted/received on the N11 interface and the N1 interface. Furthermore, the PDU session establishment accept message is not limited to this, and may be any message as long as the message indicates that the establishment of the PDU session is accepted.

The UE_A 10 receives the PDU session establishment accept message from the SMF_A 230. Upon receiving the PDU session establishment accept message, the UE_A 10 identifies the contents of various identification information included in the PDU session establishment accept message.

Subsequently, the UE_A 10 transmits a PDU session establishment complete message to the SMF_A 230 via the AMF_A 240 based on the completion of reception of the PDU session establishment accept message (S1114). Furthermore, the SMF_A 230 receives the PDU session establishment complete message and performs the second condition determination.

Specifically, the UE_A 10 transmits a PDU session establishment complete message to the AMF_A 240 using the N1 interface, and the AMF_A 240 that receives the PDU session establishment complete message transmits the PDU session establishment complete message to the SMF_A 230 using the N11 interface.

Furthermore, when the PDU session is a PDN connection, the PDU session establishment complete message may be a PDN connectivity complete message or an activate default EPS context accept message. Furthermore, the PDU session establishment complete message may be a NAS message transmitted/received on the N1 interface and the N11 interface. Furthermore, the PDU session establishment complete message may be a response message to the PDU session establishment accept message, and is not limited to this and may be a message indicating that the PDU session establishment procedure is completed.

The second condition determination is for the SMF_A 230 to determine the type of message transmitted/received on the N4 interface. When the second condition determination is true, the process #3 in the core network may be started (S1115). Herein, the process #3 in the core network may include the transmission/reception of a session modification request message and/or the transmission/reception of a session modification response message. The SMF_A 230 transmits a session modification request message to the UPF_A 235, and further receives a session modification accept message from the UPF_A 235 that received the session modification request message. Furthermore, when the second condition determination is false, the SMF_A 230 performs the process #2 in the core network. That is, the SMF_A transmits a session establishment request message to the UPF_A 235, and further receives a session modification accept message transmitted by the UPF_A 235 that received the session establishment request message.

Each device completes the procedure (A) in this procedure based on the transmission/reception of a PDU session establishment complete message, and/or the transmission/reception of a session modification response message, and/or the transmission/reception of a session establishment response message, and/or the transmission/reception of a RA (Router Advertisement).

Subsequently, the steps when the third condition determination is false, that is, each step of the procedure (B) in this procedure will be described. The SMF_A 230 transmits a PDU session establishment reject message to the UE_A 10 via the AMF_A 240 (S1122), and starts the procedure (B) in this procedure.

Specifically, the SMF_A 230 transmits a PDU session establishment reject message to the AMF_A 240 using the N11 interface, and the AMF_A 240 that receives the PDU session establishment request message transmits the PDU session establishment reject message to the UE_A 10 using the N1 interface.

Furthermore, when the PDU session is a PDN connection, the PDU session establishment reject message may be a PDN connectivity reject message. Furthermore, the PDU session establishment reject message may be a NAS message transmitted/received on the N11 interface and the N1 interface. Furthermore, the PDU session establishment reject message is not limited to this, and may be any message as long as the message indicates that the establishment of the PDU session is rejected.

Herein, the SMF_A 230 may include one or more identification information from the eleventh to the eighteenth identification information in the PDU session establishment reject message, or may indicate the request of the UE_A 10 is rejected by including these identification information. Furthermore, two or more identification information of these identification information may be configured as one or more identification information.

Furthermore, the SMF_A 230 may include the eleventh identification information, and/or the twelfth identification information, and/or the thirteenth identification information, and/or the fourteenth identification information, and/or the fifteenth identification information, and/or the sixteenth identification information, and/or the seventeenth identification information, and/or the eighteenth identification information in the PDU session establishment reject message and transmits it to indicate that the request to establish the PDU session belonging to the network slice is rejected, or to indicate that the network slice that the PDU session belongs to is not permitted.

More specifically, the SMF_A 230 may transmit the eighteenth identification information and the twelfth identification information in association with each other to indicate that the request to establish the PDU session belonging to the network slice is rejected in the PDU session established for the DN identified by the twelfth identification information, or to indicate that the network slice that the PDU session belongs to is not permitted.

Furthermore, the SMF_A 230 may transmit the PDU session establishment reject message by including the eighteenth identification information included in the PDU session establishment reject message to indicate that the request to establish the PDU session that belongs to the network slice in the registered area and/or the tracking area that the UE_A 10 currently belongs to is rejected, or to indicate that the network slice that the PDU session belongs to is not permitted.

Furthermore, the SMF_A 230 may transmit the PDU session establishment reject message by including the eighteenth identification information included in the PDU session establishment reject message to indicate that the request to establish the PDU session that belongs to the network slice in the access network that the UE_A 10 currently connects to is rejected, or to indicate that the network slice that the PDU session belongs to is not permitted.

Furthermore, the SMF_A 230 may transmit the PDU session establishment reject message by including the eleventh identification information and/or the fourteenth identification information to indicate the value of the first timer, or may indicate, after completion of this procedure, whether the same procedure as this procedure should be performed again.

Furthermore, by combining two or more of identification information of the eleventh to eighteenth identification information, the SMF_A 230 may perform a request of the above combined matters. Furthermore, the matters indicated by the SMF_A 230 transmitting each identification information are not limited to these.

Furthermore, the SMF_A 230 may determine which identification information to be included in the PDU session establishment reject message from the first to eighteenth identification information based on the received identification information, and/or the capability information, and/or the policies such as the network operator policy, and/or the network state.

Furthermore, the twelfth identification information may be information indicating the same DNN as the DNN indicated by the second identification information. Furthermore, the thirteenth identification information may be information indicating the same PDU session ID as the PDU session ID indicated by the third identification information. Furthermore, the eighteenth identification information may be information transmitted when the first identification information is received and/or when the network slice indicated by the first identification information is not permitted by the network. Furthermore, the determination by the SMF_A 230 which identification information should be included in the PDU session establishment reject message is not limited to this.

As above, the core network_B 190 notifies the UE_A 10 of the congestion management to be applied by transmitting the PDU session reject message. Thereby, the core network_B 190 may notify: the congestion management applied to the UE_A 10, and/or indicating to perform the congestion management to the UE_A 10, and/or information to identify the type of congestion management applied, and/or information identifying the target of congestion management such as DNN and/or S-NSSAI corresponding to the congestion management applied, and/or the value of the timer associated with the congestion management applied.

Herein, each of the above information may be information identified by one or more of identification information from the eleventh identification information to the eighteenth identification information.

The UE_A 10 may receive, from the SMF_A230, the PDU session establishment reject message, which may include one or more identification information of the eleventh to eighteenth identification information.

Subsequently, the UE_A 10 performs the fourth process based on the reception of the PDU session establishment reject message (S1124). Furthermore, the UE_A 10 may perform the fourth processing based on the completion of this procedure.

Hereinafter, the first example of the fourth process will be described.

Herein, the fourth process may be a process that the UE_A 10 identifies the matter indicated by the SMF_A 230. Furthermore, the fourth process may be a process that the UE_A 10 stores the received identification information as a context, or may be a process of transmitting the received identification information to a higher layer and/or a lower layer. Furthermore, the fourth process may be a process that the UE_A 10 identifies that the request for this procedure is rejected.

Furthermore, when UE_A 10 receives the fourteenth identification information and the eleventh identification information, the fourth process is a process that the UE_AO sets the value indicated by the fourteenth identification information as the first timer value, or it may be a process that starts the setting of a timer value of a first timer. Furthermore, when the UE_A 10 receives the eleventh identification information, the fourth process may be a process that performs one or more of the first to eleventh behaviors disclosed above.

Furthermore, when UE_A 10 receives the eighteenth identification information and the eleventh identification information, the fourth process may be a process that the UE_A 10 performs the twelfth behavior based on information identifying the NW slice included in the eighteenth identification information, and the network slice association rule included in the eighteenth identification information or the network slice association rule set and held in the UE_A 10 in advance.

Furthermore, when UE_A 10 receives a plurality of the fourteenth identification information and the eleventh identification information, the fourth process may be a process that the UE_A 10 performs the thirteenth behavior based on the plurality of first timers included in each fourteenth identification information and the priority management rule of the back-off timer held in the UE_A 10.

Furthermore, when UE_A 10 receives a plurality of the fourteenth identification information and the eleventh identification information, the fourth process may be a process that the UE_A 10 performs the fourteenth behavior based on the plurality of first timers included in each fourteenth identification information.

Herein, the twelfth to fifteenth behaviors may be the congestion management led by the UE_A 10 based on the internal rules and/or policies of the UE_A 10. Specifically, for example, the UE_A 10 is composed of a storage unit and/or a control unit inside the UE_A 10, the storage unit and/or the control unit having: a policy (UE policy) and/or a rule, a management function of a policy and/or rule, a policy enforcer that operates UE_A 10 based on a policy and/or a rule, one or more application procedures, one or more session management instances (session managers) for managing one or more PDU sessions to be established or attempted to be established based on a request from each application. The UE_A 10 may realize the UE-led congestion management by performing any one of the twelfth to fifteenth behaviors as the fourth process based on the above.

Herein, the policy and/or rule may include any one or more of the network slice association rule, and/or the backoff timer priority management rule, and/or the NSSP (Network Slice Selection Policy), which may be preset in the UE_A 10, or may be received from the network. Furthermore, herein, the policy enforcer may be an NSSP enforcer. Furthermore, herein, the application procedure may be an application layer protocol, or may establish or attempt to establish a PDU session based on a request from the application layer protocol. Furthermore, herein, the session management instance may be a software element dynamically generated for each PDU session. Furthermore, herein, as the internal process of the UE_A 10, the S-NSSAI may be grouped, or process based on the grouping of S-NSSAI may be performed. Furthermore, the internal configuration and process of the UE_A 10 are not limited to these, and each element may be realized by software, or may be performed as software process inside the UE_A 10.

Furthermore, the UE_A 10 may handover to the EPS in the fourth process or based on the completion of the fourth process, or start the location registration in the EPS based on the DCN ID included in the eighteenth identification information. The handover of the UE_A 10 to the EPS may be based on a handover procedure or may be a RAT handover led by UE_A 10. Furthermore, when the UE_A 10 receives the eighteenth identification information including the DCN ID, the UE_A 10 may handover to the EPS during the fourth process or after the completion of the fourth process.

Furthermore, the fourth process may be a process that the UE_A 10 restarts this procedure after a certain period of time, or a process that the request of the UE_A 10 converts to a limited or restricted state.

Furthermore, the UE_A 10 may convert to the first state upon the completion of the fourth process.

Subsequently, a second example of the fourth process will be described.

Herein, the fourth process may be a process that the UE_A 10 identifies the matter indicated by the SMF_A 230. Furthermore, the fourth process may be a process that the UE_A 10 stores the received identification information as a context, or may be a process of transmitting the received identification information to a higher layer and/or a lower layer.

Furthermore, in the fourth process, it may be a process of identifying the congestion management applied based on one or more identification information of the eleventh identification information to the eighteenth identification information.

Furthermore, in the fourth process, it may be a process of, based on one or more identification information of the eleventh identification information to the eighteenth identification information, identifying which type of the congestion management from the first congestion management to the fourth congestion management, and a process of identifying the DNN and/or the S-NSSAI associated with the congestion management applied. More specifically, this process may be the process described in the fifteenth behavior.

Furthermore, in the fourth process, it may be a process of, based on one or more identification information of the eleventh identification information to the eighteenth identification information, identifying and setting a value of the first timer indicated by the fourteenth identification information associated with the congestion management applied, and starting the timer. More specifically, this process may be the process described in the eighth behavior.

Furthermore, in the fourth processing, one or more of the first to seventh behaviors may be performed with the start or completion of any of the above-disclosed processes.

Furthermore, in the fourth process, one or more of the ninth to fifteenth behaviors may be performed with the start or completion of any of the above-disclosed processes.

Furthermore, the UE_A 10 may convert to the first state with the completion of the fourth process.

Herein, the process contents are described using the first example and the second example for the fourth process, but it is not limited to these processes of the fourth process. For example, the fourth process is a process including a combination of a part of the plurality of detailed processes described in the first example and a part of the plurality of detailed processes described in the second example.

Furthermore, the UE_A 10 may identify that the request of the UE_A 10 is rejected by receiving the PDU session establishment reject message or by not receiving the PDU session establishment accept message. Each device completes the procedure (B) in this procedure based on the transmission/reception of the PDU session establishment reject message.

Each device completes this procedure based on the completion of procedure (A) or (B) in this procedure. Furthermore, each device may convert to a state that the PDU session is established based on the completion of the procedure (A) in this procedure, or based on the completion of the procedure (B) in the procedure. For identifying that this procedure is rejected, it may be converted to a state that the PDU session is not established, or to the first state.

Furthermore, each device may perform processing based on the identification information transmitted/received in this procedure based on the completion of this procedure. In other words, the UE_A 10 may perform the fourth process based on the completion of this procedure, or may transition to the first state after the completion of the fourth process.

Furthermore, the third condition determination may be performed based on the identification information and/or the subscriber information and/or the network operator policy included in the PDU session establishment request message. For example, the third condition determination may be true when the network permits the request of the UE_A 10. Furthermore, the third condition determination may be false, when the network does not permit the request of the UE_A 10. Furthermore, the third condition determination may be true, when the network that is the connection destination of the UE_A 10 and/or the device in the network supports the function requested by the UE_A 10, and may be false when the above does not support it. Furthermore, the third condition determination may be true when the network is determined to be in a congestion state, and may be false when it is determined that the network is not in a congestion state. Furthermore, the condition that determines the true or false of the third condition determination is not limited to the above-mentioned conditions.

Furthermore, the second condition determination may be performed based on whether a session on the N4 interface for the PDU session is established. For example, the second condition determination may be true if the session on the N4 interface for the PDU session is established, and may be false if not established. Furthermore, the condition that determines the true or false of the second condition determination is not limited to the above-mentioned conditions.

Furthermore, the eleventh condition determination may be performed based on the identification information and/or the subscriber information and/or the network operator policy included in the PDU session establishment request message. For example, the eleventh condition determination may be true when the network permits the DN_A 5 authentication and/or authorization to be performed in this procedure. The eleventh condition determination may be false when the network does not permit the DN_A 5 authentication and/or authorization to be performed in this procedure. Furthermore, the eleventh condition determination is true the network that is the connection destination of the UE_A 10 and/or the device in the network supports the DN_A 5 authentication and/or authorization to be performed in this procedure, and may be false when the above does not support it. Furthermore, the eleventh condition determination may be true when the sixty-first identification information is received, and may be false when the sixty-first identification information is not received. In other words, the eleventh condition determination may be true when a container containing information such as SM PDU DN Request Container and/or a container containing multiple information is received, and may be false when the above is not received. Furthermore, the condition that determines the true or false of the eleventh condition determination is not limited to the above-mentioned conditions.

By transmitting/receiving the PDU session reject message in the above procedure, the core network_B 190 notifies the UE_A 10 of the congestion management applied, and the UE_A 10 may apply the congestion management instructed by the core network_B 190. Furthermore, the core network_B 190 and the UE_A 10 may apply a plurality of congestion managements by performing the procedure and process described in this procedure multiple times. Furthermore, each congestion management applied may be different congestion management types, and/or congestion management corresponding to different DNN, and/or congestion management corresponding to different S-NNSAI, and/or a combination of DNN and S-NSSAI congestion management including differences.

[1.3.3. Overview of Network-LED Session Management Procedure]

Subsequently, an overview of the network-led session management procedure will be described. Hereinafter, the network-led session management procedure is also referred to as this procedure. This procedure is a session management procedure that the network leads in performing an established PDU session. Furthermore, this procedure may be performed at any timing after the completion of the above-mentioned registration procedure and/or the PDU session establishment procedure and each device has converted to the first state. Furthermore, each device may transmit/receive a message including identification information for stopping or changing the congestion management in this procedure, or may start a new congestion management instructed by the network based on the completion of this procedure.

Furthermore, the UE_A 10 may also stop the application of the congestion management for identifying based on the control information transmitted/received by this procedure. In other words, the core network_B 190 may notify the UE_A 10 of stopping the application of the congestion management that can be identified using the control information by leading this procedure and further transmitting the control message and control information of this procedure to the UE_A 10.

Furthermore, this procedure may be a network-led PDU session modification procedure, and/or a network-led PDU session release procedure, or may perform network-led session management procedures not limited to these. Furthermore, each device may transmit/receive a PDU session modification message in the network-led PDU session modification procedure, or may transmit/receive a PDU session release message in the network-led PDU session release procedure.

[1.3.3.1. Example of First Network-LED Session Management Procedure]

Figure 12:
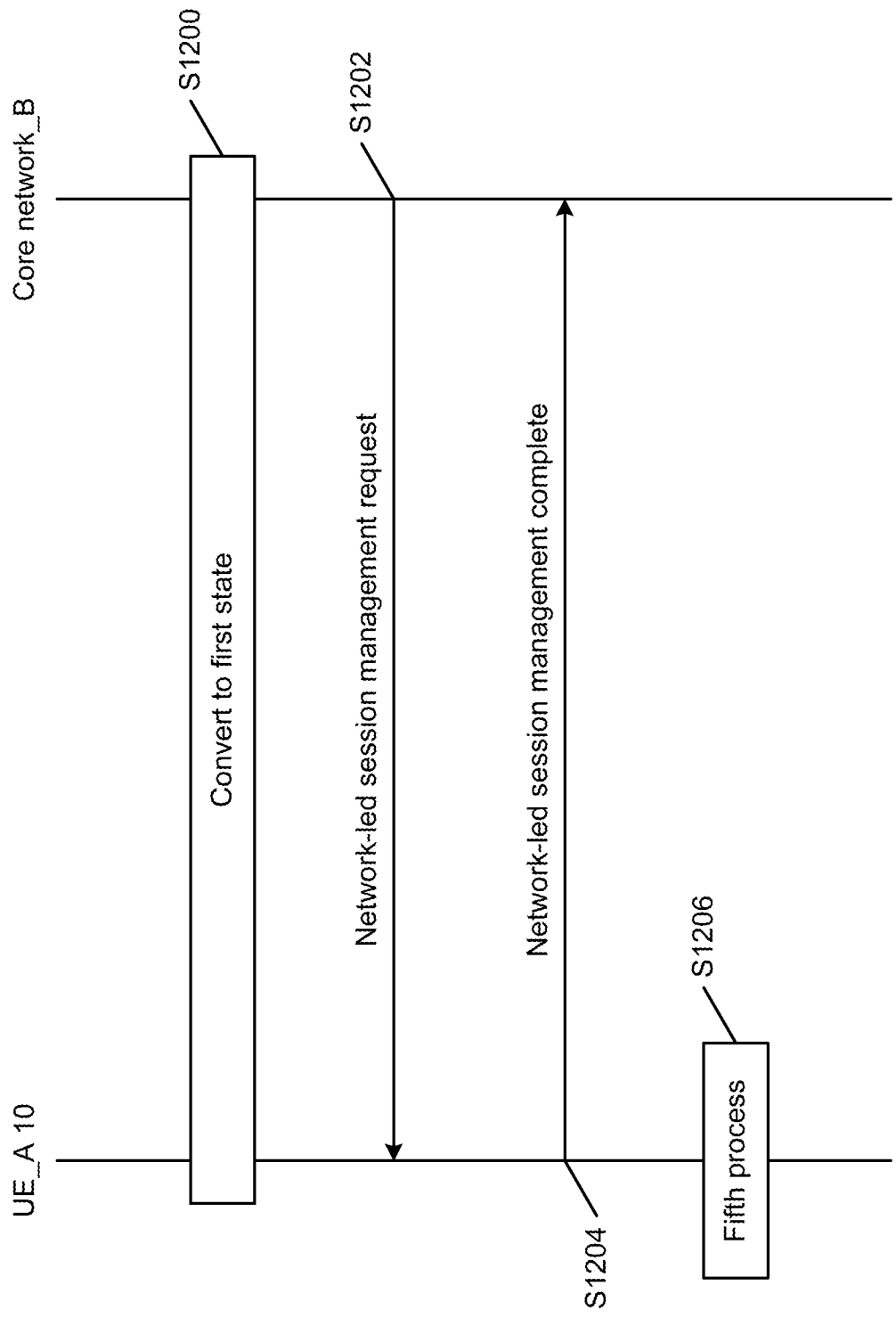
FIG. 12 is a schematic diagram of a network-led session management procedure according to an aspect of the present disclosure.

An example of the network-led session management procedure will be described with reference to FIG. 12. FIG. 12 is a schematic diagram of a network-led session management procedure according to an aspect of the present disclosure. In this section, this procedure refers to the network-led session management procedure. Hereinafter, each step of this procedure will be described.

As described above, based on the completion of the registration procedure and/or the PDU session establishment procedure, each device of the UE_A 10 and the core network_B 190 that converts to the first state (S1200) may start the network-led session management at any given timing. Herein, the device in the core network_B 190 that starts this procedure may be the SMF_A and/or AMF_A, and UE_A, and may transmit/receive the message in this procedure via AMF_A and/or the access network_B.

Specifically, the device in core network_B 190 transmits a network-led session management request message to the UE_A (S1202). Herein, the device in the core network_B 190 may include the twenty-first identification information in the network-led session management request message, or may indicate the request of the core network_B 190 by including the identification information.

Subsequently, the UE_A that receives the network-led session management request message transmits a network management session management complete message (S1204). Furthermore, the UE_A may perform the fifth process based on the twenty-first identification information received from the core network_B 190 (S1206) and complete this procedure. Furthermore, the UE_A 10 may perform the fifth process based on the completion of this procedure.

Hereinafter, an example of the fifth process is described.

Herein, the fifth process may be a process that the UE_A 10 identifies a matter indicated by the core network_B 190, or a process that the request of the core network_B 190 is identified. Furthermore, the fifth process may be a process that the UE_A 10 stores the received identification information as a context, or may be a process that the received identification information is transmitted to a higher layer and/or a lower layer.

Furthermore, the message transmitted/received by the network-led session management request may be a PDU session modification command (PDU SESSION MODIFICATION COMMAND) or a PDU session release command, and not limited to this.

Furthermore, the UE_A 10 may perform the congestion management identification process applied by the UE_A 10 based on the twenty-first identification information received in the fifth process. Herein, the congestion management identification process may be the seventeenth behavior.

Furthermore, when the UE_A 10 receives the twenty-first identification information, the fifth process may be the sixteenth behavior. Specifically, for example, it may be a process of stopping the one or more timers based on the above-mentioned fourth process.

In other words, the UE_A 10 that receives the twenty-first identification information, by performing the seventeenth behavior, identifies the congestion management that performs the stopping or changing instructed by the network, and subsequently, performs the stopping or changing of the identified congestion management by performing the sixteenth behavior.

Furthermore, each device may perform process based on the identification information transmitted/received in this procedure based on the completion of this procedure. In other words, the UE_A 10 may perform the fifth process based on the completion of this procedure, or may complete this procedure after the completion of the fifth process.

In the above procedure, the core network_B 190 may instruct the UE_A 10 to stop or modify the congestion management applied by the UE_A 10 by transmitting/receiving the network-led session management request message. Furthermore, the UE_A 10 can stop or modify the congestion management applied by the UE_A 10 based on the network-led session management request message. Herein, when the UE_A 10 applies one or more congestion management, based on the reception of the identification information included in the network-led session management request message from the core network_B 190, identify the congestion management to be stopped or modified. Furthermore, each congestion management applied may be different congestion management types, and/or congestion management corresponding to different DNN, and/or congestion management corresponding to different S-NNSAI, and/or a combination of DNN and S-NSSAI congestion management including differences.

[1.3.3.2. Example of Second Network-LED Session Management Procedure]

In the first network-led session management procedure example described in the section 1.3.3.1, it describes that an example of stopping congestion management in the procedure regardless of the congestion management applied to the UE_A 10 being which congestion management of the first to fourth congestion management.

Without being limited to this, the procedure described as the example in the first network-led session management procedure of the section 1.3.3.1 may be a procedure performed according to the congestion management. For example, the one or more congestion managements applied by the UE_A 10 may be classified as the procedure of the congestion management performed in the first congestion management, the third congestion management, the fourth congestion management.

In other words, the UE_A 10 may stop the congestion management corresponding to the first congestion management, the third congestion management, and the fourth congestion management with the fifth process.

While performing the timing of the back-off timer associated with the second congestion management, if the UE_10 receives a network-led session management request message for the second congestion management, UE_A 10 may not stop the backoff timer associated with the second congestion management, and may respond to the core network_B 190.

In other words, while performing the timing of the back-off timer associated with the S-NSSAI #A, when the UE_A 10 receives a network-led session management request message for the congested S-NSSAI #A and any DNN, the UE_A 10 may not stop the backoff timer associated with the S-NSSAI #A, and may respond to the core network_B 190.

Thus, for the second congestion management, in receiving the network-led session management request message, the UE_A 10 transmits a response message to the network-led session management request message to the core network_B 190, but may continue the congestion management. Therefore, the transmission of the UE-led session management request message restricted by the second congestion management may continue to be suppressed.

Herein, as described above, the network-led session management request message in the present implementation may be a PDU session modification command message in the network-led PDU session modification procedure, or may be a PDU session release command message in the network-led PDU session release procedure.

Furthermore, as described above, the network-led session management complete message that responds to the PDU session modification command message in the present implementation may be a PDU session modification complete message. The network-led session management complete message that responds to the session release command message may be a PDU session release complete message. Furthermore, when the network-led session management request message is a PDU session modification command and/or a PDU session release message, the UE_A 10 and the core network_B 190 perform the process described above and also the process that will be described in further detailed.

For example, when the core network_B 190 includes the information including a Reactivation Required in a network-led session management request message and transmits it accordingly, it may perform the following process. Furthermore, the information indicating the Reactivation Required is information indicating requesting activation, and a specific example, it may be 5GSM Cause #39.

Hereinafter, an example of the first process and procedure when receiving the information indicating the Reactivation Required will be described.

When the UE_A 10 receives the network-led session management request message including the information indicating the Reactivation Required, the UE_A 10 does not re-lead the UE-led PDU session establishment procedure immediately after the completion of the network-led session management procedure, but waits until the congestion management is released and re-leads the UE-led PDU session establishment procedure. Herein, this UE-led PDU session establishment procedure may be the UE-led PDU session establishment procedure of the PDU session type, the SSC mode, the DNN and the S-NSSAI provided in the UE-led PDU establishment procedure when the modified or released PDU session is established.

Furthermore, waiting until the release of the congestion management may be performed after the timer associated with the second congestion management has expired. In other words, it may be performed after the completion of the timing of the timer associated with the second congestion management and/or after the timer value corresponding to the second congestion management becomes zero.

Furthermore, the UE_A 10 may include the following supplementary information in the network-led session management complete message.

The supplementary information may be information indicating that the timer is waiting for its expiration and/or information indicating the remaining timer value. Herein, the timer may be a timer associated with the second congestion management. Furthermore, waiting for the timer to expire may be performed after the timer has expired. In other words, it may be performed after the completion of the timing of the timer associated with the second congestion management and/or after the timer value corresponding to the second congestion management becomes zero.

Furthermore, the core network_B 190 may identify the value of the remaining timer by receiving the network-led session management complete message including the supplementary information. Furthermore, it may be that, after the time indicated by the remaining timer has elapsed, the UE-led PDU session establishment procedure is identified.

Herein, the remaining timer identified by the core network_B 190 may be the value indicated by the received supplementary information, or the offset value in relation to the UE_A 10 transmission time and the core network_B 190 reception time of the session management complete message led by the network when comparing to the value indicated by the received supplementary information.

Furthermore, it is not only limited to the first process and procedure example when the information indicating the Reactivation Required is received. The following second process and procedure example may be performed when the information indicating the Reactivation Required is received.

As described above, for the second congestion management, in the reception of the network-led session management request message, the UE_A 10 transmits a response message to the network-led session management request message to the core network_B 190, and the congestion management may be continued. Therefore, the transmission of the UE-led session management request message restricted by the second congestion management may continue to be suppressed, however, it may be set to be permitted only when the UE_A 10 and/or the core network_B 190 re-lead the UE-led PDU session establishment procedure.

In other words, when the UE_A 10 receives the network-led session management request message including the information indicating the Reactivation Required, the UE_A 10 re-leads the UE-led PDU session establishment procedure after the network-led session management procedure is completed. Herein, this UE-led PDU session establishment procedure may be the UE-led PDU session establishment procedure of the PDU session type, the SSC mode, the DNN and the S-NSSAI provided in the UE-led PDU establishment procedure when the modified or released PDU session is established.

Furthermore, when the UE_A 10 continues to apply congestion management, the UE_A 10 and the core network_B 190 may perform and complete the procedure permitted as an exception. However, the UE_A 10 may suppress the session management procedure led by other UE of the second congestion management.

Furthermore, it is not only limited to the first and the second process and procedure examples when the information indicating the Reactivation Required is received. The following third process and procedure example may be performed when the information indicating the Reactivation Required is received.

As described above, for the second congestion management, in the reception of the network-led session management request message, the UE_A 10 transmits a response message to the network-led session management request message to the core network_B 190. Furthermore, when the UE_A 10 receives the network-led session management request message including the information indicating the Reactivation Required, the UE_A 10 may stop the application of the second congestion management.

In other words, the UE_A 10 may continue the congestion management when the information indicating the Reactivation Required is not included in the network-led session management request message. In this situation, the transmission of the UE-led session management request message restricted by the second congestion management may continue to be suppressed.

Therefore, when the UE_A 10 receives the network-led session management request message including the information indicating the Reactivation Required, the UE_A 10 re-leads the UE-led PDU session establishment procedure after the network-led session management procedure is completed. Herein, this UE-led PDU session establishment procedure may be the UE-led PDU session establishment procedure of the PDU session type, the SSC mode, the DNN and the S-NSSAI provided in the UE-led PDU establishment procedure when the modified or released PDU session is established.

Furthermore, it is not only limited to the first, the second and the third process and procedure examples when the information indicating the Reactivation Required is received, the information indicating the Reactivation Required may not be transmitted by the core network_B 190 as follows.

More specifically, it may be set as that when the core network_B 190 transmits a network-led session management request message to the UE_A 10 that the congestion management is applied, information indicating a Reactivation Required is suppressed.

Alternatively, it may be set as that when the core network_B 190 transmits a network-led session management request message to the UE_A 10 that the second congestion management is applied, information indicating a Reactivation Required is suppressed.

The processes and procedures of the UE_A 10 and the core network_B 190 are disclosed. The process of the core network_B 190 described in this section may be, more specifically, the processes for the control device such as the SMF_A 230 and/or the AMF_A 240 in the core network_B 190. Therefore, the core network_B 190 transmitting/receiving the control message may mean that the control device such as the SMF_A 230 and/or the AMF_A 240 in the core network_B 190 transmits/receives the control message.

Furthermore, not limited to this section, in the expression used in the description of the present implementation, cancelling or stopping of the application of the congestion management may include the process of cancelling or stopping the backoff timer associated with the congestion management; and continuing of the application of the congestion management or continuing of the congestion management may include continuing the timing of a backoff timer associated with the congestion management.

Furthermore, in the first, second, and third process and procedure examples, when the information indicating the Reactivation Required described in this section is received, the UE_A 10 performing the network-led session management request message and/or the network-led session management procedure for the congested S-NSSAI #A and any DNN is described.

In other words, the congested S-NSSAI #A and any DNN may be the S-NSSAI #A and any DNN associated with the PDU session targeted by the network-led session management request message and/or the network-led session management procedure of this section.

Furthermore, the UE_A 10 and the core network_B 190 may perform the anchor relocation procedure of the SSC mode 2 including the procedures of this section, and handover to the anchor of the PDU session, or handover to a PDU session with a different anchor to continue the communication. Herein, the anchor relocation procedure of the SSC mode 2 is a procedure led by the core network_B 190, and the procedure accompanying the transmission of the PDU session release command performed in this procedure may be any one of the procedures described in this section.

Furthermore, the UE_A 10 and the core network_B 190 may perform the anchor relocation procedure of the SSC mode 3 including the procedures of this section, and handover to the anchor of the PDU session, or handover to a PDU session with a different anchor to continue the communication. Herein, the anchor relocation procedure of the SSC mode 2 is a procedure led by the core network_B 190, and the procedure accompanying the transmission of the PDU session change command performed in this procedure may be any one of the procedures described in this section.

Subsequently, the process when the UE moves with the change of PLMN in a state of the congestion management being applied will be described.

Herein, the process when the UE_A 10 changed the PLMN especially in the state of the first congestion management being applied will be described. Herein, the first congestion management and the restricted process when the first congestion management is applied may be those as described above.

To repeat, the first congestion management may be a congestion management based on the DNN. For example, the first congestion management may be the following congestion management: when the NW receives the UE-led session management request using the DNN #A from the UE_A 10 and the NW detects the congestion for a specific DNN, for example, DNN #A, the NW applies it to the UE_A 10 based on rejecting the UE-led session management request message. In this situation, in the application of the first congestion management, the UE_A 10 starts the timing of the backoff timer associated with the first congestion management received from the NW, and until the backoff timer expires, the UE_A 10 does not to transmit the UE-led session management request using the DNN #A. Furthermore, using the DNN may mean including the DNN information in the UE-led session management request such as a PDU session establishment request message.

Herein, the first congestion management used in the description is referred to as a "first congestion management for a specific DNN."

Furthermore, in the first congestion management, even when the UE-led session management request does not include the DNN information, the NW may select the default DNN with the leading of the NW and set it as the congestion management target. In other words, the first congestion management may be the following congestion management: when the NW receives the UE-led session management request that does not use the DNN information from the UE_A 10 and the NW detects the congestion corresponding to the default DNN, the NW applies it to the UE_A 10 based on rejecting the UE-led session management request message. In this situation, in the application of the first congestion management, the UE_A 10 starts the timing of the backoff timer associated with the first congestion management received from the NW, and until the backoff timer expires, the UE_A 10 does not to transmit the UE-led session management request using the DNN. Furthermore, not using the DNN may mean not including the DNN information in the UE-led session management request such as a PDU session establishment request message.

Herein, for explanation, the first congestion management for the default DNN is applied based on the UE-led session management request that does not use the DNN information. Therefore, for distinguishing from the first congestion management for a specific DNN, it is expressed as "congestion management for No DNN." Furthermore, a UE-led session management request such as a PDU session establishment request message that does not use the DNN is expressed as a UE-led session management request that uses No DNN. For example, a PDU session establishment request message that uses No DNN is a PDU session establishment request message that does not use the DNN.

It also may be that, when the timing of the backoff timer associated with the first congestion management for a specific DNN is performed while changing the PLMN or when the timing of the backoff timer associated with the first congestion management for a specific DNN is deactivated, the UE_A 10 may transmit the PDU session establishment request message using the specific DNN when the UE_A 10 is in a new PLMN. Therefore, based on this configuration, the UE_10 may transmit a PDU session establishment request message using the specific DNN.

Herein, the UE_A 10 may not stop the timing of the backoff timer and continue the timing until the timer expires. Alternatively, the UE_A 10 may continue to hold the deactivated backoff timer in the deactivated state.

In this way, the first congestion management for a specific DNN may be associated with a PLMN.

For example, when the first congestion management for a specific DNN is applied, the UE associates the backoff timer with the PLMN and the specific DNN to start timing, and when the backoff timer is zero or not present due to being deactivated, in the PLMN associated with the backoff timer, the UE does not implement the PDU session establishment using the specific DNN associated with the back-off timer. Furthermore, when the backoff timer is deactivated, the terminal is powered off or before the USIM is removed, in the PLMN associated with the backoff timer, the UE does not implement the PDU session establishment using the specific DNN associated with the back-off timer. Furthermore, when the backoff timer is zero, in the PLMN associated with the backoff timer, the UE may implement the PDU session establishment using the specific DNN associated with the back-off timer.

In other words, it may also be that, when changing the PLMN and executing the back-off timer associated with the first congestion management for a specific DNN and the PLMN before the change, or when deactivating the backoff timer associated with the first congestion management for a specific DNN and the PLMN before the change, and when not executing the back-off timer associated with the first congestion management for a specific DNN and the PLMN after the change, and when not deactivating the backoff timer associated with the first congestion management for a specific DNN and the PLMN after the change, the UE_A 10 may transmit the PDU session establishment request message using the specific DNN when the UE_A 10 is in a new PLMN. Therefore, based on this configuration, the UE_10 may transmit a PDU session establishment request message using the specific DNN.

It may also be that, when changing the PLM and executing the backoff timer associated with the first congestion management for No DNN, or deactivating the backoff timer associated with the first congestion management for No DNN, the UE_A 10 may transmit the PDU session establishment request message for No DNN when the UE_A 10 is in a new PLMN. Therefore, based on this configuration, the UE_10 may transmit a PDU session establishment request message using the specific DNN.

Herein, the UE_A 10 may not stop the timing of the backoff timer and continue the timing until the timer expires. Alternatively, the UE_A 10 may continue to hold the deactivated backoff timer in the deactivated state.

In this way, the first congestion management for No DNN may be associated with PLMN. In other words, when changing the PLMN, when timing the back-off timer associated with the first congestion management for No DNN and the PLMN before the change, or when deactivating the backoff timer associated with the first congestion management for No DNN and the PLMN before the change, and when not timing the back-off timer associated with the first congestion management for No DNN and the PLMN after the change, and when not deactivating the backoff timer associated with the first congestion management for No DNN and the PLMN after the change, the UE_A 10 may transmit the PDU session establishment request message without using DNN when the UE_A 10 is in a new PLMN. Therefore, based on this configuration, the UE_10 may transmit a PDU session establishment request message without using DNN.

As described above, the UE_A 10 may perform the same process regardless of whether the first congestion management is for a specific DNN or No DNN.

That is, it may be that, when changing the PLMN and executing the backoff timer of the first congestion management associated with the PLMN before the change, or when deactivating the backoff timer of the first congestion management associated with the PLMN before the change, and when not timing of the backoff timer of the first congestion management associated with the PLMN after the change and not deactivating the backoff timer of the first congestion management associated with the PLMN after the change, the UE_A 10 may transmit the PDU session establishment request message using a specific DNN restricted by the congestion management associated with the PLMN before the change or the PDU session establishment request message that does not use DNN when in the new PLMN.

Alternatively, the UE_A 10 may perform different processes according to whether the first congestion management is for a specific DNN or No DNN.

It may also be that, when changing the PLIN, when timing the backoff timer associated with the first congestion management for a specific DNN, or when deactivating the backoff timer associated with the first congestion management for a specific DNN, the UE_A 10 may transmit the PDU session establishment request message without using the specific DNN when the UE_A 10 is in a new PLIN. Therefore, based on this configuration, the UE_10 may restrict the transmission of a PDU session establishment request message using the specific DNN.

Herein, the UE_A 10 may not stop the timing of the backoff timer and continue the timing until the timer expires. Alternatively, the UE_A 10 may continue to hold the deactivated backoff timer in the deactivated state.

In this way, the first congestion management for a specific DNN may be applied in different PLIN.

On the other hand, when changing the PLIN, when timing the backoff timer associated with the first congestion management for No DNN, or when deactivating the backoff timer associated with the first congestion management for No DNN, the UE_A 10 may transmit the PDU session establishment request message without using a DNN when the UE_A 10 is in a new PLMN. Therefore, based on this configuration, the UE_10 may transmit a PDU session establishment request message using the specific DNN.

Herein, the UE_A 10 may not stop the timing of the backoff timer and continue the timing until the timer expires.

Alternatively, the UE_A 10 may continue to hold the deactivated backoff timer in the deactivated state.

In this way, the first congestion management for No DNN may be associated with a PLMN.

For example, when the first congestion management for No DNN is applied, the UE associates the backoff timer with the PLIN and No DNN to start timing, and when the backoff timer is zero or not present due to being deactivated, in the PLIN associated with the backoff timer, the UE does not implement the PDU session establishment for No DNN associated with the backoff timer. Furthermore, when the backoff timer is deactivated, the terminal is powered off or before the USIM is removed, in the PLIN associated with the backoff timer, the UE does not implement the PDU session establishment for No DNN associated with the backoff timer. Furthermore, when the backoff timer is zero, in the PLMN associated with the backoff timer, the UE may implement the PDU session establishment for No DNN associated with the backoff timer.

In other words, when changing the PLIN, when timing the back-off timer associated with the first congestion management for No DNN and the PLIN before the change, or when deactivating the backoff timer associated with the first congestion management for No DNN and the PLMN before the change, and when not timing the back-off timer associated with the first congestion management for No DNN and the PLMN after the change, and when not deactivating the backoff timer associated with the first congestion management for No DNN and the PLMN after the change, the UE_A 10 may transmit the PDU session establishment request message without using a DNN when the UE_A 10 is in a new PLMN. Therefore, based on this configuration, the UE_10 may transmit a PDU session establishment request message without using a DNN.

Herein, as the process associated with the change of the PLIN described above, regardless of whether the first congestion management is for a specific DNN or No DNN, the same process or different processes may be performed, it may be set based on the information predetermined in the UE_A 10, or it may be determined according to whether the second PLMN after the change is an equivalent PLIN to the first PLIN before the change. For example, when the second PLMN after the change is not an equivalent PLMN to the first PLIN before the change, the same process may be applied. Furthermore, when the second PLIN after the change is an equivalent PLIN to the first PLIN before the change, different processes may be applied.

Furthermore, in the present implementation, the deactivation of the backoff timer may be that the congestion management associated with the backoff timer and/or the backoff timer is converted to a deactivated state. Furthermore, the UE_A 10 may deactivate the backoff timer and/or the congestion management associated with the backoff timer when receiving the timer value indicating deactivation.

Here, the deactivated backoff timer and/or the congestion management associated with the backoff timer may be associated with 1 to 4 congestion management types. Which congestion management type is associated with the deactivated backoff timer and/or the congestion management associated with the backoff timer may be similarly determined and identified when the backoff timer value is received.

More specifically, the UE_A 10 receives from the NW the fourteenth identification information and the fifteenth identification information indicating the deactivated backoff timer and/or the congestion management associated with the backoff timer, and deactivate the backoff timer of the congestion management of the type indicated by the fifteenth identification information.

Furthermore, when the backoff timer is deactivated and/or in the congestion management, the terminal may be powered off, the congestion management may be applied until the USIM is removed. Furthermore, the process restricted may be the same as the process restricted when timing the backoff timer according to each congestion management type.

For the processes of the UE_A 10 and the NW with the change of the PLMN described herein, the first congestion management and/or the backoff timer for the first congestion management is described, and similar process may be performed for the second congestion management, the third congestion management and the fourth congestion management. However, the PDU session establishment request message that is restricted in transmission or permitted may be a message corresponding to each type. In other words, the congestion management and/or the backoff timer associated with the congestion management may be associated with the PLMN regardless of the type of congestion management. Alternatively, any given congestion management and/or a backoff timer associated with congestion management may be set to be associated with the PLMN. Therefore, for the first congestion management, the second congestion management, and the third congestion management, the congestion management and/or the backoff timer associated with congestion management may be set to be associated with the PLMN. Alternatively, for the first congestion management, the second congestion management, and the third congestion management for No DNN, the congestion management and/or the backoff timer associated with the congestion management may be associated with the PLMN, and the first congestion management for a specific DNN may not be associated with a PLMN. Furthermore, the process when each congestion management is associated with the PLMN and/or the process related to the backoff timer associated with each congestion management may have the first congestion management in the above-described process for the first congestion management associated with the PLMN and/or the backoff timer associated with the first congestion management associated with the PLMN replaced with the congestion management of each of the second to fourth types. Furthermore, the process when each congestion management is not associated with the PLMN and/or the process related to the backoff timer associated with each congestion management may have the first congestion management in the above-described process for the first congestion management not associated with the PLMN and/or the backoff timer associated with the first congestion management associated with the PLMN replaced with the congestion management of each of the second to fourth types. However, as described above, the PDU session establishment message that is restricted in transmission or permitted may be a message according to each type.

Furthermore, in the description of the present implementation, when the NW is expressed as transmitting to the UE_A 10, it may be that the AMF or the SMF is transmitted to the UE_A 10; and when UE_A 10 is expressed as transmitting to the NW, it may be that the UE_A 10 transmits to the AMF or the SMF. Furthermore, when the NW is expressed as receiving from the UE_A 10, it may be that the AMF or the SMF may be received from the UE_A 10; and when the UE_A 10 is expressed as receiving from the NW, it may be that the UE_A 10 receives from the AMF or the SMF.

[2. Each Implementation]

Each implementation of the present disclosure will be described hereinafter.

[2.1. First Implementation]

A first implementation of the present disclosure will be described with reference to FIGS. 10 and 11. Hereinafter, the first implementation will also be referred to as the present implementation. Without being limited to the description of the example in the fourth process, the following may be performed in the fourth process.

The present implementation mainly relates to the behavior of the registration procedure illustrated in FIG. 10 and/or the PDU session establishment registration procedure illustrated in FIG. 11. Furthermore, the present implementation relates to, in the PDU session establishment procedure illustrated in FIG. 11, the PDU session establishment reject message (S 1122) received by the UE_A includes the fifteenth identification information and/or the fourteenth identification information and/or the eleventh identification information.

Furthermore, in the present implementation, the fifteenth identification information is information indicating one or more cause values that is notified to the UE by the NW for reasons other than the application of congestion management. The fourteenth identification information is information indicating the value of the backoff timer. The eleventh identification information is information indicating re-attempt information. The backoff timer may use the first timer used in the third congestion management described in the present implementation, or is not limited to this as long as it is a timer of the mobile communications system that can be identified by the UE. Furthermore, in order to distinguish it from the first timer and the backoff timer described above, it is expressed as the SM backoff timer. Furthermore, when the DNN information is not included in the PDU session establishment procedure, it is expressed as "no DNN" for distinguishing it from the control signal management when DNN information is included. Similarly, when S-NSSAI information is not included in the PDU session establishment procedure, it is expressed as "no S-NSSAI" for distinguishing it from the control signal management when S-NSSAI information is included.

According to the contents of the eleventh identification information and/or the fourteenth identification information and/or the fifteenth identification information included in the PDU session establishment reject message received by the UE_A, the fourth process may be performed (S1124).

When the reject cause value indicated by the fifteenth identification information is other than Insufficient resources and/or Insufficient resources for specific slice and DNN and/or Insufficient resources for specific slice, the SMF_A 230 or the AMF_A 240 loads the SM backoff timer indicated by the fourteenth identification information and transmits the PDU session establishment reject message (S1122) to the UE_A 10.

At this time, when the reject cause value indicated by the fifteenth identification information is Insufficient resources and/or Insufficient resources for specific slice and DNN and/or Insufficient resources for specific slice and/or user authentication or authorization failed and/or out of LADN service area and/or PDU session type IPv4 only allowed and/or PDU session type IPv6 only allowed and/or PDU session does not exist except, the UE_A 10 may implement the fourth process based on the received SM backoff timer value.

Specifically, as an example of the fourth process in this implementation, the UE_A 10 may perform a following example of the first procedure when the SM backoff timer value is not zero or not invalid.

The UE_A 10 may start an SM backoff timer for PLMN and/or DNN and/or S-NSSAI, or may start an SM backoff timer for PLMN and/or no DNN and/or S-NSSAI, or may start a SM backoff timer for PLMN and/or DNN and/or no S-NSSAI, or may start a SM backoff timer for PLMN and/or no DNN and/or no S-NSSAI.

Furthermore, the UE_A 10 may suppress the transmission of the PDU session establishment request message (1011) based on the value of the SM backoff timer described above.

Specifically, the UE_A 10, before the SM backoff timer for PLMN and/or DNN and/or S-NSSAI expires, or before the terminal is powered on/off, or before the USIM (Universal Subscriber Identity Module) is plugged/unplugged, may suppress the reconnection using another PDU session establishment request message for the DNN and S-NSSAI parameters transmitted in the PDU session establishment request message (1011).

Furthermore, the UE_A 10, before the SM backoff timer for PLMN and/or no DNN and/or S-NSSAI expires, or before the terminal is powered on/off, or before the USIM (Universal Subscriber Identity Module) is plugged/unplugged, may suppress the reconnection using another PDU session establishment request message for no DNN and S-NSSAI parameters transmitted in the PDU session establishment request message (1011).

Furthermore, the UE_A 10, before the SM backoff timer for PLMN and/or DNN and/or no S-NSSAI expires, or before the terminal is powered on/off, or before the USIM (Universal Subscriber Identity Module) is plugged/unplugged, may suppress the reconnection using another PDU session establishment request message for the DNN and no S-NSSAI parameters transmitted in the PDU session establishment request message (1011).

Furthermore, the UE_A 10, before the SM backoff timer for PLMN and/or no DNN and/or no S-NSSAI expires, or before the terminal is powered on/off, or before the USIM (Universal Subscriber Identity Module) is plugged/unplugged, may suppress the reconnection using another PDU session establishment request message for no DNN and no S-NSSAI parameters transmitted in the PDU session establishment request message (1011).

Furthermore, as an example of the fourth process in this implementation, the UE_A 10 may perform a following example of the second procedure that is different from the first procedure when the SM backoff timer value is invalid.

The UE_A 10, before the terminal is powered on/off, or before the USIM (Universal Subscriber Identity Module) is plugged/unplugged, may suppress the reconnection using another PDU session establishment request message for DNN and S-NSSAI parameters transmitted in the PDU session establishment request message (1011).

Furthermore, the UE_A 10, before the terminal is powered on/off, or before the USIM (Universal Subscriber Identity Module) is plugged/unplugged, may suppress the reconnection using another PDU session establishment request message for no DNN and S-NSSAI parameters transmitted in the PDU session establishment request message (1011).

Furthermore, the UE_A 10, before the terminal is powered on/off, or before the USIM (Universal Subscriber Identity Module) is plugged/unplugged, may suppress the reconnection using another PDU session establishment request message for DNN and no S-NSSAI parameters transmitted in the PDU session establishment request message (1011).

Furthermore, the UE_A 10, before the terminal is powered on/off, or before the USIM (Universal Subscriber Identity Module) is plugged/unplugged, may suppress the reconnection using another PDU session establishment request message for no DNN and no S-NSSAI parameters transmitted in the PDU session establishment request message (1011).

Furthermore, as an example of the fourth process in this implementation, the UE_A 10 may perform a following example of the third procedure that is different from the first and second procedures when the SM backoff timer value is zero.

The UE_A 10, when the activated SM backoff timer associated with the DNN and S-NSSAI transmitted in the PDU session establishment request message (1011) is deactivated, may transmit another PDU session establishment request message using the DNN and S-NSSAI transmitted in the PDU session establishment request message (1011).

Furthermore, the UE_A 10, when the activated SM backoff timer associated with no DNN and S-NSSAI transmitted in the PDU session establishment request message (1011) is deactivated, may transmit another PDU session establishment request message using no DNN and S-NSSAI transmitted in the PDU session establishment request message (1011).

Furthermore, the UE_A 10, when the activated SM backoff timer associated with the DNN and no S-NSSAI transmitted in the PDU session establishment request message (1011) is deactivated, may transmit another PDU session establishment request message using the DNN and no S-NSSAI transmitted in the PDU session establishment request message (1011).

Furthermore, the UE_A 10, when the activated SM backoff timer associated with no DNN and no S-NSSAI transmitted in the PDU session establishment request message (1011) is deactivated, may transmit another PDU session establishment request message using no DNN and no S-NSSAI transmitted in the PDU session establishment request message (1011).

Furthermore, the UE_A 10 does not deactivate the activated SM backoff timer when changing the PLMN or changing from the N1 mode to the S1 mode. This is because, for example, when returning to the original PLMN from the PLMN change destination by changing the PLMN, the backoff timer that is activated by the original PLMN continues to be activated, and the control signal management applied in the original PLMN continues to be applied.

Further, as an example of a fourth process in the present implementation, the UE_A 10 may perform an example of the fourth procedure when the PLMN change is performed while the SM backoff timer activated before the PLMN change is activated. Herein, the PLMN before the PLMN change is referred to as the original PLMN.

The UE_A 10, in the PLMN change destination, when the SM backoff timer for S-NSSAI and DNN activated by the original PLMN is not activated, may transmit a PDU session establishment request message using the same S-NSSAI and DNN as the S-NSSAI and DNN associated with the SM backoff timer activated in the original PLMN.

Furthermore, the UE_A 10, in the PLMN change destination, when the SM backoff timer for S-NSSAI and no DNN activated by the original PLMN is not activated, may transmit a PDU session establishment request message using the same S-NSSAI and no DNN as the S-NSSAI and no DNN associated with the SM backoff timer activated in the original PLMN.

Furthermore, the UE_A 10, in the PLMN change destination, when the SM backoff timer for no S-NSSAI and DNN activated by the original PLMN is not activated, may transmit a PDU session establishment request message using the same no S-NSSAI and DNN as no S-NSSAI and DNN associated with the SM backoff timer activated in the original PLMN.

Furthermore, the UE_A 10, in the PLMN change destination, when the SM backoff timer for no S-NSSAI and no DNN activated by the original PLMN is not activated, may transmit a PDU session establishment request message using the same no S-NSSAI and no DNN as no S-NSSAI and no DNN associated with the SM backoff timer activated in the original PLMN.

Furthermore, as an example of the fourth process in the present implementation, when the cause value indicated by the fifteenth identification information is user authentication or authorization failed, or only PDU session type IPv4 allowed, or only PDU session type IPv6 allowed, the UE_A 10 may perform an example of the fifth procedure different from examples of the first to third procedures.

Specifically, the UE_A 10, when in the PDU session type used in changing the PDU session establishment request message (1011), or before the terminal is powered on/off, or before the USIM (Universal Subscriber Identity Module) is plugged/unplugged, may not automatically transmit a procedure of the reconnection of another PDU session establishment request message for the DNN and S-NSSAI parameters transmitted in the PDU session establishment request message (1011).

Furthermore, the UE_A 10, when in the PDU session type used in changing the PDU session establishment request message (1011), or before the terminal is powered on/off, or before the USIM (Universal Subscriber Identity Module) is plugged/unplugged, may not automatically transmit a procedure of the reconnection of another PDU session establishment request message for no DNN and S-NSSAI parameters transmitted in the PDU session establishment request message (1011).

Furthermore, the UE_A 10, when in the PDU session type used in changing the PDU session establishment request message (1011), or before the terminal is powered on/off, or before the USIM (Universal Subscriber Identity Module) is plugged/unplugged, may not automatically transmit a procedure of the reconnection of another PDU session establishment request message for the DNN and no S-NSSAI parameters transmitted in the PDU session establishment request message (1011).

Furthermore, the UE_A 10, when in the PDU session type used in changing the PDU session establishment request message (1011), or before the terminal is powered on/off, or before the USIM (Universal Subscriber Identity Module) is plugged/unplugged, may not automatically transmit a procedure of the reconnection of another PDU session establishment request message for no DNN and no S-NSSAI parameters transmitted in the PDU session establishment request message (1011).

Furthermore, as an example of the fourth process in the present implementation, when the cause value indicated by the fifteenth identification information is PDU session does not exist, the UE_A 10 may perform an example of the sixth procedure different from examples of the first to third and the fifth procedures.

Specifically, the UE_A 10 may transmit an initial ("initial request") PDU session establishment request message for the DNN and S-NSSAI parameters transmitted in the PDU session establishment request message (1011).

Furthermore, the UE_A 10 may transmit an initial ("initial request") PDU session establishment request message for no DNN and S-NSSAI parameters transmitted in the PDU session establishment request message (1011).

Furthermore, the UE_A 10 may transmit an initial ("initial request") PDU session establishment request message for the DNN and no S-NSSAI parameters transmitted in the PDU session establishment request message (1011).

Furthermore, the UE_A 10 may transmit an initial ("initial request") PDU session establishment request message for no DNN and no S-NSSAI parameters transmitted in the PDU session establishment request message (1011).

Furthermore, as an example of the fourth process in the present implementation, when the cause value indicated by the fifteenth identification information is user authentication or authorization failed, and/or PDU session type IPv4 only allowed, and/or PDU session type IPv6 only allowed, and/or PDU session does not exist, the UE_A 10 may perform an example of the seventh procedure different from examples of the first to third and the fifth and sixth procedures.

Specifically, the UE_A 10 may ignore the SM backoff timer received.

Furthermore, another PDU session establishment request message may be transmitted based on the re-attempt information indicated by the eleventh identification information. Specifically, when the connection of the equivalent PLMN is allowed in the re-attempt information, the UE_A 10 may transmit another PDU session by the equivalent PLMN for the DNN and S-NSSAI parameters transmitted in the PDU session establishment request message (1011).

Furthermore, when the connection of the equivalent PLMN is allowed in the re-attempt information, the UE_A 10 may transmit another PDU session by the equivalent PLMN for no DNN and S-NSSAI parameters transmitted in the PDU session establishment request message (1011).

Furthermore, when the connection of the equivalent PLMN is allowed in the re-attempt information, the UE_A 10 may transmit another PDU session by the equivalent PLMN for the DNN and no S-NSSAI parameters transmitted in the PDU session establishment request message (1011).

Furthermore, when the connection of the equivalent PLMN is allowed in the re-attempt information, the UE_A 10 may transmit another PDU session by the equivalent PLMN for no DNN and no S-NSSAI parameters transmitted in the PDU session establishment request message (1011). As described, the UE_A 10 may perform a process based on the reception of the PDU session establishment reject message.

In other words, the process based on the reception of the PDU session establishment rejection message described may be the following example of the process. Furthermore, this example of the process may be a process performed when a timer value is included in the PDU session establishment reject message.

When the 5GSM cause value included in the PDU session establishment reject message indicates a value other than the cause value related to congestion management, based on the received 5GSM cause value, using the received timer value, the UE_A 10 may activate the backoff timer for the combination of the PLMN, DNN and S-NSSAI.

Herein, the DNN and S-NSSAI may be indicated by the UE_A 10. Specifically, as described, the UE_A 10 may be the DNN and S-NSSAI included in the PDU session establishment request message. The PDU session establishment reject message in this processing may be a response message to this PDU session establishment request message.

Furthermore, the cause value related to the congestion management is a cause value indicating insufficient resources, and/or a cause value indicating insufficient resources for specific slice, and/or a cause value indicating insufficient resources for specific slice and DNN.

In other words, when the 5GSM cause value included in the PDU session establishment reject message is different from the cause value included in the following cause value group, based on the received 5GSM cause value, using the received timer value, the UE_A 10 may activate the backoff timer for the combination of the PLMN, DNN and S-NSSAI.

Herein, the cause value group described is the cause value related to the congestion management described, and/or user authentication or authorization failed, and/or out of LADN service area, and/or PDU session type IPv4 only allowed, and/or PDU session type IPv6 only allowed, and/or PDU session does not exist.

More specifically, when the 5GSM reason value included in the PDU session establishment reject message indicates Request rejected, unspecified, using the received timer value, the UE_A 10 may activate the backoff timer for the combination of the PLMN, DNN and S-NSSAI.

Furthermore, the process performed by the UE_A 10 when the above-mentioned backoff timer is activated may be the process that is described in this section.

[2.2. Second Implementation]

In the present implementation, a process will be described for the situation when the UE changes the system while the congestion management is applied. Specifically, a process when the UE changes from the N1 mode to the S1 mode while the congestion management is applied will be described.

It is mainly related to the behavior of the PDN connectivity establishment procedure shown in FIG. 13. FIG. 13 is a schematic diagram of an EPS Session Management (ESM) procedure according to an aspect of the present disclosure. For simplicity, the PDN connectivity establishment procedure shown in FIG. 13 may be referred to as an ESM procedure.

Furthermore, in the present implementation, the fifteenth identification information is information indicating one or more cause values that are notified to the UE by the NW for this procedure being rejected due to the application of the congestion management. The fourteenth identification information is information indicating the value of the backoff timer. The eleventh identification information is information indicating re-attempt information.

Furthermore, when the DNN information is not included in the PDU session establishment procedure, it is expressed as "no DNN" for distinguishing it from the control signal management when the DNN information is included. Similarly, when the S-NSSAI information is not included in the PDU session establishment procedure, it is expressed as "no S-NSSAI" for distinguishing it from control signal management when the S-NSSAI information is included.

When the reject cause value indicated by the fifteenth identification information is Insufficient resources, and/or Insufficient resources for specific slice and DNN, and/or Insufficient resources for specific slice, the SMF_A 230 or the AMF_A 240 may load the backoff timer indicated by the fourteenth identification information and transmit a PDU session establishment reject message (S1122) to the UE_A 10.

At this time, according to the content of the eleventh identification information and/or fourteenth identification information and/or fifteenth identification information included in the PDU session establishment reject message received by the UE_A, after the system change, the UE_A may perform the sixth process (S1300).

Herein, the process when UE_A 10 changes the system in which the first congestion management associated with a specific DNN is applied will be described. Particularly, when the first congestion management backoff timer associated with a specific DNN is activated, or the first congestion management backoff timer associated with a specific DNN is deactivated, the process when the UE_A 10 changes the system will be described.

Herein, the first congestion management associated with a specific DNN and the process restricted when the first congestion management associated with a specific DNN may be the same those as described.

To repeat, the first congestion management associated with a specific DNN may be a congestion management based on the DNN. For example, the first congestion management may be the following congestion management: when the NW receives the UE-led session management request using the DNN #A from the UE_A 10 and the NW detects the congestion for a specific DNN, for example, DNN #A, the NW applies it to the UE_A 10 based on rejecting the UE-led session management request message. In this situation, in the application of the first congestion management, the UE_A 10 starts the timing of the backoff timer associated with the first congestion management received from the NW, and until the backoff timer expires, the UE_A 10 does not to transmit the UE-led session management request using the DNN #A. Furthermore, using the DNN may mean including the DNN information in the UE-led session management request such as a PDU session establishment request message.

Herein, for explanation, the first congestion management used in the description is referred to as a "first congestion management for a specific DNN." Furthermore, said backoff timer associated with the first congestion management is referred to as a "first congestion management backoff timer associated with a specific DNN."

As an example of the sixth process in the present implementation, the UE_A 10 may perform the following example of the twentieth procedure.

Specifically, when changing the system, when the first congestion management backoff timer associated with a specific DNN is activated, or when the first congestion associated with a specific DNN is deactivated, the UE_A 10 may perform the ESM procedure using an APN equivalent to the specific DNN in the S1 mode. Therefore, based on this configuration, the UE_10 may transmit the PDN connectivity establishment request message using this specific APN (S1301).

Herein, the UE_A 10 may not stop the timing of the backoff timer and continue the timing until the backoff timer expires. Alternatively, the UE_A 10 may continue to hold the deactivated backoff timer in the deactivated state.

In this way, the first congestion management for a specific DNN may be associated with the system.

Subsequently, the process when UE_A 10 changes the system while the first congestion management associated with No DNN is applied will be described. Particularly, when the first congestion management backoff timer associated with No DNN is activated or the first congestion management backoff timer associated with No DNN is deactivated, the process when UE_A 10 changes the system will be described.

Herein, the first congestion management associated with No DNN and the process restricted when the first congestion management associated with No DNN may be the same those as described.

In the first congestion management associated with No DNN, when the UE-led session management request does not include the DNN information, the NW may select the default DNN with the leading of the NW and set it as the congestion management target. In other words, the first congestion management may be the following congestion management: when the NW receives the UE-led session management request that does not use the DNN information from the UE_A 10 and the NW detects the congestion corresponding to the default DNN, the NW applies it to the UE_A 10 based on rejecting the UE-led session management request message. In this situation, in the application of the first congestion management, the UE_A 10 starts the timing of the backoff timer associated with the first congestion management received from the NW, and until the backoff timer expires, the UE_A 10 does not to transmit the UE-led session management request using the DNN. Furthermore, not using the DNN may mean not including the DNN information in the UE-led session management request such as a PDU session establishment request message.

Herein, for explanation, the first congestion management for the default DNN is applied based on the UE-led session management request that does not use the DNN information. Therefore, for distinguishing from the first congestion management for a specific DNN, it is expressed as a "congestion management for No DNN." Furthermore, a UE-led session management request such as a PDU session establishment request message that does not use the DNN is expressed as a UE-led session management request that uses No DNN. For example, a PDU session establishment request message that uses No DNN is a PDU session establishment request message that does not use the DNN. Furthermore, said backoff timer associated with the first congestion management is referred to as a "first congestion management backoff timer associated with No DNN."

As an example of the sixth process in the present implementation, the UE_A 10 may perform the following example of the twenty-first procedure.

Specifically, when changing the system, when the timing of the first congestion management backoff timer associated with No DNN is activated, or when the first congestion associated with No DNN is deactivated, the UE_A 10 may perform the ESM procedure that does not include an APN in the S1 mode. Therefore, based on this configuration, the UE_10 may transmit the PDN connectivity establishment request message that does not include an APN.

Herein, the UE_A 10 may not stop the timing of the backoff timer and continue the timing until the backoff timer expires. Alternatively, the UE_A 10 may continue to hold the deactivated backoff timer in the deactivated state.

In this way, the first congestion management for No DNN may be associated with the system.

Insofar, an example of the process of the first congestion management associated with the system in the system change is described, but it is not limited to this. That is, in the system change, the first congestion management may not be associated with the system.

Herein, the process when UE_A 10 changes the system while the first congestion management associated with a specific DNN is applied will be described. Particularly, when the first congestion management backoff timer associated with a specific DNN is activated or the first congestion management backoff timer associated with a specific DNN is deactivated, the process when UE_A 10 changes the system will be described.

As an example of the sixth process in the present implementation, the UE_A 10 may perform the following example of the thirtieth procedure.

Specifically, when changing the system, when the first congestion management backoff timer associated with a specific DNN is activated, or when the first congestion associated with a specific DNN is deactivated, the UE_A 10 may suppress the performing of the ESM procedure using an APN that is the same as the specific DNN in the S1 mode. Therefore, based on this configuration, the UE_10 may suppress the transmission of the PDN connectivity establishment request message using this specific APN.

Herein, the UE_A 10 may not stop the timing of the backoff timer and continue the timing until the backoff timer expires. Alternatively, the UE_A 10 may continue to hold the deactivated backoff timer in the deactivated state.

In this way, the first congestion management for a specific DNN may be applied in different systems.

Subsequently, the process when UE_A 10 changes the system while the first congestion management associated with No DNN is applied will be described. Particularly, when the first congestion management backoff timer associated with No DNN is activated or the first congestion management backoff timer associated with No DNN is deactivated, the process when UE_A 10 changes the system will be described.

As an example of the sixth process in the present implementation, the UE_A 10 may perform the following example of the thirty-first procedure.

Specifically, when changing the system, when the first congestion management backoff timer associated with No DNN is activated, or when the first congestion associated with No DNN is deactivated, the UE_A 10 may suppress the performing of the ESM procedure that does not include an APN in the S1 mode. Therefore, based on this configuration, the UE_10 may suppress the transmission of the PDN connectivity establishment request message that does not include an APN.

Furthermore, as an example of the sixth process in the present implementation, the UE_A 10 may perform the following example of the thirty-second procedure.

Specifically, when changing the system, when the first congestion management backoff timer associated with No DNN is activated, or when the first congestion associated with No DNN is deactivated, the UE_A 10 may suppress the performing of the ESM procedure that does not include APN other than for emergency calls in the S1 mode, but may perform the ESM procedure for emergency calls. Therefore, based on this configuration, the UE_10 may transmit the PDN connectivity establishment request message that does not include an APN that the request type is set to "emergency," and suppress the transmission of the PDN connectivity establishment request message that does not include an APN that the request type is set to "emergency."

Herein, the UE_A 10 may not stop the timing of the backoff timer and continue the timing until the backoff timer expires. Alternatively, the UE_A 10 may continue to hold the deactivated backoff timer in the deactivated state.

In this way, the first congestion management for a specific DNN may be applied in different systems.

Subsequently, the process when UE_A 10 changes the system in which the third congestion management associated with a specific [S-NSSAI, DNN] is applied will be described. Particularly, when the third congestion management backoff timer associated with a specific [S-NSSAI, DNN] is activated, or the third congestion management backoff timer associated with a specific [S-NSSAI, DNN] is deactivated, the process when the UE_A 10 changes the system will be described.

Herein, the third congestion management associated with a specific [S-NSSAI, DNN] and the process restricted when the third congestion management associated with a specific [S-NSSAI, DNN] may be the same those as described.

To repeat, the third congestion management associated with a specific [S-NSSAI, DNN] may be a congestion management based on the S-NSSAI. For example, the third congestion management may be the following congestion management: when the NW receives the UE-led session management request using the DNN #A and S-NSSAI #A from the UE_A 10 and the NW detects the congestion for a specific [S-NSSAI, DNN], for example, DNN #A and S-NSSAI #A, the NW applies it to the UE_A 10 based on rejecting the UE-led session management request message. In this situation, in the application of the third congestion management, the UE_A 10 starts the timing of the backoff timer associated with the third congestion management received from the NW, and until the backoff timer expires, the UE_A 10 does not to transmit the UE-led session management request using the DNN #A. Furthermore, using the [S-NSSAI, DNN] may mean including the DNN information and S-NSSAI information in the UE-led session management request such as a PDU session establishment request message.

Herein, for explanation, the third congestion management used in the description is referred to as a "third congestion management for a specific [S-NSSAI, DNN]." Furthermore, said backoff timer associated with the third congestion management is referred to as a "third congestion management backoff timer associated with a specific [S-NSSAI, DNN]."

As an example of the sixth process in the present implementation, the UE_A 10 may perform the following example of the twenty-second procedure.

Specifically, when changing the system, when the third congestion management backoff timer associated with a specific [S-NSSAI, DNN] is activated, or when the third congestion associated with a specific [S-NSSAI, DNN] is deactivated, the UE_A 10 may perform the ESM procedure using an APN equivalent to the specific DNN in the S1 mode. Therefore, based on this configuration, the UE_A 10 may transmit the PDN connectivity establishment request message using this specific APN.

Herein, the UE_A 10 may not stop the timing of the backoff timer and continue the timing until the backoff timer expires. Alternatively, the UE_A 10 may continue to hold the deactivated backoff timer in the deactivated state.

In this way, the third congestion management for a specific [S-NSSAI, DNN] may be associated with the system.

Subsequently, the process when UE_A 10 changes the system while the third congestion management associated with [no S-NSSAI, DNN] is applied will be described. Particular, when the third congestion management backoff timer associated with [no S-NSSAI, DNN] is activated, or the third congestion management backoff timer associated with [no S-NSSAI, DNN] is deactivated, the process when UE_A 10 changes the system will be described.

Herein, the third congestion management associated with [no S-NSSAI, DNN] and the process restricted when the third congestion management associated with [no S-NSSAI, DNN] may be the same those as described.

In the third congestion management associated with [no S-NSSAI, DNN], when the UE-led session management request does not include the S-NSSAI information, the NW may select the default S-NSSAI with the leading of the NW and set it as the congestion management target. In other words, the third congestion management may be the following congestion management: when the NW receives the UE-led session management request that use the [no S-NSSAI, DNN] from the UE_A 10 and the NW detects the congestion corresponding to the default S-NSSAI, the NW applies it to the UE_A 10 based on rejecting the UE-led session management request message. In this situation, in the application of the third congestion management, the LE_A 10 starts the timing of the backoff timer associated with the first congestion management received from the NW, and until the backoff timer expires, the UE_A 10 does not to transmit the UE-led session management request using the [no S-NSSAI, DNN]. Furthermore, using the [no S-NSSAI, DNN] may mean not including the S-NASSI information but including the DNN information in the UE-led session management request such as a PDU session establishment request message.

Here, for explanation, the third congestion management for the default S-NSSAI and a specific DNN is applied based on a UE-led session management request that does not use S-NSSAI information. Therefore, for distinguishing from the third congestion management for a specific S-NSSAI and DNN, it is expressed as a "congestion management for [no S-NSSAI, DNN]." Furthermore, a UE-led session management request such as a PDU session establishment request message that does not use S-NSSAI but uses DNN is expressed as a UE-led session management request using [no S-NSSAI, DNN]. Furthermore, the backoff timer associated with the third congestion management is expressed as a "third congestion management backoff timer associated with [no S-NSSAI, DNN]."

As an example of the sixth process in the present implementation, the UE_A 10 may perform the following example of the twenty-second procedure.

Specifically, when changing the system, when the third congestion management backoff timer associated with [no S-NSSAI, DNN] is activated, or when the third congestion associated with [no S-NSSAI, DNN] is deactivated, the UE_A 10 may perform the ESM procedure that does not include an APN in the S1 mode. Therefore, based on this configuration, the UE_A 10 may transmit the PDN connectivity establishment request message that does not include the APN.

Herein, the UE_A 10 may not stop the timing of the backoff timer and continue the timing until the backoff timer expires. Alternatively, the UE_A 10 may continue to hold the deactivated backoff timer in the deactivated state.

In this way, the third congestion management for [no S-NSSAI, DNN] may be associated with the system.

Subsequently, the process when the UE_A 10 changes the system while the third congestion management associated with [S-NSSAI, no DNN] is applied will be described. Particular, when the third congestion management backoff timer associated with [S-NSSAI, no DNN] is activated, or the third congestion management backoff timer associated with [S-NSSAI, no DNN] is deactivated, the process when the UE_A 10 changes the system will be described.

Herein, the third congestion management associated with [S-NSSAI, no DNN] and the process restricted when the third congestion management associated with [S-NSSAI, no DNN] may be the same those as described.

In the third congestion management associated with [S-NSSAI, no DNN], the NW selects a default DNN as the congestion management target even when the UE-initiated session management request does not include a DNN. In other words, the third congestion management may be the following congestion management: when the NW receives the UE-led session management request using [S-NSSAI, DNN] from the UE_A 10, and the NW detects the congestion corresponding to a combination of the default DNN and a specific S-NSSAI, the NW applies it to the UE_A 10 based on rejecting the UE-led session management request message. In this situation, in the application of the third congestion management, the UE_A 10 starts the timing of the backoff timer associated with the third congestion management received from the NW, and until the backoff timer expires, the UE_A 10 does not transmit the UE-led session management request using the [S-NSSAI, no DNN]. Furthermore, using [S-NSSAI, no DNN] may mean not including the S-NASSI information but including the DNN information in the UE-led session management request such as a PDU session establishment request message.

Here, for explanation, the third congestion management for the default DNN and the specific S-NSSAI is applied based on a UE-led session management request that does not use DNN information. Therefore, to distinguish it from the third congestion management for the specific S-NSSAI and DNN, it is expressed as a "congestion management for [S-NSSAI, no DNN]." Furthermore, a UE-led session management request such as a PDU session establishment request message that does not use DNN but uses S-NSSAI is expressed as a UE-led session management request using [S-NSSAI, no DNN]. Furthermore, said backoff timer associated with the third congestion management is expressed as a "third congestion management backoff timer associated with [S-NSSAI, no DNN]."

As an example of the sixth process in the present implementation, the LE_A 10 may perform the following example of the twenty-fourth procedure.

Specifically, when changing the system, when the third congestion management backoff timer associated with [S-NSSAI, no DNN] is activated, or when the third congestion associated with [S-NSSAI, no DNN] is deactivated, the UE_A 10 may perform the ESM procedure that does not include an APN in the S1 mode. Therefore, based on this configuration, the UE_A 10 may transmit the PDN connectivity establishment request message that does not include the APN.

Herein, the UE_A 10 may not stop the timing of the backoff timer and continue the timing until the backoff timer expires. Alternatively, the UE_A 10 may continue to hold the deactivated backoff timer in the deactivated state.

In this way, the third congestion management for [no S-NSSAI, no DNN] may be associated with the system.

Subsequently, the process when UE_A 10 changes the system while the third congestion management associated with [no S-NSSAI, no DNN] is applied will be described. Particular, when the third congestion management backoff timer associated with [no S-NSSAI, no DNN] is activated, or the third congestion management backoff timer associated with [no S-NSSAI, no DNN] is deactivated, the process when UE_A 10 changes the system will be described.

Herein, the third congestion management associated with [no S-NSSAI, no DNN] and the process restricted when the third congestion management associated with [no S-NSSAI, no DNN] may be the same those as described.

In the third congestion management associated with [no S-NSSAI, no DNN], when the NW in the UE-led session management request does not include S-NSSAI and DNN, the NW selects a default S-NSSAI and a default DNN as the congestion management target. In other words, the third congestion management may be the following congestion management: when the NW receives the UE-led session management request using [S-NSSAI, no DNN] from the UE_A 10, and the NW detects the congestion corresponding to a combination of the default DNN and the default S-NSSAI, the NW applies it to the UE_A 10 based on rejecting the UE-led session management request message. In this situation, in the application of the third congestion management, the UE_A 10 starts the timing of the backoff timer associated with the third congestion management received from the NW, and until the backoff timer expires, the UE_A 10 does not transmit the UE-led session management request using the [no S-NSSAI, no DNN]. Furthermore, using [no S-NSSAI, no DNN] may mean not including the S-NASSI information and the DNN information in the UE-led session management request such as a PDU session establishment request message.

Herein, for explanation, the third congestion management for the combination of the default DNN and the default S-NSSAI and the combination of the specific DNN and the specific S-NSSAI is applied based on the UE-led session management request that does not use the DNN information and the S-NSSAI information. Therefore, to distinguish it from the third congestion management for the combination of a specific S-NSSAI and DNN, it is expressed as a "congestion management for [no-S-NSSAI, no DNN]." Furthermore, a UE-led session management request such as a PDU session establishment request message that uses neither DNN nor S-NSSAI is expressed as a UE-led session management request using [no S-NSSAI, no DNN]. Furthermore, the back-off timer associated with said third congestion management is expressed as a "third congestion management back-off timer associated with [no-S-NSSAI, no DNN]."

As an example of the sixth process in the present implementation, the UE_A 10 may perform the following example of the twenty-fifth procedure.

Specifically, when changing the system, when the third congestion management backoff timer associated with [no S-NSSAI, no DNN] is activated, or when the third congestion associated with [no S-NSSAI, no DNN] is deactivated, the UE_A 10 may perform the ESM procedure that does not include an APN in the S1 mode. Therefore, based on this configuration, the UE_A 10 may transmit the PDN connectivity establishment request message that does not include the APN.

Herein, the UE_A 10 may not stop the timing of the backoff timer and continue the timing until the backoff timer expires. Alternatively, the UE_A 10 may continue to hold the deactivated backoff timer in the deactivated state.

In this way, the third congestion management for [no S-NSSAI, no DNN] may be associated with the system.

Insofar, an example of the process of the third congestion management associated with the system in the system change is described, but it is not limited to this. That is, in the system change, the third congestion management may not be associated with the system.

Subsequently, the process when UE_A 10 changes the system while the third congestion management associated with a specific [S-NSSAI, DNN] is applied will be described. Particular, when the third congestion management backoff timer associated with a specific [S-NSSAI, DNN] is activated, or the third congestion management backoff timer associated with a specific [S-NSSAI, DNN] is deactivated, the process when UE_A 10 changes the system will be described.

As an example of the sixth process in the present implementation, the UE_A 10 may perform the following example of the thirty-third procedure.

Specifically, when changing the system, when the third congestion management backoff timer associated with a specific [S-NSSAI, DNN] is activated, or when the third congestion associated with a specific [S-NSSAI, DNN] is deactivated, the UE_A 10 may suppress the ESM procedure using an APN equivalent to the specific DNN in the S1 mode. Therefore, based on this configuration, the UE_A 10 may suppress the PDN connectivity establishment request message using this specific APN.

Herein, the UE_A 10 may not stop the timing of the backoff timer and continue the timing until the backoff timer expires. Alternatively, the UE_A 10 may continue to hold the deactivated backoff timer in the deactivated state.

In this way, the third congestion management for specific [S-NSSAI, DNN] may be associated with the system.

Subsequently, the process when UE_A 10 changes the system while the third congestion management associated with [no S-NSSAI, DNN] is applied will be described. Particular, when the third congestion management backoff timer associated with [no S-NSSAI, DNN] is activated, or the third congestion management backoff timer associated with [no S-NSSAI, DNN] is deactivated, the process when UE_A 10 changes the system will be described.

As an example of the sixth process in the present implementation, the UE_A 10 may perform the following example of the thirty-fourth procedure.

Specifically, when changing the system, when the third congestion management backoff timer associated with a specific [no S-NSSAI, DNN] is activated, or when the third congestion associated with a specific [no S-NSSAI, DNN] is deactivated, the UE_A 10 may suppress the ESM procedure using an APN equivalent to the specific DNN in the S1 mode. Therefore, based on this configuration, the UE_A 10 may suppress the PDN connectivity establishment request message using this specific APN.

Herein, the UE_A 10 may not stop the timing of the backoff timer and continue the timing until the backoff timer expires. Alternatively, the UE_A 10 may continue to hold the deactivated backoff timer in the deactivated state.

In this way, the third congestion management for specific [no S-NSSAI, DNN] may be associated with the system.

Subsequently, the process when UE_A 10 changes the system while the third congestion management associated with [S-NSSAI, no DNN] is applied will be described. Particular, when the third congestion management backoff timer associated with [S-NSSAI, no DNN] is activated, or the third congestion management backoff timer associated with [S-NSSAI, no DNN] is deactivated, the process when UE_A 10 changes the system will be described.

As an example of the sixth process in the present implementation, the UE_A 10 may perform the following example of the thirty-fifth procedure.

Specifically, when changing the system, when the third congestion management backoff timer associated with [S-NSSAI, no DNN] is activated, or when the third congestion associated with [S-NSSAI, no DNN] is deactivated, the UE_A 10 may suppress the ESM procedure that does not include an APN in the S1 mode. Therefore, based on this configuration, the UE_A 10 may suppress the PDN connectivity establishment request message that does not include an APN.

Herein, the UE_A 10 may not stop the timing of the backoff timer and continue the timing until the backoff timer expires. Alternatively, the UE_A 10 may continue to hold the deactivated backoff timer in the deactivated state.

Furthermore, as an example of the sixth process in the present implementation, the UE_A 10 may perform the following example of the thirty-sixth procedure.

Specifically, when changing the system, when the third congestion management backoff timer associated with [S-NSSAI, no DNN] is activated, or when the third congestion associated with [S-NSSAI, no DNN] is deactivated, the UE_A 10 may suppress the performing of the ESM procedure that does not include APN other than for emergency calls in the S1 mode, but may perform the ESM procedure for emergency calls. Therefore, based on this configuration, the UE_10 may transmit the PDN connectivity establishment request message that does not include an APN that the request type is set to "emergency," and suppress the transmission of the PDN connectivity establishment request message that does not include an APN that the request type is set to "emergency."

Herein, the UE_A 10 may not stop the timing of the backoff timer and continue the timing until the backoff timer expires. Alternatively, the UE_A 10 may continue to hold the deactivated backoff timer in the deactivated state.

In this way, the third congestion management for specific [S-NSSAI, no DNN] may be associated with the system.

Subsequently, the process when UE_A 10 changes the system while the third congestion management associated with [no S-NSSAI, no DNN] is applied will be described. Particular, when the third congestion management backoff timer associated with [no S-NSSAI, no DNN] is activated, or the third congestion management backoff timer associated with [no S-NSSAI, no DNN] is deactivated, the process when UE_A 10 changes the system will be described.

As an example of the sixth process in the present implementation, the UE_A 10 may perform the following example of the thirty-seventh procedure.

Specifically, when changing the system, when the third congestion management backoff timer associated with [no S-NSSAI, no DNN] is activated, or when the third congestion associated with [no S-NSSAI, no DNN] is deactivated, the UE_A 10 may suppress the ESM procedure that does not include an APN in the S1 mode. Therefore, based on this configuration, the UE_A 10 may suppress the PDN connectivity establishment request message that does not include an APN.

Herein, the UE_A 10 may not stop the timing of the backoff timer and continue the timing until the backoff timer expires. Alternatively, the UE_A 10 may continue to hold the deactivated backoff timer in the deactivated state.

As an example of the sixth process in the present implementation, the UE_A 10 may perform the following example of the thirty-eighth procedure.

Specifically, when changing the system, when the third congestion management backoff timer associated with [no S-NSSAI, no DNN] is activated, or when the third congestion associated with [no S-NSSAI, no DNN] is deactivated, the UE_A 10 may suppress the performing of the ESM procedure that does not include APN other than for emergency calls in the S1 mode, but may perform the ESM procedure for emergency calls. Therefore, based on this configuration, the UE_10 may transmit the PDN connectivity establishment request message that does not include an APN that the request type is set to "emergency," and suppress the transmission of the PDN connectivity establishment request message that does not include an APN that the request type is set to "emergency."

Herein, the UE_A 10 may not stop the timing of the backoff timer and continue the timing until the backoff timer expires. Alternatively, the UE_A 10 may continue to hold the deactivated backoff timer in the deactivated state.

In this way, the third congestion management for specific [no S-NSSAI, no DNN] may be associated with the system.

Subsequently, the process when UE_A 10 changes the system while the second congestion management associated with a specific S-NSSAI is applied will be described. Particular, when the second congestion management backoff timer associated with a specific S-NSSAI is activated, or the second congestion management backoff timer associated with a specific S-NSSAI is deactivated, the process when UE_A 10 changes the system will be described.

Herein, the second congestion management associated with a specific S-NSSAI and the process restricted when the second congestion management associated with a specific S-NSSAI may be the same those as described.

To repeat, the second congestion management associated with a specific S-NSSAI may be a congestion management based on the S-NSSAI. For example, the second congestion management may be the following congestion management: when the NW receives the UE-led session management request using the S-NSSAI #A from the UE_A 10 and the NW detects the congestion for a specific S-NSSAI, for example, S-NSSAI #A, the NW applies it to the UE_A 10 based on rejecting the UE-led session management request message. In this situation, in the application of the second congestion management, the UE_A 10 starts the timing of the backoff timer associated with the second congestion management received from the NW, and until the backoff timer expires, the UE_A 10 does not to transmit the UE-led session management request using the S-NSSAI #A. Furthermore, using the S-NSSAI may mean including the S-NSSAI information in the UE-led session management request such as a PDU session establishment request message.

For explanation, this second congestion management will be referred to as "second congestion management for a specific S-NSSAI." Furthermore, said backoff timer associated with the second congestion management is referred to as a "second congestion management backoff timer associated with a specific S-NSSAI."

As an example of the sixth process in the present implementation, the UE_A 10 may perform the following example of the twenty-sixth procedure.

Specifically, when changing the system, when the second congestion management backoff timer associated with a specific S-NSSAI is activated, or when the second congestion management backoff timer associated with a specific S-NSSAI is deactivated, the UE_A10 may perform the ESM procedure using any APN in the S1 mode, or may perform the ESM procedure that does not include an APN.

Subsequently, the process when UE_A 10 changes the system while the second congestion management associated with No S-NSSAI is applied will be described. Particular, when the second congestion management backoff timer associated with No S-NSSAI is activated, or the second congestion management backoff timer associated with No S-NSSAI is deactivated, the process when UE_A 10 changes the system will be described.

Herein, the second congestion management associated with No S-NSSAI and the process restricted when the second congestion management associated with No S-NSSAI may be the same those as described.

To repeat, in the second congestion management associated with No S-NSSAI, when the NW in the UE-led session management request does not include S-NSSAI information, the NW may select a default S-NSSAI as the congestion management target. For example, the second congestion management may be the following congestion management: when the NW receives the UE-led session management request that does not use the S-NSSAI information from the UE_A 10 and the NW detects the congestion for the default S-NSSAI, the NW applies it to the UE_A 10 based on rejecting the UE-led session management request message. In this situation, in the application of the second congestion management, the UE_A 10 starts the timing of the backoff timer associated with the second congestion management received from the NW, and until the backoff timer expires, the UE_A 10 does not to transmit the UE-led session management request that does not use S-NSSAI. Furthermore, not using the S-NSSAI may mean not including the S-NSSAI information in the UE-led session management request such as a PDU session establishment request message.

Herein, for explanation, the second congestion management for said default S-NSSAI may be applied based on the UE-led session management request that does not use the S-NSSAI information. Therefore, to distinguish it from the second congestion management for the specific S-NSSAI, it is expressed as a "congestion management for No S-NSSAI." Furthermore, a UE-led session management request such as a PDU session establishment request message that does not use S-NSSAI is expressed as a UE-led session management request that uses No S-NSSAI. For example, a PDU session establishment request message that uses No S-NSSAI is a PDU session establishment request message that does not use S-NSSAI. Furthermore, the back-off timer associated with the second congestion management is expressed to as a "second congestion management back-off timer associated with No S-NSSAI."

As an example of the sixth process in the present implementation, the UE_A 10 may perform the following example of the twenty-seventh procedure.

Specifically, when changing the system, when the second congestion management backoff timer associated with No S-NSSAI is activated, or when the second congestion management backoff timer associated with No S-NSSAI is deactivated, the UE_A 10 may perform the ESM procedure using any APN in the S1 mode, or may perform the ESM procedure that does not include an APN.

Furthermore, as described, the UE_A 10 associates the first congestion management with the system like those described in the examples of the twentieth procedure and the twenty-first procedure regardless of whether the first congestion management is for a specific DNN or No DNN. Furthermore, the UE_A 10 associates the third congestion management with the system, like those described in the examples of the twenty-second procedure to the twenty-fifth procedure regardless of whether the third congestion management is for a specific DNN or No DNN. In other words, when a UE associates a congestion management with a system, regardless of whether the congestion management is for a specific DNN or No DNN, after the system change, the congestion management applied before the system change is not applied.

On the other hand, the UE_A 10 applies the first congestion management in different systems like those described in the examples of the thirtieth procedure to the thirty-second procedure regardless of whether the first congestion management is for a specific DNN or No DNN. Furthermore, the UE_A 10 applies the third congestion management in different systems, like those described in the examples of the thirty-fourth procedure to the thirty-eighth procedure regardless of whether the third congestion management is for a specific DNN or No DNN. In other words, when a UE does not associate a congestion management with a system, regardless of whether the congestion management is for a specific DNN or No DNN, after the system change, the congestion management applied before the system change is applied.

Alternatively, the UE_A 10 may perform different processes based on whether the first congestion management is for a specific DNN or No DNN.

When changing the system, when the first congestion management backoff timer associated with a specific DNN is activated, or when the first congestion associated with a specific DNN is deactivated, the UE_A 10 may transmit the ESM procedure that does not use an APN equivalent to the specific DNN in the S1 mode. Therefore, based on this configuration, the UE_A 10 may restrict the use of the PDN connectivity establishment request message using the specific APN equivalent to the specific DNN.

Herein, the UE_A 10 may not stop the timing of the backoff timer and continue the timing until the backoff timer expires. Alternatively, the UE_A 10 may continue to hold the deactivated backoff timer in the deactivated state.

In this way, the first congestion management for a specific DNN may be associated with the system.

On the other hand, when changing the system and the first congestion management backoff timer associated with No DNN is activated, or when the first congestion associated with No DNN is deactivated, the UE_A 10 may transmit the PDN connectivity establishment request message that does not use an APN in the S1 mode. Therefore, based on this configuration, the UE_A 10 may transmit the PDN connectivity establishment request message that does not use the APN.

Herein, the UE_A 10 may not stop the timing of the backoff timer and continue the timing until the backoff timer expires. Alternatively, the UE_A 10 may continue to hold the deactivated backoff timer in the deactivated state.

In this way, the first congestion management for No DNN may be associated with the system.

Alternatively, the UE_A 10 may perform different processes based on whether the third congestion management is for a specific DNN or No DNN.

When changing the system, when the third congestion management backoff timer associated with [S-NSSAI, DNN] or [no S-NSSAI, DNN] is activated, or when the third congestion associated with [S-NSSAI, DNN] or [no S-NSSAI, DNN] is deactivated, the UE_A 10 may transmit the PDN connectivity establishment request message that does not use an APN equivalent to the specific DNN in the S1 mode. Therefore, based on this configuration, the UE_A 10 may restrict the use of the PDN connectivity establishment request message using the specific APN equivalent to the specific DNN.

Herein, the UE_A 10 may not stop the timing of the backoff timer and continue the timing until the backoff timer expires. Alternatively, the UE_A 10 may continue to hold the deactivated backoff timer in the deactivated state.

In this way, the third congestion management for [S-NSSAI, DNN] or [no S-NSSAI, DNN] may be associated with the system.

On the other hand, when changing the system, when the third congestion management backoff timer associated with [S-NSSAI, no DNN] or [no S-NSSAI, no DNN] is activated, or when the third congestion associated with [S-NSSAI, no DNN] or [no S-NSSAI, no DNN] is deactivated, the UE_A 10 may transmit the PDN connectivity establishment request message that does not use an APN in the S1 mode. Therefore, based on this configuration, the UE_A 10 may transmit the PDN connectivity establishment request message that does not use the APN.

Herein, the UE_A 10 may not stop the timing of the backoff timer and continue the timing until the backoff timer expires. Alternatively, the UE_A 10 may continue to hold the deactivated backoff timer in the deactivated state.

In this way, the third congestion management for [S-NSSAI, no DNN] or [no S-NSSAI, no DNN] may be associated with the system.

[2. Variations]

The program that operates in the device related to the present disclosure may be a program that controls a Central Processing Unit (CPU) or the like to cause a computer to function to realize the functions of the implementations related to the present disclosure. The program or information handled by the program is temporarily stored in a volatile memory such as a Random Access Memory (RAM) or a non-volatile memory such as a flash memory, a Hard Disk Drive (HDD), or other storage device systems.

Furthermore, the program for realizing the functions of the implementations according to the present disclosure may be recorded in a computer-readable recording medium. It may be realized by causing a computer system to read and execute the program recorded in this recording medium. The "computer system" here is a computer system built in the device and includes an operating system and hardware such as peripheral devices. Furthermore, the "computer-readable recording medium" is a semiconductor recording medium, an optical recording medium, a magnetic recording medium, a medium that dynamically holds a program for a short time, or other computer-readable recording mediums.

Furthermore, each functional block or various features of the device used in the described implementations may be performed or executed by an electric circuit, for example, an integrated circuit or a plurality of integrated circuits. The electrical circuits designed to perform the functions described in the present disclosure may include general purpose processors, digital signal processors (DSPs), application specific integrated circuits (ASICs), field programmable gate arrays (FPGAs), or other programmable logic devices, discrete gate or transistor logic, discrete hardware components, or any combinations thereof. The general purpose processor may be a microprocessor, a conventional processor, controller, microcontroller, or state machine. The electric circuit described may be composed of a digital circuit or an analog circuit. Furthermore, when an integrated circuit technology that replaces the current integrated circuit appears due to the progress of semiconductor technology, one or more aspects of the present disclosure may use the new integrated circuit according to the technology.

Furthermore, in the above implementations, the device is described as an example. The present disclosure is not limited to the disclosed implementations, and may be applied to fixed or non-mobile electronic equipment installed indoor or outdoor. For example, the electronic equipment may be Audio-Video equipment, kitchen equipment, cleaning equipment, air-conditioner, office equipment, vending machines, other home appliances, terminal devices or communications devices.

As above, the implementations of the present disclosure are disclosed in detail with reference to the accompanying drawings. However, the implementations are not limited to the disclosed implementations. The present disclosure also includes design variations without departing from the scope or spirit of the disclosed concepts. Furthermore, the present disclosure also encompasses modifications within the scope of the claims, implementations suitably combining various disclosed implementations. Additionally, the disclosed implementations may have component substitutions that have similar effect.

What is claimed is:

1. A user equipment (UE), the UE comprising:
one or more processors; and
at least one memory coupled to the one or more processors, wherein the at least one memory stores one or more computer-executable instructions that, when executed by the one or more processors, cause the UE to:
initiate, when a timer for Single Network Slice Selection Assistance Information (S-NSSAI) and a Data Network Name (DNN) is operating, an Evolved Packet System (EPS) Session Management (ESM) procedure in the EPS by using an Access Point Name (APN), wherein the APN is the same as the DNN;
receive a value of the timer in a Protocol Data Unit (PDU) session establishment reject message; and
forgo transmitting a new PDU session establishment request using the APN before the timer expires when another Public Land Mobile Network (PLMN) or another network (NW) slice that is not related to a PDU session is selected.

2. The UE according to claim 1, wherein the APN comprises identification information that identifies a core network and an external network.

3. The UE according to claim 1, wherein:
initiating the EPS ESM procedure by using the APN comprises initiating the EPS ESM procedure by transmitting a PDN connectivity establishment request message using the APN.

4. A communication method executed by a user equipment (UE), the method comprising:
initiating, when a timer for Single Network Slice Selection Assistance Information (S-NSSAI) and a Data Network Name (DNN) is operating, an Evolved Packet System (EPS) Session Management (ESM) procedure in the EPS by using an Access Point Name (APN), wherein the APN is the same as the DNN;
receiving a value of the timer in a Protocol Data Unit (PDU) session establishment reject message; and
forgoing transmitting a new PDU session establishment request using the APN before the timer expires when another Public Land Mobile Network (PLMN) or another network (NW) slice that is not related to a PDU session is selected.

5. The communication method according to claim 4, wherein the APN comprises identification information that identifies a core network and an external network.

6. The communication method according to claim 4, wherein:
initiating the EPS ESM procedure by using the APN comprises initiating the EPS ESM procedure by transmitting a PDN connectivity establishment request message using the APN.

* * * * *